United States Patent
Roach et al.

(10) Patent No.: US 10,927,843 B2
(45) Date of Patent: Feb. 23, 2021

(54) PLATED POLYMER COMPRESSOR

(71) Applicant: UNITED TECHNOLOGIES CORPORATION, Farmington, CT (US)

(72) Inventors: James T. Roach, Vernon, CT (US); Charles R. Watson, Windsor, CT (US); Grant O. Cook, III, Spring, TX (US); Barry Barnett, Markham (CA); Shari J. Bugaj, Haddam, CT (US); Glenn Levasseur, Colchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 327 days.

(21) Appl. No.: 14/904,001

(22) PCT Filed: Jul. 9, 2014

(86) PCT No.: PCT/US2014/045935
§ 371 (c)(1),
(2) Date: Jan. 8, 2016

(87) PCT Pub. No.: WO2015/006438
PCT Pub. Date: Jan. 15, 2015

(65) Prior Publication Data
US 2016/0160869 A1     Jun. 9, 2016

Related U.S. Application Data

(60) Provisional application No. 61/844,048, filed on Jul. 9, 2013, provisional application No. 61/844,020, filed on Jul. 9, 2013.

(51) Int. Cl.
*F04D 29/02*     (2006.01)
*F01D 5/28*      (2006.01)
(Continued)

(52) U.S. Cl.
CPC ........ *F04D 29/023* (2013.01); *C23C 18/1641* (2013.01); *C23C 18/1651* (2013.01);
(Continued)

(58) Field of Classification Search
CPC ........ F04D 29/023; F01D 5/286; F01D 5/288; F01D 5/3092; F01D 5/34; F01D 25/005
See application file for complete search history.

(56) References Cited

U.S. PATENT DOCUMENTS

| | | |
|---|---|---|
| 2,401,247 A | 5/1946 | Hunter |
| 2,942,300 A | 6/1960 | Masters |

(Continued)

FOREIGN PATENT DOCUMENTS

| | | |
|---|---|---|
| CN | 103061827 A | 4/2013 |
| DE | 2142474 A1 | 3/1973 |

(Continued)

OTHER PUBLICATIONS

International Search Report for application PCT/US2014/045949, dated Oct. 28, 2014, 3 pages.

(Continued)

*Primary Examiner* — Kenneth Bomberg
*Assistant Examiner* — Michael L Sehn
(74) *Attorney, Agent, or Firm* — Cantor Colburn LLP

(57) ABSTRACT

Plated polymeric gas turbine engine parts and methods for fabricating lightweight plated polymeric gas turbine engine parts are disclosed. The parts include a polymeric substrate plated with one or more metal layers. The polymeric material of the polymeric substrate may be structurally reinforced with materials that may include carbon, metal, or glass. The polymeric substrate may also include a plurality of layers to form a composite layup structure.

11 Claims, 24 Drawing Sheets

(51) Int. Cl.
<table>
<tr><td>F04D 29/32</td><td>(2006.01)</td></tr>
<tr><td>F04D 29/54</td><td>(2006.01)</td></tr>
<tr><td>F01D 5/30</td><td>(2006.01)</td></tr>
<tr><td>F01D 25/00</td><td>(2006.01)</td></tr>
<tr><td>C25D 5/56</td><td>(2006.01)</td></tr>
<tr><td>F01D 5/34</td><td>(2006.01)</td></tr>
<tr><td>F01D 25/02</td><td>(2006.01)</td></tr>
<tr><td>C23C 18/16</td><td>(2006.01)</td></tr>
<tr><td>C25D 5/10</td><td>(2006.01)</td></tr>
<tr><td>F04D 29/52</td><td>(2006.01)</td></tr>
<tr><td>F02K 1/34</td><td>(2006.01)</td></tr>
<tr><td>B64D 33/02</td><td>(2006.01)</td></tr>
<tr><td>C25D 5/02</td><td>(2006.01)</td></tr>
<tr><td>C25D 5/16</td><td>(2006.01)</td></tr>
<tr><td>C25D 5/12</td><td>(2006.01)</td></tr>
</table>

(52) U.S. Cl.
CPC ............ *C23C 18/1653* (2013.01); *C25D 5/10* (2013.01); *C25D 5/56* (2013.01); *F01D 5/282* (2013.01); *F01D 5/288* (2013.01); *F01D 5/3092* (2013.01); *F01D 5/34* (2013.01); *F01D 25/005* (2013.01); *F01D 25/02* (2013.01); *F04D 29/322* (2013.01); *F04D 29/324* (2013.01); *F04D 29/522* (2013.01); *F04D 29/542* (2013.01); *B64D 33/06* (2013.01); *B64D 2033/0206* (2013.01); *C23C 18/1605* (2013.01); *C25D 5/022* (2013.01); *C25D 5/12* (2013.01); *C25D 5/16* (2013.01); *F05D 2220/36* (2013.01); *F05D 2250/181* (2013.01); *F05D 2250/182* (2013.01); *F05D 2250/61* (2013.01); *F05D 2300/10* (2013.01); *F05D 2300/43* (2013.01); *F05D 2300/512* (2013.01); *F05D 2300/611* (2013.01); *Y02T 50/672* (2013.01); *Y02T 50/673* (2013.01)

(56) References Cited

U.S. PATENT DOCUMENTS

| | | | |
|---|---|---|---|
| 2,959,229 A | 11/1960 | Meier | |
| 3,344,515 A | 10/1967 | Schuster et al. | |
| 3,573,973 A | 4/1971 | Drotar et al. | |
| 3,576,662 A | 4/1971 | Diebold et al. | |
| 3,681,209 A | 8/1972 | Campbell et al. | |
| 3,687,776 A | 8/1972 | Allard et al. | |
| 3,900,320 A | 8/1975 | Rolker et al. | |
| 3,953,653 A | 4/1976 | Doss | |
| 4,029,838 A | 6/1977 | Chamis et al. | |
| 4,070,912 A | 1/1978 | McNaughtan et al. | |
| 4,078,096 A | 3/1978 | Redmond et al. | |
| 4,148,945 A | 4/1979 | Bangs et al. | |
| 4,192,764 A | 3/1980 | Madsen | |
| 4,241,129 A | 12/1980 | Marton et al. | |
| 4,248,921 A | 2/1981 | Steigerwald et al. | |
| 4,314,892 A | 2/1982 | Stevens | |
| 4,315,970 A | 2/1982 | McGee | |
| 4,403,075 A | 9/1983 | Byrd et al. | |
| 4,417,848 A | 11/1983 | Dembeck | |
| 4,446,191 A | 5/1984 | Miyadera et al. | |
| 4,499,157 A | 2/1985 | Mulliner et al. | |
| 4,617,977 A | 10/1986 | Mills | |
| 4,647,714 A | 3/1987 | Goto | |
| 4,739,115 A | 4/1988 | Byrd et al. | |
| 4,774,126 A | 9/1988 | Dorsey et al. | |
| 4,815,940 A | 3/1989 | LeShane et al. | |
| 4,868,071 A | 9/1989 | Walsh et al. | |
| 4,888,247 A | 12/1989 | Zweben et al. | |
| 4,894,124 A | 1/1990 | Walsh et al. | |
| 4,913,062 A | 4/1990 | Burke | |
| 4,916,110 A | 4/1990 | Manniso | |
| 4,992,144 A | 2/1991 | Walsh et al. | |
| 5,064,509 A | 11/1991 | Melnyk et al. | |
| 5,252,160 A | 10/1993 | Scanlon et al. | |
| 5,348,446 A | 9/1994 | Lee et al. | |
| 5,556,023 A | 9/1996 | Kuramoto et al. | |
| 5,564,902 A | 10/1996 | Tomita | |
| 5,630,700 A * | 5/1997 | Olsen | F01L 35/189 415/134 |
| 5,656,795 A | 8/1997 | Miska | |
| 5,658,506 A | 8/1997 | White et al. | |
| 5,702,584 A | 12/1997 | Goenka et al. | |
| 5,833,435 A | 11/1998 | Smith | |
| 5,839,882 A | 11/1998 | Finn et al. | |
| 5,877,240 A | 3/1999 | Piret et al. | |
| 6,055,786 A | 5/2000 | Hubbard et al. | |
| 6,059,533 A | 5/2000 | Stoker et al. | |
| 6,087,021 A | 7/2000 | Gaynes et al. | |
| 6,092,556 A | 7/2000 | Adkins | |
| 6,129,260 A | 10/2000 | Andrus et al. | |
| 6,159,589 A | 12/2000 | Isenberg et al. | |
| 6,240,970 B1 | 6/2001 | Ostrander et al. | |
| 6,278,185 B1 | 8/2001 | Murali et al. | |
| 6,356,013 B1 | 3/2002 | Pong et al. | |
| 6,358,014 B1 | 3/2002 | Chou et al. | |
| 6,426,143 B1 | 7/2002 | Voss et al. | |
| 6,458,451 B1 | 10/2002 | Stedil et al. | |
| 6,547,210 B1 | 4/2003 | Marx et al. | |
| 6,551,063 B1 | 4/2003 | Lee et al. | |
| 6,561,763 B2 | 5/2003 | Breakwell | |
| 6,626,230 B1 | 9/2003 | Woodrum et al. | |
| 6,725,541 B1 | 4/2004 | Holme et al. | |
| 6,777,095 B2 | 8/2004 | Bunyan et al. | |
| 6,943,288 B1 | 9/2005 | Miska | |
| 6,982,116 B1 | 1/2006 | Passman et al. | |
| 7,246,773 B2 | 7/2007 | Stoner et al. | |
| 7,565,996 B2 | 7/2009 | Das | |
| 7,802,613 B2 | 9/2010 | Bullied et al. | |
| 7,830,021 B1 | 11/2010 | Wilcoxon et al. | |
| 7,837,439 B2 | 11/2010 | Bech | |
| 7,927,708 B2 | 4/2011 | Mizrahi | |
| 7,931,475 B2 | 4/2011 | Kim et al. | |
| 8,088,498 B2 | 1/2012 | Smith et al. | |
| 8,251,670 B2 | 8/2012 | Anghileri | |
| 8,366,391 B2 | 2/2013 | Tsukagoshi et al. | |
| 8,394,507 B2 | 3/2013 | Tomantschger et al. | |
| 8,540,842 B2 | 9/2013 | Mizrahi | |
| 9,587,497 B2 | 3/2017 | Hunziker et al. | |
| 9,758,889 B2 | 9/2017 | Chun | |
| 2001/0012543 A1 | 8/2001 | Watanabe et al. | |
| 2001/0020744 A1 | 9/2001 | Kuramoto et al. | |
| 2001/0054379 A1 | 12/2001 | Choy et al. | |
| 2002/0102160 A1 | 8/2002 | Breakwell | |
| 2003/0056492 A1 | 3/2003 | Henson | |
| 2003/0070387 A1 | 4/2003 | Klocke et al. | |
| 2003/0183416 A1 | 10/2003 | White et al. | |
| 2004/0054044 A1 | 3/2004 | Bittner et al. | |
| 2004/0168470 A1 | 9/2004 | Scott et al. | |
| 2004/0206399 A1 | 10/2004 | Heller et al. | |
| 2004/0222103 A1 | 11/2004 | Marsales et al. | |
| 2005/0070651 A1 | 3/2005 | McNulty et al. | |
| 2005/0081530 A1 | 4/2005 | Bagnall et al. | |
| 2005/0100720 A1 | 5/2005 | Shirai et al. | |
| 2005/0170198 A1 | 8/2005 | Aida | |
| 2005/0175813 A1 | 8/2005 | Wingert et al. | |
| 2005/0212185 A1 | 9/2005 | Miyazawa | |
| 2006/0018760 A1 | 1/2006 | Bruce et al. | |
| 2006/0099370 A1 | 5/2006 | Glass | |
| 2006/0108533 A1 | 5/2006 | McEvoy et al. | |
| 2006/0180348 A1 | 8/2006 | Cloutier et al. | |
| 2006/0188730 A1 | 8/2006 | Varanasi et al. | |
| 2006/0222846 A1 | 10/2006 | Ackerman et al. | |
| 2006/0228546 A1 | 10/2006 | Aversenti | |
| 2006/0235542 A1 | 10/2006 | Hodorek et al. | |
| 2007/0011693 A1 | 1/2007 | Creasy, Jr. | |
| 2007/0044765 A1 | 3/2007 | Lincourt | |
| 2007/0048537 A1 | 3/2007 | Knoedler et al. | |
| 2007/0081901 A1 | 4/2007 | Wagner et al. | |
| 2007/0145584 A1 | 6/2007 | Kataoka et al. | |
| 2007/0172643 A1 | 7/2007 | Krawczyk | |
| 2007/0184288 A1 | 8/2007 | Garamszegi et al. | |

(56) References Cited

U.S. PATENT DOCUMENTS

| | | |
|---|---|---|
| 2007/0190352 A1 | 8/2007 | Bayer et al. |
| 2007/0251389 A1 | 11/2007 | Katsir et al. |
| 2008/0044671 A1 | 2/2008 | Lee et al. |
| 2008/0050600 A1 | 2/2008 | Fan et al. |
| 2008/0178995 A1 | 7/2008 | Fernandes |
| 2008/0277979 A1 | 11/2008 | Segato |
| 2009/0008431 A1 | 1/2009 | Zonvide et al. |
| 2009/0068425 A1 | 3/2009 | Suzuki et al. |
| 2009/0082494 A1 | 3/2009 | Kaprinidis |
| 2009/0087640 A1 | 4/2009 | Li et al. |
| 2009/0092842 A1 | 4/2009 | Hoover et al. |
| 2009/0098373 A1 | 4/2009 | Dolan |
| 2009/0151852 A1 | 6/2009 | Roebroeks |
| 2009/0156939 A1 | 6/2009 | Sadaka et al. |
| 2009/0169368 A1 | 7/2009 | Schlichting et al. |
| 2009/0191345 A1 | 7/2009 | Griffin |
| 2009/0226746 A1 | 9/2009 | Chakrabarti et al. |
| 2010/0018981 A1 | 1/2010 | Hyde et al. |
| 2010/0039779 A1 | 2/2010 | Mitchell et al. |
| 2010/0040902 A1 | 2/2010 | Mizrahi |
| 2010/0068552 A1 | 3/2010 | Goerlich et al. |
| 2010/0084037 A1 | 4/2010 | Ericsson et al. |
| 2010/0146986 A1 | 6/2010 | Hussain |
| 2010/0159260 A1 | 6/2010 | Elia et al. |
| 2010/0170802 A1 | 7/2010 | Kawashita et al. |
| 2010/0226783 A1 | 9/2010 | Lipkin et al. |
| 2010/0232974 A1 | 9/2010 | De Moura et al. |
| 2010/0247291 A1 | 9/2010 | Tholen et al. |
| 2010/0258344 A1 | 10/2010 | Creasy, Jr. |
| 2010/0288433 A1 | 11/2010 | Montesano et al. |
| 2010/0304065 A1 | 12/2010 | Tomantschger et al. |
| 2011/0008164 A1 | 1/2011 | Presz, Jr. |
| 2011/0012478 A1 | 1/2011 | Najafi et al. |
| 2011/0091740 A1 | 4/2011 | Sugahara et al. |
| 2011/0162788 A1 | 7/2011 | Mizrahi |
| 2011/0167785 A1 | 7/2011 | Moore et al. |
| 2011/0168843 A1 | 7/2011 | Calder |
| 2011/0200816 A1 | 8/2011 | Mizrahi et al. |
| 2011/0215585 A1 | 9/2011 | Caires |
| 2011/0236703 A1 | 9/2011 | McGee |
| 2011/0283873 A1 | 11/2011 | Wadley et al. |
| 2011/0286854 A1* | 11/2011 | Watson .............. F01D 5/288 416/241 R |
| 2011/0287223 A1 | 11/2011 | Victor et al. |
| 2011/0289936 A1 | 12/2011 | Suciu et al. |
| 2011/0294594 A1 | 12/2011 | Palumbo et al. |
| 2012/0076647 A1 | 3/2012 | Robertson, Jr. et al. |
| 2012/0082541 A1 | 4/2012 | Macchia et al. |
| 2012/0082553 A1 | 4/2012 | Eleftheriou et al. |
| 2012/0082559 A1 | 4/2012 | Guglielmin et al. |
| 2012/0082783 A1* | 4/2012 | Barnett .............. B22F 1/0018 427/142 |
| 2012/0094777 A1 | 4/2012 | Hechler-Stabbert et al. |
| 2012/0148388 A1 | 6/2012 | Bottome |
| 2012/0174508 A1 | 7/2012 | Brooks et al. |
| 2012/0193241 A1 | 8/2012 | Ke et al. |
| 2012/0285648 A1 | 11/2012 | Mueller et al. |
| 2012/0321443 A1 | 12/2012 | Ravey et al. |
| 2013/0034725 A1 | 2/2013 | Paul |
| 2013/0089431 A1 | 4/2013 | Stevenson et al. |
| 2013/0105031 A1 | 5/2013 | Dambrine et al. |
| 2013/0134436 A1 | 5/2013 | Pham et al. |
| 2013/0143060 A1 | 6/2013 | Jacobsen et al. |
| 2013/0146594 A1 | 6/2013 | Hirano et al. |
| 2014/0002952 A1 | 1/2014 | McConnell et al. |
| 2014/0102626 A1 | 4/2014 | Clayton et al. |
| 2014/0120320 A1 | 5/2014 | Kanai et al. |
| 2014/0162086 A1 | 6/2014 | Mizrahi |
| 2014/0193658 A1 | 7/2014 | Ross et al. |
| 2014/0203069 A1 | 7/2014 | Wang et al. |
| 2015/0050422 A1 | 2/2015 | Tews et al. |
| 2015/0298791 A1 | 10/2015 | Nordin et al. |
| 2016/0144602 A1 | 5/2016 | Levasseur et al. |
| 2016/0145447 A1 | 5/2016 | Miarecki et al. |
| 2016/0145850 A1 | 5/2016 | Cook et al. |
| 2016/0146022 A1 | 5/2016 | Twelves et al. |
| 2016/0152005 A1 | 6/2016 | Roach et al. |
| 2016/0153287 A1 | 6/2016 | Roach et al. |
| 2016/0158964 A1 | 6/2016 | Miarecki et al. |
| 2016/0159488 A1 | 6/2016 | Roach et al. |
| 2016/0160353 A1 | 6/2016 | Miarecki et al. |
| 2016/0160681 A1 | 6/2016 | Roach et al. |
| 2016/0160863 A1* | 6/2016 | Roach .............. B32B 27/281 415/119 |
| 2016/0167791 A1 | 6/2016 | Roach et al. |
| 2016/0169012 A1 | 6/2016 | Dacunha et al. |
| 2016/0212857 A1 | 7/2016 | Miyoshi et al. |
| 2016/0251760 A1 | 9/2016 | Levasseur et al. |
| 2016/0368238 A1 | 12/2016 | Bogue et al. |
| 2016/0369419 A1 | 12/2016 | Miarecki et al. |
| 2016/0369635 A1 | 12/2016 | Xu et al. |
| 2016/0376709 A1 | 12/2016 | Galos et al. |
| 2017/0025223 A1 | 1/2017 | Bultitude et al. |
| 2017/0358397 A1 | 12/2017 | McConnell et al. |
| 2019/0164865 A1 | 5/2019 | Elger et al. |

FOREIGN PATENT DOCUMENTS

| | | |
|---|---|---|
| EP | 0743174 A2 | 11/1996 |
| EP | 2281746 A2 | 2/2011 |
| EP | 2469025 A2 | 6/2012 |
| EP | 2610460 A2 | 7/2013 |
| GB | 2136313 A | 9/1984 |
| JP | 05157190 A | 6/1993 |
| JP | 06170514 A | 6/1994 |
| JP | 06315919 A | 11/1994 |
| JP | 2005171916 A | 6/2005 |
| JP | 2008062511 A | 3/2008 |
| JP | 2010001511 A | 1/2010 |
| JP | 2011032987 A | 2/2011 |
| JP | 2013504007 A | 2/2013 |
| KR | 20070104792 A | 10/2007 |
| WO | 0061831 A1 | 10/2000 |
| WO | 0146324 A2 | 6/2001 |
| WO | 2011087098 A1 | 7/2011 |
| WO | 2012058470 A1 | 5/2012 |
| WO | 2012110363 A2 | 8/2012 |

OTHER PUBLICATIONS

International Search Report for PCT/US2014/045928, dated Jan. 8, 2015, 3 pages.
International Search Report for PCT/US2014/045935, dated Oct. 24, 2014, 6 pages.
International Search Report for PCT/US2014/045998, dated Nov. 14, 2014, 3 pages.
PCT International Search Report for PCT/US2014/045985, dated Feb. 17, 2015, 3 pages.
PCT/US2014/046010 International Search Report, dated Nov. 13, 2014, 3 pages.
Written Opinion for application PCT/US2014/045949, dated Oct. 28, 2014, 6 pages.
Written Opinion for PCT/US2014/045928, dated Jan. 8, 2015, 8 pages.
Written Opinion for PCT/US2014/045935, dated Oct. 24, 2014, 7 pages.
Written Opinion for PCT/US20141045985, dated Feb. 17, 2015, 8 pages.
Written Opinion for PCT/US20141045998 dated Nov. 14, 2014, 8 pages.
Written Opinion for PCT/US20141046010, dated Nov. 13, 2014, 9 pages.
European Search Report for European Application No. 14823763.9, dated Apr. 10, 2017, 8 pages.
ASM, "Advances in Soldering Technology" (2004), 10 pages.
Cook, III and Soreensen, "Overview of transient liquid phase and partial transient lqiud phase bonding", J. Mater Sci (2011) 46:5305-5323 DOI 10.1007/s10853-011-5561-1, 19 pages.

(56) References Cited

OTHER PUBLICATIONS

European Search Report for European Application No. 14832491.6; Application Filing Date Feb. 8, 2016; dated Feb. 18, 2020; 6 pages.

\* cited by examiner

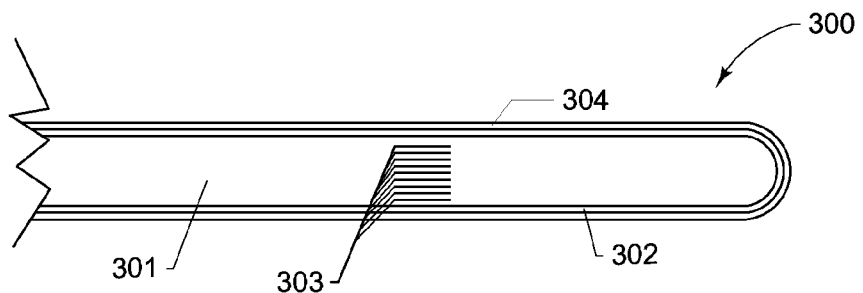
FIG. 20
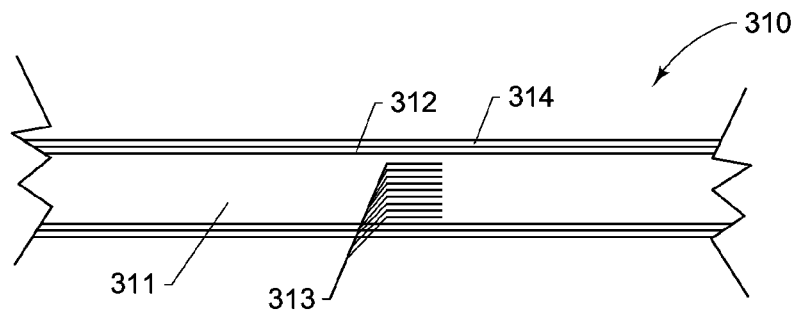
FIG. 21
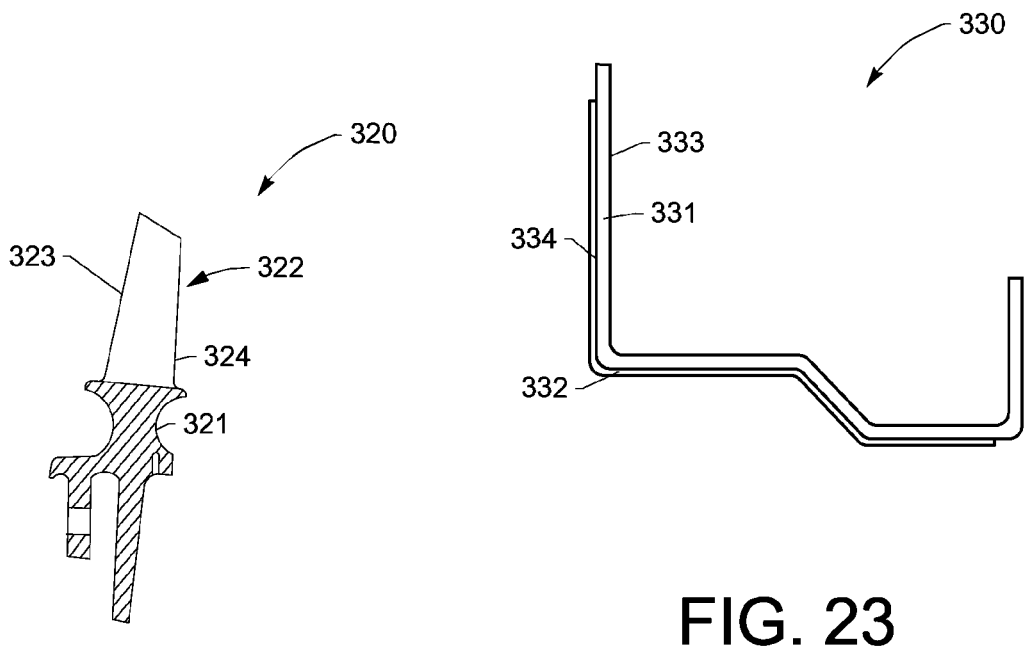
FIG. 22
FIG. 23

PLATED POLYMER COMPRESSOR

CROSS-REFERENCE TO RELATED APPLICATIONS

This application claims priority under 35 U.S.C. § 119(e) to U.S. Provisional Patent Application Ser. No. 61/844,048 filed on Jul. 9, 2013, entitled "Lightweight Gas Turbine Engine Components Produced By Plating Molded Polymer Article," and to U.S. Provisional Patent Application Ser. No. 61/844,020 filed on Jul. 9, 2013, entitled "Plated Polymer Integrally Bladed Rotor and Method of Making."

TECHNICAL FIELD

This disclosure relates to methods for plating metallic layers onto molded polymeric articles for producing lightweight plated polymer components for gas turbine engines. More specifically, this disclosure relates to a method that includes molding a polymer article having a desired geometry and then plating the outer surface of the polymer article with metallic layers using electroless plating, electrolytic plating, or electroforming methods to produce lightweight metal parts that can be incorporated into gas turbine engines.

BACKGROUND

Metal parts tend to be heavy due to the high densities of most metals. In certain instances, removing material from a metal part can lead to weight savings. For example, the stresses imposed upon a metal part in service may be analyzed. Typically, there are areas of the metal part that have little or no stress as well as highly stressed areas. An ideal metal part may contain a sufficient amount of metal in highly stressed areas to transmit the necessary loads and perform the function of the part. However, such an ideal part would contain less or no material in areas with little or no stress, respectively, thereby reducing the weight of the metal part to an idealized minimum Therefore, there is a need for improved methods of providing metal parts that are lightweight but strong enough in high stress areas to perform the function of the part.

However, removing material from the metal part by conventional means, such as machining, laser drilling, etc., is both difficult and costly. Further, removing material from a metal part can lead to reduced material properties of the part, which may be unacceptable. Thus, simply removing metal from a formed metal part is less than ideal in certain parts and situations.

Gas turbine engines designed for aircraft include thousands of metal parts. Because the weight of an aircraft, including the engine, is directly related to fuel consumption, engine and aircraft manufacturers are constantly seeking new technologies that will help them reduce the weight of their engines and aircraft respectively. One strategy involves substituting traditional metal parts for lightweight polymer or composite parts. For example, non-metal containment structures for gas turbine engines may include, for example, KEVLAR® (a registered trademark of E.I. Dupont de Nemours & Company) or another ballistic fabric wrapped around a case. Containment systems that include fabric are more weight efficient than all-metal containment cases, but nonetheless add weight to the engine.

Additive manufacturing (AM) or three-dimensional (3D) printing is a process of making a three-dimensional solid object of virtually any shape from a digital model. AM is achieved by depositing successive layers of material in different cross-sectional shapes. AM is considered distinct from traditional machining techniques, which mostly rely on the removal of material by methods such as cutting or drilling, i.e., subtractive processes. A materials printer usually performs AM processes using digital technology. Since the start of the twenty-first century there has been a large growth in the sales of these machines, and while the price has dropped substantially, AM remains costly. Despite its high cost, though, AM is used in many fields, including aerospace.

Less costly alternatives to AM include various molding processes, such as blow molding, injection molding, compression molding, and others that will be apparent to those skilled in the art. Blow molding processes begin with melting the molding material and forming it into a parison or preform. The parison is a tube-like piece of plastic with a hole in one end through which compressed air can pass through. The parison is clamped into a mold and air is pumped into the parison. The air pressure pushes the molding material outwards to match the interior surface of the mold. Once the molding material has cooled and hardened, the mold opens and the part is ejected. In contrast, injection molding includes injecting molding material for the part into a heated barrel, mixing, and forcing the molding material into a mold cavity where the molding material cools and hardens to the configuration of the cavity. Compression molding is a method of molding in which the preheated molding material is placed in an open mold cavity. The mold is closed and pressure is applied to force the material into contact with all mold areas, while heat and pressure are maintained until the molding material has cured.

For many molding processes, hard tooling is used to form the mold or die. While hard tooling can provide a high dimensional repeatability, hard tooling is very heavy and cumbersome and can present a safety hazard when moved or handled. Further, fabricating hard tooling is time consuming and costly. As a result, hard tooling is normally too expensive and time consuming for short production runs and/or for the fabrication of test parts. Thus, the ability to quickly fabricate tooling to support short production runs and/or test runs of composite materials is desired.

Blow molding and injection molding cannot be used if the polymer to be molded is in the form of a composite with a plurality of layers or plies, i.e., a composite layup structure. Composites are materials made from two or more constituent materials with significantly different physical or chemical properties that, when combined, produce a material with characteristics different from the individual components. The individual components remain separate and distinct within the finished structure. Typically, composite layup structures can be molded or shaped using compression molding, resin transfer molding (RTM) or vacuum assisted resin transfer molding (VARTM), all of which utilize hard tooling that typically include details machined into one or more blocks of metal that form the mold.

Composites can also include reinforcing fibers or matrices. The fibers or matrices may be formed from ceramic, metal, combinations of ceramic and metal, concrete and various other inorganic and organic materials. Organic matrix composites (OMCs) may include polyimides and/or bismaleimides (BMIs) because they can be used at higher temperatures than other commonly used organic reinforcing materials, such as epoxies. Such high-temperature OMCs may be processed by autoclave molding, compression molding, or resin-transfer molding. These processes all require lengthy cure and post-cure cycles as well as hard tooling that is difficult and costly to make. Further, only tooling with limited geometrical complexity can be produced. Thus, improved methods for molding OMCs are also desired.

One inexpensive method of forming a metallic layer on a surface of a molded polymer article is electroless plating. To ensure adhesion of the plated film to the molded polymer article, the surface of the polymer article may need to be prepared by etching, abrading, or ionic activation. The most common types of metals used for plating on polymers are copper, silver, and nickel, although other metals can be used.

Electrolytic plating is the deposition of a metal on a conductive material using an electric current. A molded polymer article must first be made conductive to be electrolytically plated. This can be done through electroless plating or by the use of conductive additives such as carbon. The article to be electrolytically plated is immersed in a solution of metal salts connected to a cathodic current source, and an anodic conductor is immersed in the bath to complete the electrical circuit. Electric current flows from the cathode to the anode, and the electron flow reduces the dissolved metal ions to pure metal on the cathodic surface. The anode is usually made from the same metal, and can dissolve during the electroplating process, thereby replenishing the bath.

The operating temperature of a plated polymer article, component or part may be limited by the polymeric substrate. Thus, parts for a gas turbine engine may not be able to be fabricated from a polymer material or a reinforced polymer material if the part is within a line-of-sight to a heat source, such as a combustor, which may transfer heat to the part by radiation. Because of the operating conditions of a gas turbine engine and the need to save weight, lightweight polymer parts that can withstand relatively high operating temperatures for polymers (>150° C.) are needed in the aircraft and/or gas turbine engine industries.

Another issue associated with gas turbine engines is noise. Suppression of gas turbine engine noise has become an important field of research due to airport regulations and aircraft noise certification requirements that govern the maximum noise level that aircraft are allowed to produce. Further, because the principal sources of noise from a commercial aircraft are the engines, reducing noise emitted by such engines is desirable. Thus, there is a need for gas turbine engine structural components that are both lightweight and that include sound attenuation properties.

SUMMARY

Plated polymer components for gas turbine engines are disclosed. The disclosed components may include a molded polymeric substrate plated with at least one metallic layer and, optionally, at least one polymer layer.

Methods are also disclosed for fabricating such plated polymer components of gas turbine engines. The disclosed methods may include forming a polymer into a desired shape having an outer surface. The method may further include preparing the outer surface to receive a catalyst and activating the outer surface with the catalyst. The method may then include plating a first metal onto the outer surface and the catalyst to form a structure, and optionally followed by plating one or more additional layers until a desired thickness is reached. The plated structure may optionally be coated with a polymeric coating.

In accordance with an aspect of the disclosure, a compressor component for a gas turbine engine is provided. The component may include a first at least one polymeric substrate forming the compressor component and having a first at least one exposed surface. A first at least one metallic plating layer deposited on the first at least one exposed surface of the at least one polymeric substrate.

In accordance with another aspect of the disclosure, the first at least one polymeric substrate may be formed into one of an intermediate case and high pressure compressor case.

In accordance with yet another aspect of the disclosure, the first at least one polymeric substrate may be formed into a plurality of airfoils.

In accordance with still yet another aspect of the disclosure, the plurality of airfoils may extend integrally from a hub.

In accordance with an even further aspect of the disclosure, the hub may be formed of a second at least one polymeric substrate having a second at least one exposed surface. The second at least one exposed surface may have a second at least one metallic plating layer deposited thereon.

In accordance with still an even further aspect of the disclosure, a metal portion may extend from the hub. The metal portion may be coupled to the first at least one metallic plating layer.

In accordance with still yet an even further aspect of the disclosure, each airfoil of the plurality of airfoils may be coupled to a hub.

In further accordance with another aspect of the disclosure, the hub may be formed from a second at least one polymeric substrate having a second at least one exposed surface. The second at least one exposed surface may have a second at least one metallic plating layer deposited thereon.

In further accordance with yet antoher aspect of the disclosure, the plurality of airfoils may include at least one shroud. The at least one shroud may be formed of a second at least one polymeric substrate having a second at least one exposed surface. The second at least one exposed surface may have a second at least one metallic plating layer deposited thereon.

In accordance with another aspect of the disclosure, a gas turbine engine is provided. The engine may include a hub. A plurality of airfoils may extend from the hub. Each airfoil of the plurality of airfoils may include a first at least one polymeric substrate having a first at least one exposed surface. A first at least one metallic plating layer may be deposited on the first at least one exposed surface.

In accordance with yet another aspect of the disclosure, each airfoil may be integrally coupled to the hub.

In accordance with still yet another aspect of the disclosure, a case may surround the plurality of airfoils. The case may be formed from a second at least one polymeric substrate having a second at least one exposed surface. The second at least one exposed surface may have a second at least one metallic plating layer deposited thereon.

In accordance with a further aspect of the disclosure, the engine may further include a cluster of vanes. The cluster of vanes may be formed from a second at least one polymeric substrate having a second at least one exposed surface, the second at least one exposed surface having a second at least one metallic plating layer deposited thereon.

In accordance with an even further aspect of the disclosure, the cluster of vanes may include at least one shroud. The at least one shroud may be formed from a third at least one polymeric substrate having a third at least one exposed surface. The third at least one exposed surface may have a third at least one metallic plating layer deposited thereon.

In accordance with another aspect of the disclosure, a method of fabricating a compressor component for a gas turbine engine. The method entails forming at least one polymeric substrate in a desired shape of the compressor component. Another step may be depositing at least one metallic plating layer on at least one exposed surface of the at least one polymeric substrate.

In accordance with yet another aspect of the disclosure, the desired shape may be one of an intermediate case and a high pressure compressor case.

In accordance with still yet another aspect of the disclosure, the desired shape may be an integrally bladed rotor.

In accordance with an even further aspect of the disclosure, the desired shape may be a plurality of compressor vanes.

Other aspects and features of the disclosed systems and methods will be appreciated from reading the attached detailed description in conjunction with the included drawing figures. Moreover, selected aspects and features of one example embodiment may be combined with various selected aspects and features of other example embodiments.

BRIEF DESCRIPTION OF THE DRAWINGS

FIG. 20 is a sectional view of a disclosed instrument probe that may be fabricated from a plated polymeric substrate in accordance with this disclosure.

FIG. 21 is a sectional view of a plated polymeric substrate.

FIG. 22 is a partial side view of a low-pressure compressor stage that may be fabricated from a plated polymeric substrate in accordance with this disclosure.

FIG. 23 is a side view of a polymeric substrate selectively plated with a metallic layer that provides a grounding strip.

DESCRIPTION

Figure 1:
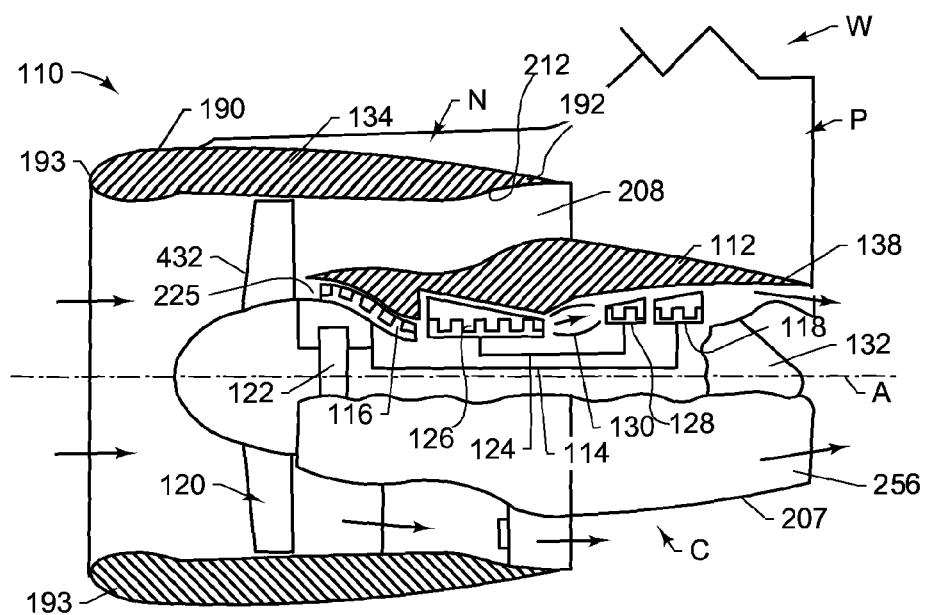
FIG. 1 is a sectional view of a gas turbine engine.
Figure 6:
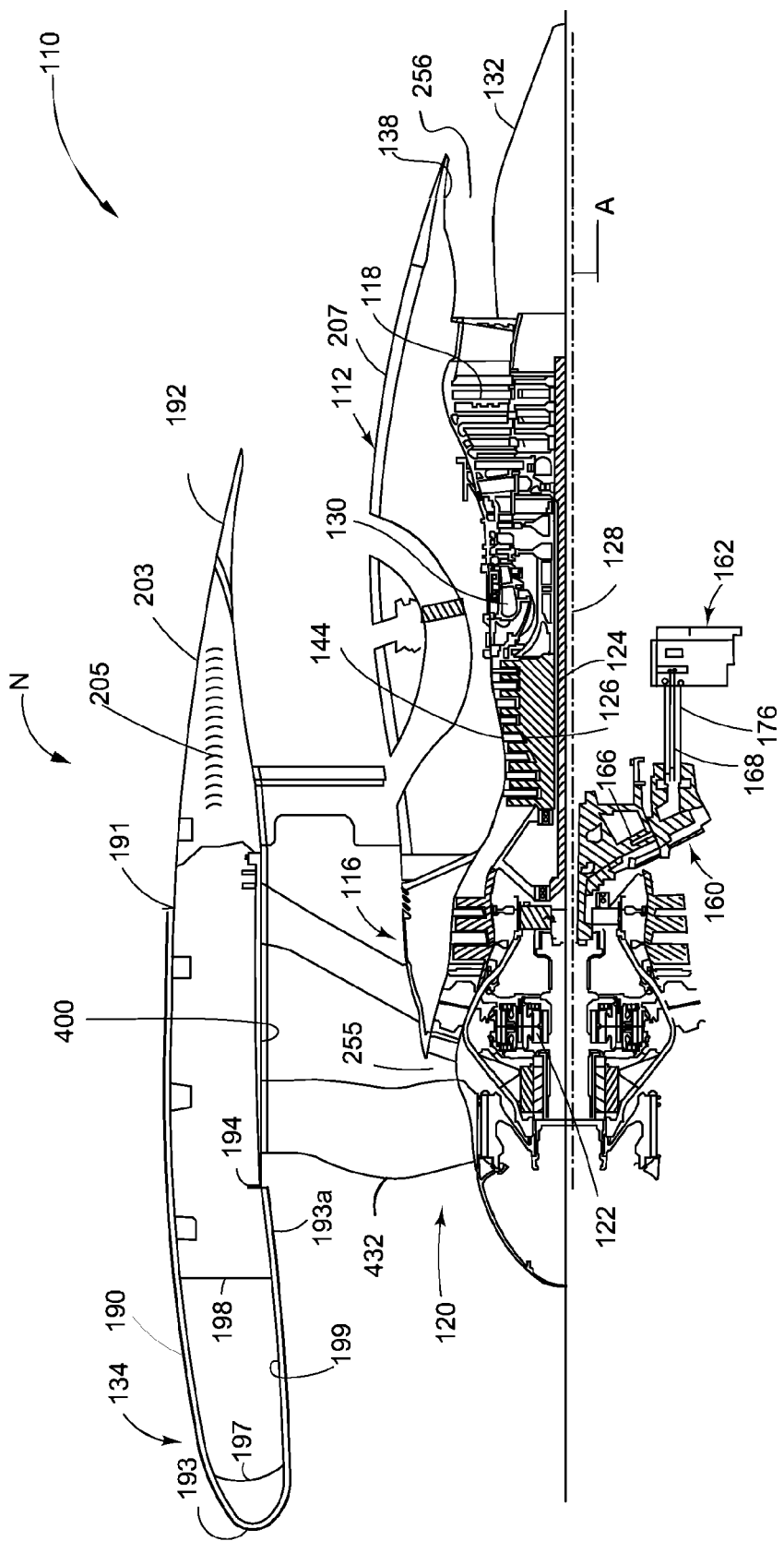
FIG. 6 is another sectional view of a gas turbine engine.

FIGS. 1 and 6 are partial schematic views of a gas turbine engine 110 suspended from an engine pylon P within an engine nacelle assembly N, which is typical of an aircraft designed for subsonic flight. The engine pylon P or other support structure is typically mounted to an aircraft wing W, however, the engine pylon P may alternatively extend from other aircraft structure such as an aircraft empennage or tail assembly.

The gas turbine engine 110 may include a core engine C within a core nacelle 112 that houses a low-pressure spool 114 and a high-pressure spool 124. The low-pressure spool 114 may include a low-pressure compressor 116 and low pressure turbine 118. The low-pressure spool 114 may be coupled to drive a fan 120 either directly or through a gear train 122. The high-pressure spool 124 may include a high-pressure compressor 126 and a high-pressure turbine 128. A combustor 130 may be arranged between the high-pressure compressor 126 and the high-pressure turbine 128. The low and high-pressure spools 114 and 124 may rotate about an engine axis A.

The engine 110 may be a high-bypass geared architecture aircraft engine. Airflow enters a fan nacelle 134, which at least partially surrounds the core nacelle 112. The fan 120 communicates airflow into the core nacelle 112 to power the low-pressure compressor 116 and the high-pressure compressor 126. Core airflow compressed by the low-pressure compressor 116 and the high-pressure compressor 126 is mixed with the fuel in the combustor 130 and expanded over the high-pressure turbine 128 and low-pressure turbine 118. The turbines 128 and 118 are coupled to the spools 124 and 114 to rotationally drive the compressors 126 and 116, respectively, and the fan section 120 through the optional gear train 122. A core engine exhaust exits the core nacelle 112 through a core nozzle 138 disposed between the core nacelle 112 and the tail cone 132.

Figure 2:
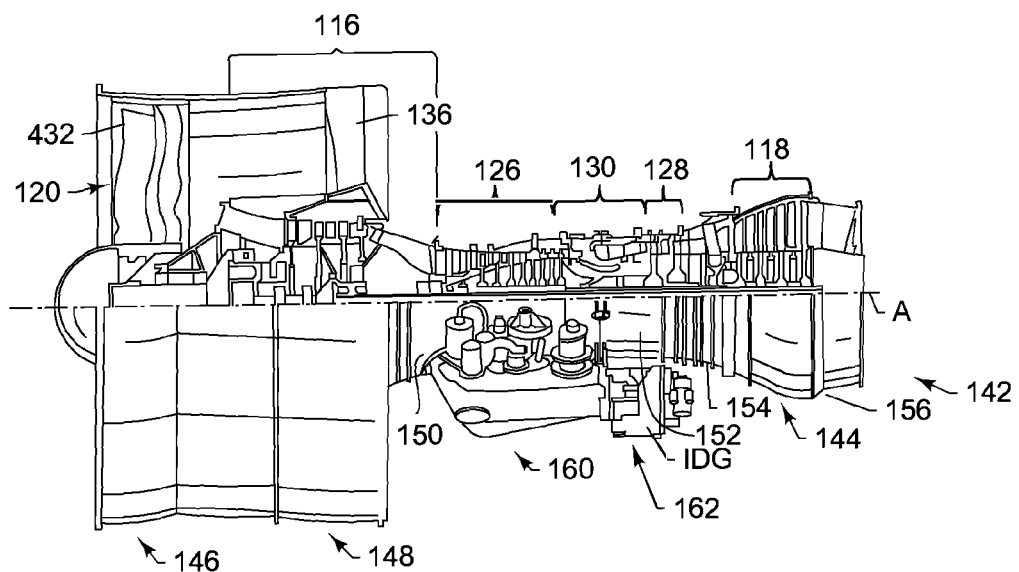
FIG. 2 is a partial sectional view of a gas turbine engine illustrating an engine static structure case arrangement on the lower half thereof with an accessory system mounted thereto.

Containment Cases and Other Structural Components Made from Plated Polymeric Substrates Referring to FIG. 2, engine static structure 142 includes sub-structures such as a core engine case structure 144 often referred to as the "engine backbone." The engine case structure 144 may include a fan case 146, an intermediate case (IMC) 148, a high-pressure compressor case 150, a diffuser case 152, a low-pressure turbine case 154, and a turbine exhaust case 156. The core engine case structure 144 may be secured to the fan case 146 at the IMC 148, which includes a multiple of circumferentially spaced radially extending fan exit guide vanes (FEGVs) 136.

Because it does not experience high operating temperatures, the fan case 146 may be fabricated from one or more shaped polymer articles, each in the form of a reinforced polymeric substrate that has been coated with one or more metallic layers. Suitable thermoplastic materials may include, but are not limited to: polyetherimide (PEI), polyimide, polyether ether ketone (PEEK), polyether ketone ketone (PEKK), polysulfone, polyamide, polyphenylene sulfide, polyester, polyimide, and combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), and combinations thereof. Optionally, the polymeric material of the polymeric substrate 52 may be structurally reinforced with materials that may include carbon, metal, or glass. The fiber-reinforced polymeric substrate may be molded or may include a plurality of layers to form a composite layup structure.

Figure 7:
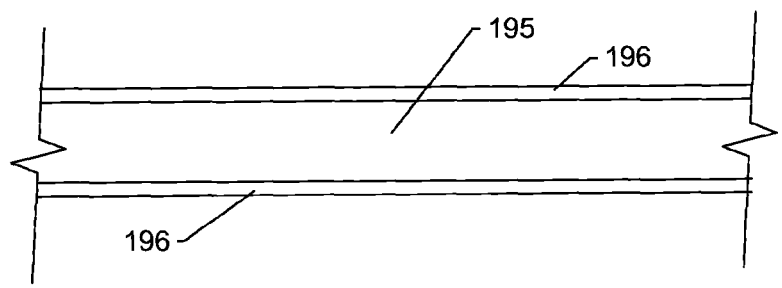
FIG. 7 is a partial sectional view of a disclosed structure that includes a polymeric substrate plated with one or more metallic layers.

An exemplary case 146 may include a metallic layer 196 plated onto the polymeric substrate 195 as shown in FIG. 7. The substrate 195 may be a fiber-reinforced resin (continuous or discontinuous). Either woven or non-woven fibers may be used, such as continuous unidirectional fiber/tape, woven fabric, discontinuous long fiber, or chopped material.

A polymeric substrate 195 may be molded into a desired shape. One or more metallic layers 196 may be deposited onto the polymeric substrate 195 to form a part for a gas turbine engine, such as a fan case 146. As will be apparent to those skilled in the art, other parts may be fabricated using this technique as well. The metallic layer(s) 196 may be applied by electroless plating, electroplating, or electroforming with a thickness ranging from about 0.01 inches (0.254 mm) to about 0.5 inches (12.7 mm). This thickness range may provide sufficient resistance to wear and impact and/or provide sufficient material for post machining to meet tight tolerance requirements.

The plated metallic layer(s) 196 may include one or more layers. The plating may consist of one or more metals selected from nickel, cobalt, copper, iron, gold, silver, palladium, rhodium, chromium, zinc, tin, cadmium, and alloys with any of the foregoing elements comprising at least 50 wt. % of the alloy, and combinations thereof. Plating may be performed in multiple steps by masking certain areas of the molded article to yield different thicknesses or no plating in certain areas. A customized plating thickness profile can also be achieved by tailored racking (including shields, thieves, conformal anodes, etc.). Tailored racking allows for an optimization of properties for the case 146 with respect to heat resistance, structural support, surface characteristics, etc. without adding undue weight to the case to accommodate each of these properties individually. Thus, plating thicknesses may be tailored to the structural requirements of the case 146. In addition, a thicker plated metallic layer allows for more aggressive machining, finishing, etc. to achieve the desired surface roughness, tolerances, etc. in certain locations of the case 146. Use of a multi-step process allows for optimization of cover properties, with respect to fire, structural support, surface characteristics, etc. without adding undue weight to the case 146.

Some mounting features (e.g., flanges, bosses, mounting holes, integral fittings) may be bonded to the molded polymer article using a suitable adhesive after molding but before plating. Further, the polymeric substrate can be fabricated in multiple segments that are joined by any conventional process (e.g., by welding, adhesive, mitered joint with or without adhesive, etc.) before plating. Furthermore, molded composite articles may be produced and plated separately and subsequently bonded by transient liquid phase (TLP) bonding. In addition, features such as bosses or inserts may be added (using an adhesive, riveting, etc.) to the plated structure after the plating has been carried out. The polymeric substrate may have a thickness ranging from about 0.05 inches (1.27 mm) to about 2 inches (50.8 mm)

Layshaft Covers

Referring to FIG. 6, an accessory gearbox 160 is mounted to the case structure 144 generally parallel to the engine axis A. The accessory gearbox 160 takes advantage of the significant axial area within the core nacelle C (FIG. 1) to support an engine accessory system 162 which may include accessory components (ACs) such as an air turbine starter (ATS), a deoiler (D), a hydraulic pump (HP), an oil pump (OP), an integrated drive generator (IDG), a permanent magnet alternator (PMA), a fuel pump module (FPM). It should be understood, that any number and type of accessory components AC might alternatively or additionally be provided.

The gearbox 160 houses a gear system that couples a towershaft 166 to a layshaft 168. The layshaft 168 is disposed within a layshaft cover 176, which is a cylindrical or tubular structure as shown in FIG. 6. The cover 176 may be fabricated from a shaped polymer substrate 195 that is plated with one or more metal layers 196 as shown in FIG. 7. For strength, it may be advantageous to form the shaped polymer substrate with a composite layup structure. The polymeric material may selected from the group consisting of: polyetherimide (PEI), polyimide, polyether ether ketone (PEEK), polyether ketone ketone (PEKK), polysulfone, polyamide, polyphenylene sulfide, polyester, polyimide, and combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), and combinations thereof. Optionally, the polymeric substrate 195 may be structurally reinforced with materials that may include carbon, metal, or glass. The fiber-reinforced polymeric substrate 195 may be molded or may include a plurality of layers to form a composite layup structure.

A composite layup structure may be compression molded into a desired shape to form a shaped composite article that will serve as a substrate. One or more metallic layers may be deposited onto the composite shaped article to form a part, such as a layshaft cover 176. As will be apparent to those skilled in the art, other parts may be fabricated using this technique as well. The metallic layer(s) may be applied by electroless plating, electroplating, or electroforming with a thickness ranging from about 0.004 inches (0.102 mm) to about 0.05 inches (1.27 mm). This thickness range may provide sufficient resistance to wear and impact and/or provide sufficient material for post machining to meet tight tolerance requirements. As noted above, the plated metallic layer(s) may include one or more layers.

Plating may be performed in multiple steps by masking certain areas of the molded article to yield different thicknesses or no plating in certain areas. A customized plating thickness profile can also be achieved by tailored racking (including shields, thieves, conformal anodes, etc.). Tailored racking allows for an optimization of properties for the part or layshaft cover 176 with respect to heat resistance, structural support, surface characteristics, etc. without adding undue weight to the layshaft cover 176 to accommodate each of these properties individually. Thus, plating thicknesses may be tailored to the structural requirements of the layshaft cover 176.

For example, a thicker plated metallic layer can be provided on the one side of the cover 176 for structural integrity during a fire. In addition, a thicker plated metallic layer allows for more aggressive machining, finishing, etc. to achieve the desired surface roughness, tolerances, etc. in certain locations of the cover 176. Use of a multi-step process allows for optimization of cover properties, with respect to fire, structural support, surface characteristics, etc. without adding undue weight to the cover 176.

Some mounting features (e.g., flanges, bosses, mounting holes, integral fittings) may be bonded to the molded composite article using a suitable adhesive after molding but before plating. Further, the shaped polymer or composite article can be fabricated in multiple segments that are joined by any conventional process (e.g., by welding, adhesive, mitered joint with or without adhesive, etc.) before plating. Furthermore, molded composite articles may be produced and plated separately and subsequently bonded by transient liquid phase (TLP) bonding. In addition, features such as bosses or inserts may be added (using an adhesive, riveting, etc.) to the plated structure after the plating has been carried out. When the shaped polymer article is formed from a composite material and is to be used as a substrate to be plated for use as a part like a layshaft cover 176, the molded composite article may have a thickness ranging from about 0.05 inches (0.127 mm) to about 2 inches (50.8 mm).

For some parts with complex geometries and/or that are large, multi-piece mold toolings are required because the molded part cannot be reliably released from a single mold. Thus, to fabricate tooling for such a part with complex geometry and/or that is large, the part may be divided into a plurality of segments, which may be coupled. Possible weak points caused by the joining of two segments together may be overcome by joining the two segments using one or more joints in combination with an adhesive that remains within the joint so that the adhesive is not exposed or "visible" to a subsequent plating process. The types of joints that may be suitable for coupling two such polymer segments together include mitered joints, angled joints, angled-mitered joints, welded joints, mitered joints with low-angle boundaries, mitered joints with accommodation channels for accommodating extra adhesive, welded joints with a cover, slot-type attachments with or without an additional fastener, and others as will be apparent to those skilled in the art.

Types of welded joints may include, but are not limited to ultrasonic, laser, friction, friction-stir, and traditional welded joints. Adhesive may also be used to couple the substrates or shaped polymer articles together. Then, the joined segments are plated using one of the plating methods described above. By plating one or more layers over the joint and over the outer surfaces of two segments, possible structural weak points created by the coupling of the two segments can be avoided. Suitable adhesives include epoxy-based adhesives in liquid, paste, or film form, with long-term service temperatures of up to 121° C. (250° F.), and bismaleimide-based adhesives with service temperatures up to 177° C. (350° F., in paste or film form). In addition, cyanoacrylates and polyurethanes could be used in certain situations, depending upon the strength and rigidity requirements.

The plating material and thickness may be selected such that a structural analysis would indicate that the plated metallic layer 196 will take the majority of the loads that the part experiences. Furthermore, geometric features are optionally added into the design to mitigate any weakness caused by joining segments together prior to plating.

Portions of the metallic layer(s) 196 may be purposefully weakened (or the polymeric substrate can be masked before plating) to provide paths for outgassing and expansion of the polymeric substrate during a fire. As will be apparent to those skilled in the art, such weakened portions should not reside near areas of the part that are significantly stressed and such weakened portions may be masked areas, scored lines, one or more large holes, smaller holes, etc. to provide appropriate redirection of thermally induced stresses and strains away from critical load paths.

Selective Plating of Fanblades to Customize Properties

Figure 3:
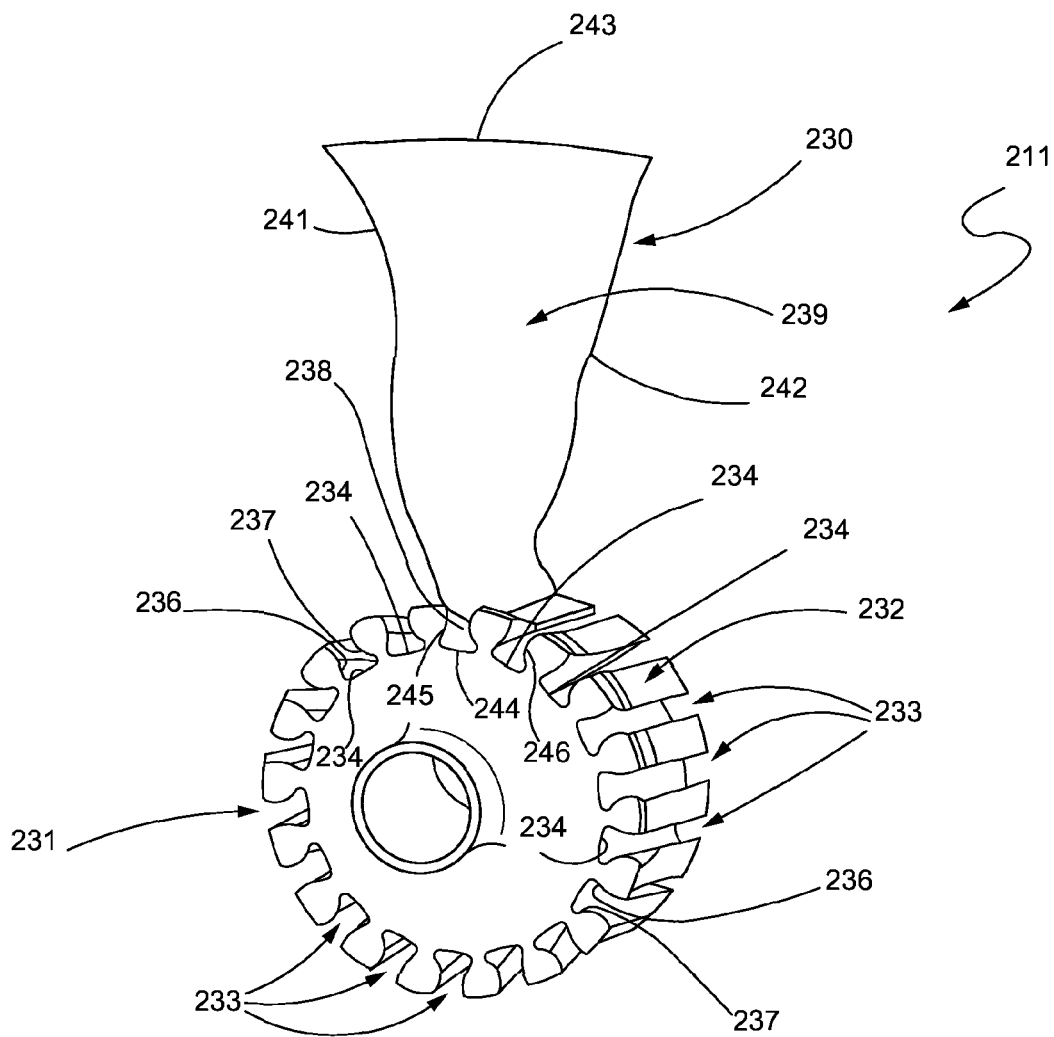
FIG. 3 is a perspective view of a disc-shaped hub equipped with a plurality of dovetail-shaped slots that extend through an outer periphery of the hub and a single fan blade with a dovetail-shaped root that has been received in one of the dovetail-shaped slots of the hub.

Turning to FIG. 3 a fan blade assembly 211 may include a plurality of fan blades 230 mounted to a disc-shaped hub 231. More specifically, the disc-shaped hub 231 may include an outer periphery through which a plurality of dovetail-shaped slots 233 extend. The dovetail-shaped slots 233 may each include inner surfaces 234. The inner surfaces 234 may each be disposed between inwardly slanted walls 236 and 237 that extend inwardly towards each other as they extend radially outwardly from their respective inner surfaces 234. As also shown in FIG. 3, the dovetail-shaped slots 233 may each accommodate a dovetail-shaped root 238 of a fan blade 230. The dovetail-shaped root 238 may be connected to a blade 239 that includes a leading edge 241 and a trailing edge 242. The leading and trailing edges 241 and 242, respectively, may be disposed on either side of the blade tip 243.

Figure 4:
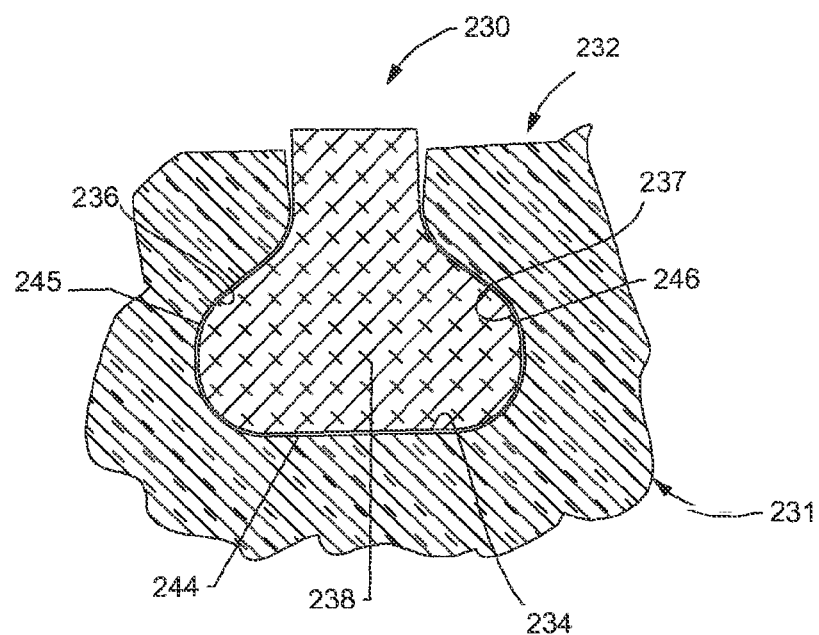
FIG. 4 is a cross-sectional view of a portion of a prior art fan blade root, showing wear and damage typical to conventional designs.

As shown in FIG. 4, the dovetail-shaped root 238 may include an inner face 244 that may be disposed between and connected to inwardly slanted pressure faces 245 and 246. The pressure faces 245, 246 may each engage the inwardly slanted walls 236 and 237, respectively, of their respective dovetail-shaped slot 233.

Figure 5:
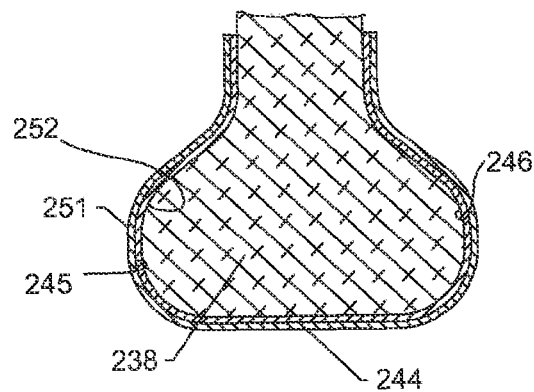
FIG. 5 is an enlarged partial cross-section of a fan blade root.

As shown in FIGS. 4-5 and explained above, the pressure faces 245 and 246 may undergo significant wear due to their engagement with the slanted walls 236 and 237, respectively, of the hub 231. To alleviate this situation, the dovetail-shaped root 238 may be selectively plated to produce resistance to wear, environmental factors, etc. The disclosed method may be applied to fan blades 230 made from a variety of materials (e.g., metals, polymers, composites, and ceramics). One or more metallic layers 251 and 252 may be applied to the root 238 by electroless plating, electroplating, or electroforming to local thicknesses ranging from about 0.0005 to about 0.015 inches (from about 12.7 microns to about 381 microns). More specifically, the metallic layers 251 and 252 may be applied to any one or more of the pressure faces 245 and 246, the inner face 244, radially inward portions of the airfoil 239, and combinations thereof as shown in FIG. 5.

Thus, improved fan blades are disclosed that may be fabricated from a variety of materials including metals, polymers, polymeric composites, and ceramics. The strength of the roots of such fan blades may be enhanced by selectively plating at least part of the fan blade root, especially at the pressure faces, as discussed above. Plated molded thermoplastic or composite airfoils, airfoil clusters, and inlet guide vane assemblies offer cost and weight savings compared to traditional metal components.

Airfoil Clusters

Turning to FIG. 1, an aircraft gas turbine engine 110 may be divided into two sections: the cold section and the hot section. The cold section includes the inlet air duct 255, the compressor(s) 116, 126 and the diffuser (not shown), which is disposed upstream of and connected to the combustor 130. The hot section includes the combustor 130, the turbine(s) 128, 118 and the exhaust passageway 256.

Figure 14:
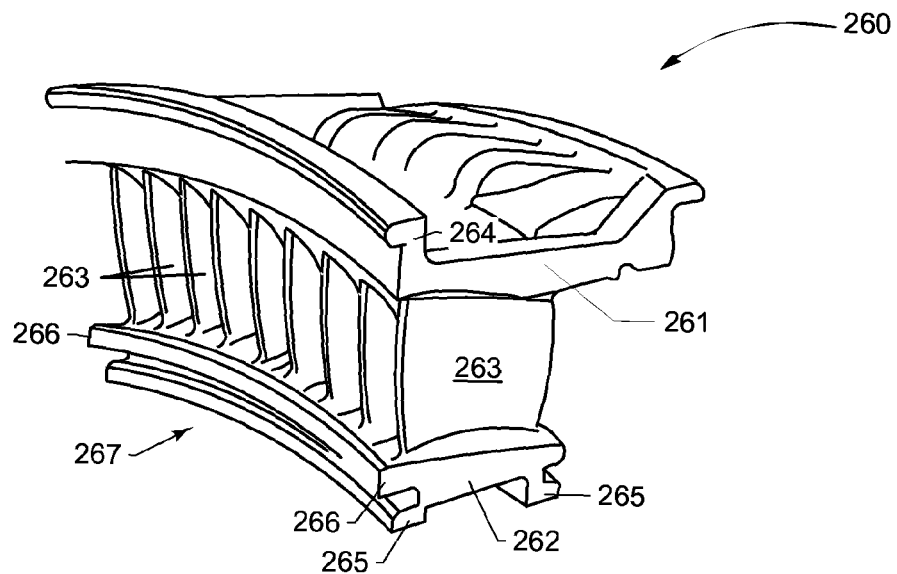
FIG. 14 is a partial perspective view of a compressor airfoil cluster that may be fabricated from a plated polymeric substrate in accordance with this disclosure.

The compressor(s) 116, 126 each include airfoils or airfoil clusters as shown in FIG. 14. Referring to FIG. 14, a vane cluster 260 for a compressor 116, 126 includes a radially outer shroud 261, a radially inner shroud 262 and two or more airfoils 263 extending radially between the shrouds 261, 262. Hooks 264 at the axial extremities of the outer shroud 261 facilitate its attachment to an engine case, not shown. Feet 265 at the axial extremities of the inner shroud 262 accommodate an inner air seal, also not shown. The cluster 260 extends circumferentially between lateral extremities 266. When several such clusters 260 are installed in a gas turbine engine 110 (FIG. 2), the shrouds 261, 262 define the radially inner and outer boundaries of a portion of an annular fluid flow path 267. The flow path 267 circumscribes the engine axis A (FIG. 1). A typical vane cluster 260 may be a hand layed-up, compression molded, and two-dimensional laminate of a graphite-epoxy material system. However, this manufacturing process tends to be rather complex (e.g., ply orientations have to be tightly and repeatably controlled, and are applied manually).

A disclosed airfoil cluster 260 may be formed from a polymeric substrate 195 and at least one plated metallic layer 196 as shown in FIG. 7. The exemplary substrate 195 may be an injection-molded or compression molded article formed from at least one material selected from the group consisting of: Suitable thermoplastic materials may include, but are not limited to: polyetherimide (PEI), polyimide, polyether ether ketone (PEEK), polyether ketone ketone (PEKK), polysulfone, polyamide, polyphenylene sulfide, polyester, polyimide, and combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), and combinations thereof. Optionally, the polymeric material of the polymeric substrate 195 may be structurally reinforced with materials that may include carbon, metal, or glass. The fiber-reinforced polymeric substrate 195 may be molded or may include a plurality of layers to form a composite layup structure.

The plated metallic layer 196 may include one or more layers. The plated metallic layer 196 may be applied by electroless plating, electroplating, or electroforming to a thickness ranging from about 0.001 to about 0.05 inches (from about 25.4 to about 1270 microns), locally. The average plating thickness may range from about 0.004 to about 0.025 inches (from about 101.6 to about 635 microns). Thicknesses within these ranges provide resistance to erosion, impact, FOD, etc. and the option to finish more aggressively to meet tight tolerances, surface finish requirements, etc. The plated metallic layer 196 may include any number of metals or alloys including, but not limited to, The plating may consist of one or more metals selected from nickel, cobalt, copper, iron, gold, silver, palladium, rhodium, chromium, zinc, tin, cadmium, and alloys with any of the foregoing elements comprising at least 50 wt. % of the alloy, and combinations thereof.

Plating may be performed in two steps by masking certain areas of the airfoil cluster to yield different thicknesses in areas of interest, such as the cluster platforms. This customized plating thickness profile can also be achieved by tailored racking (includes shields, thieves, etc.). In addition, a thicker plated metallic layer allows for more aggressive machining, finishing, etc. to achieve the desired surface roughness, tolerances, etc. This multi-step process allows for optimization of airfoil cluster properties, with respect to fire, structural support, surface characteristics, etc. without adding undue weight to the part to completely accommodate each of these properties.

More broadly, the airfoil cluster 260 can be fabricated in multiple segments that are joined by any conventional process (e.g., ultrasonic, laser, friction, friction-stir welding; traditional welding processes; adhesive; mitered joint with or without adhesive) before plating. Furthermore, the airfoils 263 and shrouds 261, 262 may be produced and plated separately and subsequently bonded by transient liquid phase (TLP) bonding.

Plated polymer parts offer cost and/or weight savings compared to traditional materials and processes. For example, plating provides built-in erosion protection and superior resistance to loads. Further, additional savings can be realized given the high-throughput of currently available molding and plating processes. Finally, complex geometries can be accommodated by producing the airfoil clusters 260 in multiple polymer segments and joining them together before plating.

Thus, airfoil clusters are disclosed that may be fabricated from a variety of materials including metals, polymers, polymer composites and ceramics. The strength of the shrouds of such airfoil clusters may be enhanced by selectively plating at least part of the airfoil cluster shrouds. Plated molded thermoplastic or composite airfoils, airfoil clusters and inlet guide vane assemblies offer cost and weight savings compared to traditional metal components.

Plated Polymer Airfoils

Hybrid airfoils for gas turbine engines are used to replace metal airfoils to reduce weight and manufacturing costs. For example, US20120082553 discloses an airfoil with a polymer core and an outer nanocrystalline metal shell that covers the polymer core and which defines an outer surface of the airfoil. The nanocrystalline metal shell has a thickness ranging from about 0.001 to about 0.125 inches (from about 25.4 to about 3175 microns). U.S. Pat. No. 4,815,940 discloses another hybrid airfoil having a graphite fiber-reinforced polyetherimide core covered by a very thin copper conductive layer that is covered by a nickel, cobalt or nickel-cobalt plated layer having a thickness ranging from about 0.002 to about 0.02 inches (from about 50.8 to about 508 microns). As the need to replace heavy metal parts with lighter composite and composite plated parts for gas turbine engines continues to exist, additional hybrid airfoil designs are needed.

Plated injection molded thermoplastic airfoils are disclosed that reduce manufacturing and operating costs of a gas turbine engine and that provide integral erosion and foreign object damage (FOD) resistance. Further, the plating can be locally varied in thickness to allow the airfoil structural properties to be tailored to the specific need. Further, the disclosed airfoils provide improved bond strength relative to the prior art because the plating contributes to the structural integrity of the airfoil versus being simply an erosion protection layer.

Figure 24:
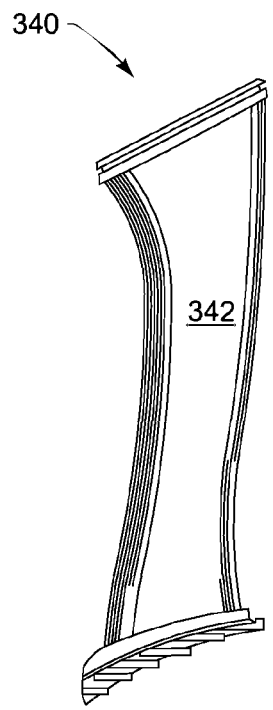
FIG. 24 is a perspective view of a disclosed airfoil that may be fabricated from a plated polymeric substrate in accordance with this disclosure.
Figure 25:
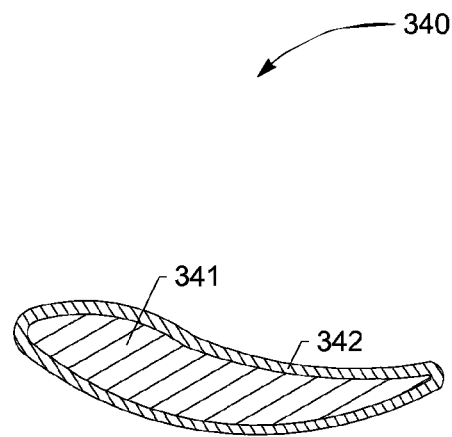
FIG. 25 is a sectional view of the airfoil of FIG. 24.

Turning to FIGS. 24-25, an exemplary airfoil 340 may include a polymeric substrate 341 and an outer metallic layer 342. The substrate 341 may be injection-molded or compression molded and formed from at least one of the following: polyetherimide (PEI), polyimide, polyether ether ketone (PEEK), polyether ketone ketone (PEKK), polysulfone, polyamide, polyphenylene sulfide, polyester, polyimide, and combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), and combinations thereof. Optionally, the polymeric material of the polymeric substrate may be structurally reinforced with materials that may include carbon, metal, or glass. The fiber-reinforced polymeric substrate may be molded or may include a plurality of layers to form a composite layup structure.

The metallic layer 342 may include one or more layers. The metallic layer(s) 342 may be applied by electroless plating, electroplating, or electroforming to a thickness ranging from about 0.001 to about 0.025 inches (from about 25.4 to about 635 microns), locally. An average plating thickness may range from about 0.003 to about 0.02 inches (from about 76.2 to about 508 microns). These thickness ranges provide resistance to erosion, impact, FOD, etc. and the option to finish more aggressively to meet tight tolerances, surface finish requirements, etc.

Thus, airfoils are disclosed that may be fabricated from a variety of materials including metals, polymers, polymer composites and ceramics. The strength of the roots of such airfoils may be enhanced by selectively plating at least part of the airfoil root, especially at the pressure faces, as discussed above. Plated molded thermoplastic or composite airfoils, airfoil clusters and inlet guide vane assemblies offer cost and weight savings compared to traditional metal components.

Inlet Guide Vanes

Figure 15:
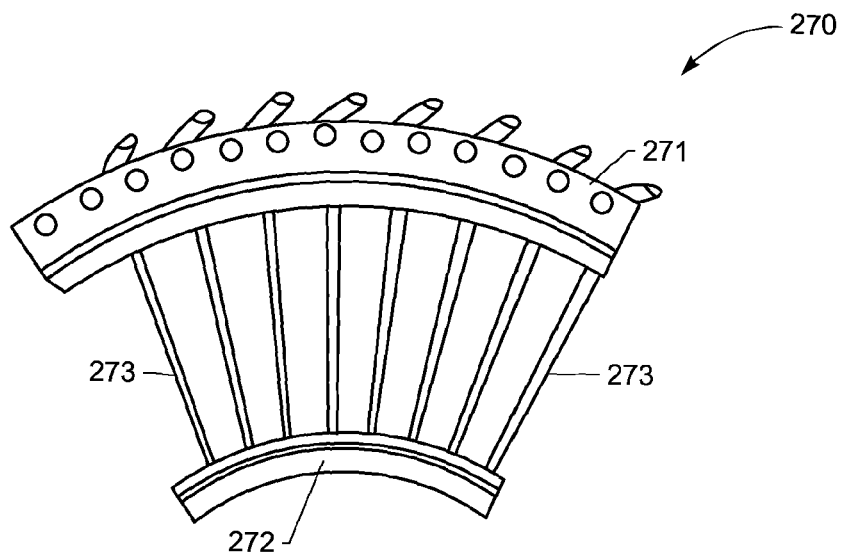
FIG. 15 is a partial plan view of a variable geometry radial guide vane assembly.

The inlet air duct 255 of the gas turbine engine 110 of FIG. 1 may include an inlet guide vane assembly 270 as shown in FIG. 15. The inlet guide vane assembly 270 may include an outer shroud 271, an inner shroud 272 and two or more vanes 273 extending radially between the shrouds 271, 272.

Similar to the airfoil cluster 260 discussed above, the disclosed inlet guide vane assembly 270 may be a hand layed-up, compression molded, two-dimensional laminate of a graphite-epoxy material system. As noted above, this manufacturing process tends to be rather complex (e.g., ply orientations have to be tightly and repeatably controlled, and are applied manually). Therefore, a disclosed inlet guide vane assembly 270 may be formed from a polymeric substrate 195 and at least one plated metallic layer 196 as shown in FIG. 7. The exemplary substrate 195 may be an injection-molded or compression molded article formed from at least one material selected from the group consisting of: may include, but are not limited to: polyetherimide (PEI), polyimide, polyether ether ketone (PEEK), polyether ketone ketone (PEKK), polysulfone, polyamide, polyphenylene sulfide, polyester, polyimide, and combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), and combinations thereof. Optionally, the polymeric material of the polymeric substrate 195 may be structurally reinforced with materials that may include carbon, metal, or glass.

Further, the substrate 195 may be a two-dimensional woven laminated composite that includes carbon fibers or glass fibers in combination with an epoxy resin or a similar matrix material. Metal inserts may be incorporated into the substrate 195 to enhance the load-carrying capability of the resultant structure.

The plated metallic layer 196 may include one or more layers. The plated metallic layer 196 may be applied by electroless plating, electroplating, or electroforming to a thickness ranging from about 0.001 to about 0.003 inches (from about 25.4 to about 762 microns), locally. The average plating thickness may range from about 0.003 to about 0.025 inches (from about 76.2 to about 635 microns). Thicknesses within these ranges provide resistance to erosion, impact, FOD, etc. and the option to finish more aggressively to meet tight tolerances, surface finish requirements, etc. The plated metallic layer 196 may include any number of metals or alloys including, but not limited to, nickel, cobalt, copper, iron, gold, silver, palladium, rhodium, chromium, zinc, tin, cadmium, and alloys with any of the foregoing elements comprising at least 50 wt. % of the alloy, and combinations thereof.

Plating may be performed in two steps by masking certain areas of the airfoil cluster to yield different thicknesses in areas of interest, such as the cluster platforms. This customized plating thickness profile can also be achieved by tailored racking (includes shields, thieves, etc.). In addition, a thicker plated metallic layer allows for more aggressive machining, finishing, etc. to achieve the desired surface roughness, tolerances, etc. This multi-step process allows for optimization of airfoil cluster properties, with respect to fire, structural support, surface characteristics, etc. without adding undue weight to the part to completely accommodate each of these properties.

More broadly, the inlet guide vane assembly 270 may be fabricated in multiple segments that are joined by any conventional process (e.g., ultrasonic, laser, friction, friction-stir welding; traditional welding processes; adhesive; mitered joint with or without adhesive) before plating. Furthermore, the vanes 273 and shrouds 271, 272 may be produced and plated separately and subsequently bonded by transient liquid phase (TLP) bonding.

Plated polymer parts offer cost and/or weight savings compared to traditional materials and processes. For example, plating provides built-in erosion protection and superior resistance to loads. Further, additional savings can be realized given the high-throughput of currently available molding and plating processes. Finally, complex geometries can be accommodated by producing the inlet guide vane assembly 270 in multiple polymer segments and joining them together before plating.

Thus, improved inlet guide vanes are also disclosed that may be fabricated from a variety of materials including metals, polymers, polymer composites and ceramics. The strength of the shrouds of such inlet guide vanes may be enhanced by selectively plating at least part of the shrouds. Plated molded thermoplastic or composite airfoils, airfoil clusters and inlet guide vane assemblies offer cost and weight savings compared to traditional metal components.

Radiation Heat-Resistant Metal Plated Polymer Components for Gas Turbine Engines Because of its lightweight and high specific strength, metal plated polymers (PP) may be used replace some metal materials in gas turbine engines. Currently available PP materials, however, are limited thermally by commonly employed polymeric substrates. For example, polyethyleneimine (PEI) is not recommended for use at temperatures exceeding 149° C. (300° F.), which may restrict its applications in gas turbine engines in certain areas of the engine, such as those areas that are in line-of-sight of a radiant heat source, e.g., the combustor.

However, highly polished metal plated polymer (PP) surface is proposed for use in gas turbine engines within line-of-sight of radiant heat sources. The highly polished plated metallic layer can significantly increase emissivity and thus reduce radiation heating to a component that is in line-of-radiation sight with a heat source. Thus, the disclosed PP materials may be highly polished to expand their use in gas turbine engines.

Thus, plated polymer articles and parts may be highly polished for purposes of reflecting radiant heat, such as radiant heat emitted from a combustor so that a plated polymer article, part or component may be disposed within line of sight of a radiant heat source. Further, plated polymer components may be highly polished for purposes of reducing drag, which is particularly applicable to aerospace applications.

Super-Polished Plated Polymer Articles

Components with very smooth surfaces are desirable in aerospace applications to reduce drag. However, metal components, which can be polished to a very low roughness, are heavy. On the other hand, while polymeric substrates are lightweight compared to a metal, polymeric substrates cannot be polished to a very small surface roughness to reduce drag. Coatings may be applied to a polymer article to reduce the surface roughness, but they cannot achieve the low surface roughness possible with metals.

A disclosed lightweight high-strength super-polished article may be created by applying typical polishing methods (i.e., grinding, lapping, honing, micromachining, etc.) to a plated polymer article. A disclosed polished article may include a polymeric substrate 195 and at least one metallic layer 196 as shown in FIG. 7. The polymeric substrate 195 may be an injection-molded, compression-molded, blow-molded, additively manufactured, or a composite-layup structure formed from at least one polymer selected from the group consisting of: polyetherimide (PEI); polyimide; polyether ether ketone (PEEK); polyether ketone ketone (PEKK); polysulfone; Nylon; polyphenylsulfide; polyester; and any of the foregoing with fiber reinforcement e.g., carbon-fiber or glass-fibers. An injection molded polymeric substrate may provide a wall thickness ranging from about 0.05 to about 0.25 inches (from about 1270 to about 6350 microns), with localized areas ranging up to about 0.5 inches (12.7 mm). On the other hand, a compression molded polymeric substrate may provide a wall thicknesses ranging from about 0.05 to about 2 inches (from about 1270 microns to about 50.8 mm).

The metallic layer(s) 196 may be applied by electroless plating, electroplating, or electroforming to a thickness ranging from about 0.001 to about 0.05 inches (from about 25.4 to about 1270 microns, locally. An average plating thickness may range from about 0.004 to about 0.04 inches (from about 101.6 to about 1016 microns. These thickness ranges may provide resistance to erosion, impact, FOD, etc. and provide the option to finish very aggressively to meet very tight tolerances, surface finish requirements, etc.

The metallic layer(s) 196 may be plated in multiple steps by masking certain areas of the polymeric substrate to yield different thicknesses (or no plating) in areas of interest. Such a customized plating thickness profile may also be achieved by tailored racking (including shields, thieves, conformal anodes, etc.). Such a multiple-step process may provide for optimization of properties for the polished article with respect to structural support, etc., without adding undue weight to the part.

Some mounting features (e.g., flanges or bosses) may be bonded on using a suitable adhesive after molding but before plating to simplify the mold tooling. The polished article may be fabricated in multiple segments that are joined by conventional processes (e.g., ultrasonic, laser, friction and friction-stir welding; traditional welding processes; adhesives; mitered joints with or without adhesive) before plating. The polished article may be produced in multiple components, plated separately and subsequently bonded by transient liquid phase (TLP) bonding. Features such as bosses or inserts may be added (using an adhesive, riveting, etc.) to the article after the plating process.

Thus, plated polymer articles and parts may be highly polished for purposes of reflecting radiant heat, such as radiant heat emitted from a combustor so that a plated polymer article, part or component may be disposed within line of sight of a radiant heat source. Further, plated polymer components may be highly polished for purposes of reducing drag, which is particularly applicable to aerospace applications.

Nacelle Assembly Components

Referring to FIG. 6, the nacelle assembly N presents a number of additional opportunities for weight reduction, and therefore a number of opportunities to incorporate plated polymer parts in accordance with this disclosure. Specifically, the fan nacelle 134 includes a forward segment 190 that may include an aft end 191 that may extend forward from a variable area fan nozzle 192 (VAFN) or thrust reverser doors 203 before defining an inlet 193 and fan inlet duct 193a, before terminating at its forward end 194. The forward segment 190 is a large component and, when made from a metal alloy using conventional techniques, is quite heavy. The forward segment 190 may be fabricated from a polymeric substrate, a fiber reinforced polymeric substrate or a composite layup structure as described above that may be plated with one or more metallic layers.

Referring to FIG. 7, an exemplary component of the fan nacelle 134 may include a polymeric substrate 195 and a metallic layer 196 that may cover both sides of the substrate 195. The substrate 195 may be an injection-molded, compression-molded, or composite layup piece formed of at least one of the following: polyetherimide (PEI), polyimide, polyether ether ketone (PEEK), polyether ketone ketone (PEKK), polysulfone, polyamide, polyphenylene sulfide, polyester, polyimide, and combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), and combinations thereof. Optionally, the polymeric material of the polymeric substrate 195 may be structurally reinforced with materials that may include carbon, metal, or glass. The fiber-reinforced polymeric substrate 195 may include a plurality of layers to form a composite layup structure.

The metallic layer 196 may include one or more layers. The metallic layer 196 may be applied by electroless plating, electroplating, or electroforming to a thickness ranging from about 0.001 to about 0.100 inches (from about 25 to about 2540 microns), which provides resistance to erosion, impact, foreign object damage, etc., and the option to finish aggressively to meet tight tolerances, surface finish requirements, etc. Plating may be performed in two steps by masking certain areas of the segment 190 to yield different thicknesses in areas of interest. Such a customized plating thickness profile can also be achieved by tailored racking (includes shields, thieves, anodes, etc.). In addition, a thicker plated metallic layer 196 allows for more aggressive machining, finishing, etc. to achieve the desired surface roughness, tolerances, etc. Such a multi-step process allows for optimization of the properties of the fan nacelle 134, with respect to fire, structural support, surface characteristics, etc. without adding undue weight to the segment 190.

The forward segment 190 of the fan nacelle 134 and/or fan inlet duct 193a may be fabricated in multiple segments that are joined by any conventional process (e.g., ultrasonic, laser, friction, friction-stir welding; traditional welding processes; adhesive; mitered joint with or without adhesive) before plating as discussed above. Furthermore, the forward segment 190 can be produced in multiple segments that are plated separately and subsequently bonded by transient liquid phase (TLP) bonding. The metallic layer(s) 196 of the forward segment 190 may be highly polished to achieve or promote a laminar flow profile around the nacelle 134.

In addition to the forward segment 190 and fan inlet duct 193a, other parts of the fan nacelle 134 or nacelle assembly N can be fabricated from a plated polymer structure. For example, the bulkheads 197, 198, fixed structure 199, thrust reverser doors 203 (only one of two doors being shown in FIG. 6), thrust reverser blocker doors 204 (only one of two being shown in FIG. 6), thrust reverser cascades 205, VAFN 192 (variable area fan nozzle) and inner cowl may also be fabricated from a polymeric substrate 195 that is coated with a metallic layer 196 as discussed above in connection with FIG. 7.

Figure 8:
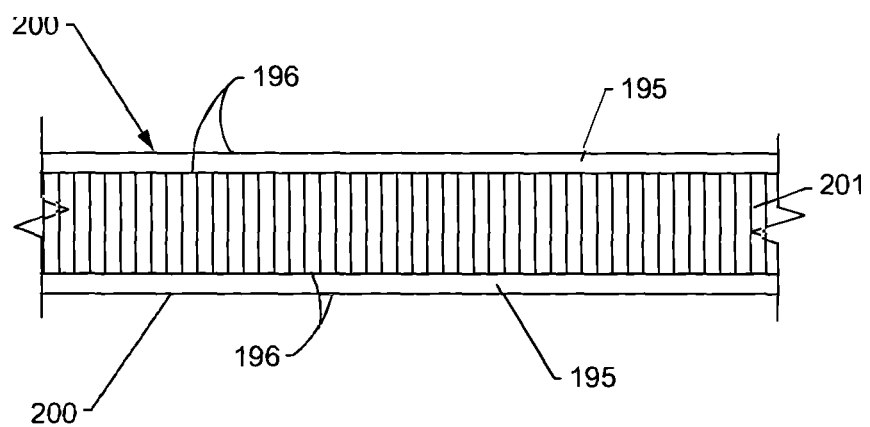
FIG. 8 is a partial sectional view of a disclosed sound attenuation structure that includes a honeycomb structure sandwiched between polymeric substrate layers.

As an alternative shown in FIG. 8, panels capable of sound attenuation may be fabricated from two plated polymeric substrates 200 prepared in accordance with the methods discussed above (i.e., a polymeric substrate 195 covered with a metallic layer(s) 196) and with a honeycomb layer 201 disposed. The honeycomb layer 201 may be fabricated from aluminum, an aluminum alloy or another suitable alloy as will be apparent to those skilled in the art. The structure of FIG. 8 may be employed for the fixed structure 199, blocker doors 204, the fan nacelle 134 and other components known to those skilled in the art where sound attenuation is desired.

Figure 9:
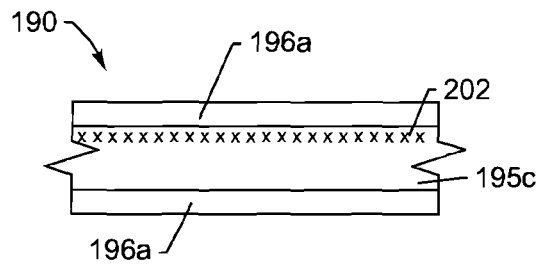
FIG. 9 is a partial sectional view of another disclosed structure that includes a polymeric substrate plated with one or more metallic layers and a heating element embedded in the polymeric substrate.
Figure 10:
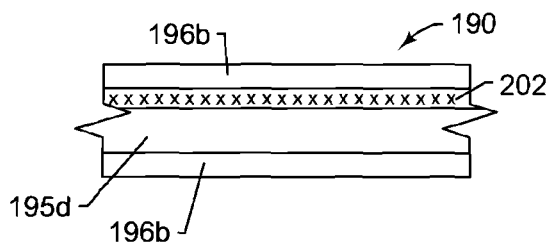
FIG. 10 is a partial sectional view of yet another disclosed structure that includes a polymeric substrate plated with one or more metallic layers and a heating element sandwiched between the polymeric substrate and the plated metallic layer(s).

As shown in FIGS. 9-10, a portion of the forward segment 190 disposed at or near the fan inlet 193 and/or fan inlet duct 193a (see FIGS. 6 and 13A-13B) may include a heating element in the form of a net or mat 202 that may be embedded in the substrate 195c just below the metallic layer 196a as shown in FIG. 9. As an alternative, a portion of the forward segment 190 disposed near the fan inlet 193 may include a heating element 202 that is sandwiched between the metallic layer 196b and the substrate 195d as shown in FIG. 10.

Fan Inlet Duct

The fan inlet duct 193a of the gas turbine engine 110 of FIG. 6 may be formed from a polymeric substrate 195 and at least one plated metallic layer 196 as shown in FIG. 7. The exemplary substrate 195 may be an injection-molded or compression molded article formed from at least one material selected from the group consisting of: polyetherimide (PEI), polyimide, polyether ether ketone (PEEK), polyether ketone ketone (PEKK), polysulfone, polyamide, polyphenylene sulfide, polyester, polyimide, and combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), and combinations thereof. Optionally, the polymeric material of the polymeric substrate 195 may be structurally reinforced with materials that may include carbon, metal, or glass. The fiber-reinforced polymeric substrate 195 may include a plurality of layers to form a composite layup structure.

Further, the substrate 195 may be a two-dimensional woven laminated composite that includes carbon fibers or glass fibers in combination with an epoxy resin or a similar matrix material. Metal inserts may be incorporated into the substrate 195 to enhance the load-carrying capability of the resultant structure.

The plated metallic layer 196 may include one or more layers. The plated metallic layer 196 may be applied by electroless plating, electroplating, or electroforming to a thickness ranging from about 0.001 to about 0.03 inches (from about 25.4 to about 762 microns), locally. The average plating thickness may range from about 0.003 to about 0.025 inches (from about 76.2 to about 635 microns). Thicknesses within these ranges provide resistance to erosion, impact, FOD, etc. and the option to finish more aggressively to meet tight tolerances, surface finish requirements, etc. The plated metallic layer 196 may consist of one or more metals including, but not limited to nickel, cobalt, copper, iron, gold, silver, palladium, rhodium, chromium, zinc, tin, cadmium, and alloys with any of the foregoing elements comprising at least 50 wt. % of the alloy, and combinations thereof.

Plating may be performed in two steps by masking certain areas of the airfoil cluster to yield different thicknesses in areas of interest, such as the cluster platforms. This customized plating thickness profile can also be achieved by tailored racking (includes shields, thieves, etc.). In addition, a thicker plated metallic layer allows for more aggressive machining, finishing, etc. to achieve the desired surface roughness, tolerances, etc. This multi-step process allows for optimization of airfoil cluster properties, with respect to fire, structural support, surface characteristics, etc. without adding undue weight to the duct.

More broadly, the fan inlet duct 193a may be fabricated in multiple segments that are joined by any conventional process (e.g., ultrasonic, laser, friction, friction-stir welding; traditional welding processes; adhesive; mitered joint with or without adhesive) before plating. Furthermore, components of the fan inlet duct 193a may be produced and plated separately and subsequently bonded by transient liquid phase (TLP) bonding.

Plated polymer parts offer cost and/or weight savings compared to traditional materials and processes. For example, plating provides built-in erosion protection and superior resistance to loads. Further, additional savings can be realized given the high-throughput of currently available molding and plating processes. Finally, complex geometries can be accommodated by producing the fan inlet duct 193a in multiple polymer segments and joining them together before plating.

Nacelle Bifurcaton—Outer Barrel of Core Nacelle and Inner Barrel of Fan Nacelle

Figure 11:
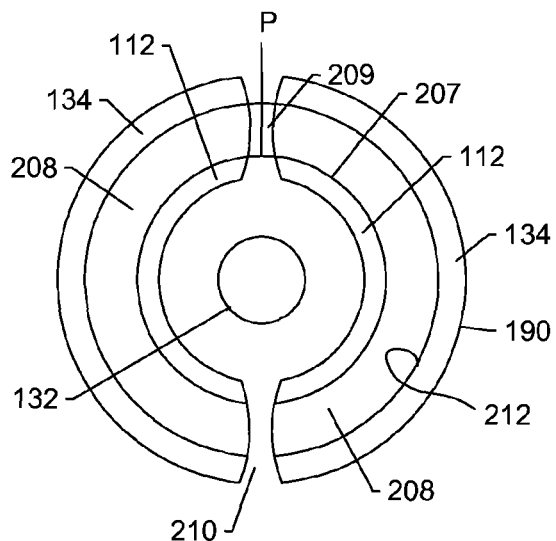
FIG. 11 is a sectional view of a gas turbine engine, particularly illustrating an exhaust tail cone disposed within a core nacelle that is disposed within a fan nacelle.

Turning to FIG. 1, a scheme for connecting the pylon P to the engine 110 is shown schematically. As shown in FIG. 11, the fan nacelle 134 and the core nacelle 112 may each include a pair of generally C-shaped segments that are pivotally coupled together at the pylon P so that the fan nacelle 134 and the core nacelle 112 collectively form two pivotally connected C-shaped ducts that define the bypass flow path 208. Those skilled in the art will appreciate that a multitude of mechanisms for connecting the engine 110 to the pylon P are available and still fall within the spirit and scope of this disclosure.

The pylon P connects the engine 110 to the wing W. During maintenance of the engine 110 or its accessories, the C-shaped ducts formed by the bifurcated fan nacelle 134 and core nacelle 112 may be pivoted open in a conventional manner. The pylon P is coupled to the fan nacelle 134 and core nacelle 112 through an upper bifurcation 209. A lower bifurcation 210 provides an opening for the passage of various types of equipment such as electrical lines, hydraulic lines, etc.

Figure 12:
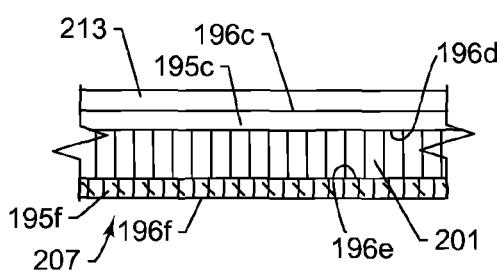
FIG. 12 is a partial sectional view of a sound attenuation panel that may be used for at least part of an inner barrel or an outer barrel of a nacelle, such as a core nacelle or a fan nacelle.

To reduce the weight of the fan nacelle 134 and/or core nacelle 112, at least part of the inner barrel 212 of the fan nacelle 134 and at least part of the outer barrel 207 of the core nacelle 112 may be fabricated using the disclosed plated polymeric substrates of FIG. 7 in combination with an aluminum honeycomb layer 201 as illustrated in FIG. 8. Referring to FIG. 12, the outer fixed structure 207 of the core nacelle 112 may include inner and outer polymeric substrates 195e, 195f respectively that are plated on either side with metallic layers 196c, 196d, 196e, 196f. The outer substrate 195f and its respective metallic layers 196e, 196f may be perforated which, in combination with the honeycomb structure 201, may provide sound attenuation properties. Further, the inner metallic layer 196c may be coated with an ablative coating 213 that faces the interior of the engine core C (FIG. 2) to prevent burn through.

The outer fixed structure 207 of the core nacelle 112 provides substantial weight and cost savings as compared to the prior art, which teaches a solid aluminum sheet inner wall that is thickly sprayed with an ablative coating. Similarly, the inner barrel 212 of the fan nacelle 134 may be fabricated using the structure shown in FIG. 12, without the ablative layer 213 or perforations in the outer plated polymer panel. The reduced weight of the polymeric substrates 195e, 195f, plus manufacturing advantages provided by the polymer make the structure shown in FIG. 12 attractive in terms of both cost and weight savings.

In addition, the sprayed ablative layer shown at 213 may be quite heavy and the thickness of the ablative layer is typically set by burn through testing. The burn through testing is made more difficult by the use of a solid aluminum inner wall, which is a very good heat conductor. Once the ablative is consumed, the aluminum wall conducts the heat to the honeycomb, which is typically glued in place. Once the glue fails, the honeycomb will rapidly disbond causing a structural failure. In contrast, the plated polymeric substrates 195e, 196f act as heat insulators that supplement the ablative coating 213, thereby contributing to the thermal isolation of the glue that holds the honeycomb layer 201 in place.

Fan Nacelle with Laminar Flow Characteristics and Integrated De-Icing Element

Figure 13B:
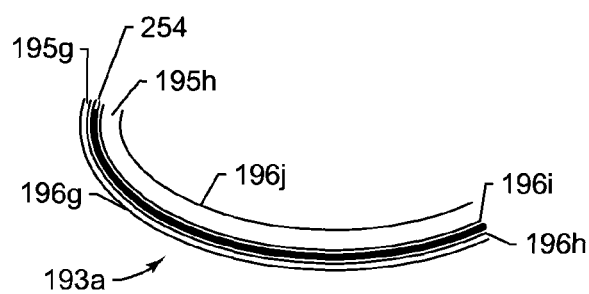
FIG. 13B is an enlarged partial sectional view of the fan nacelle inlet shown in FIG. 13A.
Figure 13A:
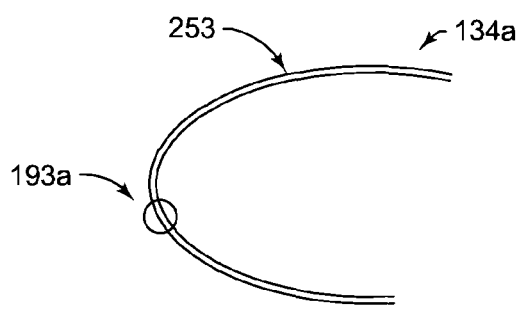
FIG. 13A is a partial sectional view of an inlet to fan nacelle that may be fabricated from a plated polymeric substrate in accordance with this disclosure.

Currently available aluminum inlets for fan nacelles cause turbulent flow of the air as it enters the fan, thereby dramatically increasing drag. To solve this problem, a plated polymer nacelle 134a is disclosed in FIGS. 13A-13B and that includes a mirror smooth finish to promote laminar flow over the outer barrel 253 of the nacelle 134a as well as the inlet 193a. The nacelle 134a may include outer and inner polymer layers 195g, 195h as shown in FIG. 13B. The outer and inner polymer layers 195g, 195h are plated with metallic layers 196g, 196h, 196i, 196j as shown in FIG. 13B. To provide for laminar flow through the inlet 193a, the outermost metallic layer 196g may be polished to mirror smoothness and the inlet 193a and/or outer barrel 253 may be secured in place without any fasteners at the outer surface. To provide for structural strength at the inlet 193a for bird strikes and other incidents, the inner polymer layer 195h may be thicker than the outer polymer layer 195g and/or the metallic layers 196i, 196j may be thicker than the metals layers 196g, 196h.

Currently available anti-icing systems are too hot for polymer structures and are usually made of aluminum—an inherently unfriendly surface for drag reduction through laminar flow. To avoid these problems, the inlet 193a may include a de-icing element in the form of a conducting layer 254. The conducting layer 254 may include graphite and may be flexible as well for ease of assembly. The conducting layer 254 may be in engagement with the metallic layer 196h that coats the outer polymer layer 195g. The thin outer polymer layer 195g and its respective plated metallic layers 196g, 196h may be used to conduct heat with minimal resistance.

Thus, plated polymers may also be used to construct fan nacelle inlets to promote laminar flow through the nacelle inlets for drag reduction as well as weight and cost reductions due to the various intricate shapes that are possible with the disclosed plated polymer systems. For example, a disclose fan nacelle inlet may be fabricated from a pair of plated polymers with a flexible conducting layer sandwiched therebetween. The outer metallic layer of the outer plated polymer may be polished to a mirror smoothness to promote laminar flow through the fan nacelle inlet. The conducting layer may be graphite and may be used for de-icing as the inner plated metallic layer of the outer plated polymer may be placed in contact with the conductive layer for purposed of conducting current and heat through the outer plated polymer of the fan nacelle inlet with minimal resistance.

Thin Structures with Tuned Natural Frequencies Achieved by Selective Plating

Mechanical and structural components, such as automobile parts and aircraft and/or gas turbine engine components are subject to vibration. Vibration generally has the undesirable effect of shortening the service life of a component and may result in part or component failures in a worst-case scenario. To mitigate these concerns, such components are often designed with sufficient mass and stiffness to withstand vibration. As a result, components are often designed to be heavier to shift modes of vibration outside of a critical service region. If a component may not be made with a thicker/heavier geometry, then a design or material change must be made to increase the mass or stiffness, which often leads to increased costs. Aerospace components (liners, vanes, stators, blades, etc.) also require controlled stiffness, high strength, and low weight. In addition, high fatigue life, impact resistance, load-carrying capability and erosion resistance is required. In the case of flight-critical components, expensive manufacturing methods are employed to ensure safety.

To alleviate these problems, a disclosed component may include a polymeric substrate and a plated metallic layer (or plated metallic layers on either side of the substrate). An exemplary substrate may be an injection-molded, compression-molded, or blow-molded component. Further, an exemplary substrate may be additive manufactured or it may be a composite-layup structure formed from at least one of the following: polyetherimide (PEI), polyimide, polyether ether ketone (PEEK), polyether ketone ketone (PEKK), polysulfone, polyamide, polyphenylene sulfide, polyester, polyimide, and combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), and combinations thereof. Optionally, the polymeric material of the polymeric substrate 195 may be structurally reinforced with materials that may include carbon, metal, or glass. The fiber-reinforced polymeric substrate 195 may include a plurality of layers to form a composite layup structure.

Such a composite-layup may be designed in concert with selective plating to achieve a desired overall vibration response. The plated metallic layer may include one or more layers. The plated metallic layer may be applied by electroless plating, electroplating, or electroforming and may have a thickness ranging from about 0.001 to about 0.05 inches (from about 25 to about 1270 microns). The average plating thickness may range from about 0.003 to about 0.002 inches (from about 76.2 to about 508 microns). This range of thickness may provide resistance to erosion, impact, foreign object damage (FOD), etc. and the option to finish more aggressively to meet tight tolerances, surface finish requirements, etc.

The plated metallic layer may include one or more layers as discussed above. Plating may be performed in multiple steps by masking certain areas to yield different thicknesses (or no plating) in areas of interest, resulting in a desired vibration response. This customized plating thickness profile can also be achieved by tailored racking (including shields, thieves, conformal anodes, etc.). This process additionally allows for optimization of properties for the selectively tuned component with respect to fire resistance, structural support, surface characteristics, etc., without adding undue weight to the component to completely accommodate each of these properties. A component may also be selectively plated in concert with perforations in order to act as a vibration dampener as in the case of an engine acoustical liner. Some mounting features (e.g., flanges or bosses) may be bonded on using a suitable adhesive after molding but before plating to simplify the mold tooling. Selectively tuned components may be fabricated in multiple segments that may be joined by conventional processes (e.g., ultrasonic, laser, friction, friction-stir welding; traditional welding processes; adhesives; mitered joints with or without adhesive, etc.) before plating as discussed above. Furthermore, the selectively tuned components can be produced and plated separately and subsequently bonded by transient liquid phase (TLP) bonding. In addition, features such as bosses or inserts may be added (using an adhesive, riveting, etc.) to the part after the plating process. Polymeric coatings can also be applied to plated polymer selectively tuned components to produce a lightweight, stiff, and strong polymer appearing (non-conductive) component. These coatings can be applied by conventional processes, such as spray coating or dip coating, and can be applied to localized regions only, if desired.

With respect to the molding processes, the polymeric substrate thickness can range from about 0.05 to about 0.25 inches (from about 1270 to about 6350 microns) using injection molding, with localized areas ranging up to about 0.5 inches (about 1.27 cm). On the other hand, compression molding can be used to form polymeric substrate thicknesses ranging up to about 2 inches (about 5.8 cm).

Components made from selectively plated polymeric substrates have the ability to control vibration, thereby increasing the useful service life of the component and to address any risk of component failure, which may, in turn, pose safety risks if the component is an automobile part or an aircraft and/or engine component. The disclosed selectively plated polymer components may address both primary factors of vibration—mass and stiffness variation—across a component. By leveraging this dual capability to address both the mass and stiffness factors, components may be fabricated with lower weights and/or costs. This is particularly desirable for aerospace components (liners, vanes, stators, blades, etc.) which require controlled stiffness, high strength, and low weight. Plated polymer components may provide cost and/or weight savings compared to traditional materials and processes. Schedule savings can be realized given the high-throughput molding and plating processes. Complex and/or large geometries can be accommodated by producing multiple polymer segments and joining the segments together before plating.

Ferro-Magnetic Plated Polymeric Substrates for Housing EMI and EMP Generating Systems Electromagnetic interference (EMI) and electromagnetic pulses (EMPs) may be generated by various electrical and electronic systems such as induction heads, full authority digital engine controls (FADECs), computers, radios, electrical actuators, etc. For example, radio frequency emitting induction heads with thermoplastic housings are used routinely with other sensitive equipment such as test machine load frames, linear variable displacement transducers (LVDTs), and extensometers used in fatigue and monotonic testing. Such induction heads encased in thermoplastic housings release EMI into the environment without any suppression, thereby increasing noise levels for nearby components, such as those listed above. Use of an induction head with a thermoplastic housing in conjunction with sensitive electronic and electrical equipment requires extensive grounding schemes to reduce interference and noise.

Previous induction heating systems incorporate a metal housing for the induction head. The metal housing suppresses the radio frequency emitted by the induction head by minimizing the electromagnetic interference. However, metal housings are heavy, thereby adding weight to the induction heating system. Further, ferrite foils have been used to suppress EMI, but ferrite foils are obviously not suitable for use in harsh environments where a sturdy housing is required.

As a solution to the problems noted above, plated polymer housings for induction heads, FADECs, computers, radios, electrical actuators, and other EMI or EMP generating systems. The housings or enclosures may be plated with a ferromagnetic material, i.e., a material that forms a permanent magnet or that is attracted to a magnet. Ferromagnetic materials that are suitable for plating polymers include nickel, iron, cobalt, and alloys thereof. Suitable alloys include, but are not limited to nickel-zinc alloys. Other suitable ferromagnetic alloys that may be plated onto a polymeric substrate will be apparent to those skilled in the art. The use of a ferromagnetic alloy as the plating metal enables the plated polymer housing to absorb and thereby significantly reduce or eliminate EMI and/or EMP disturbance to surrounding systems. Additionally, lightweight plated polymer or polymeric substrate housings or enclosures for electrical and electronic systems such as engine FADECs, computers, and electrical actuators may be used to provide significant weight reduction opportunities and protection to the systems within the plated polymer housings.

Further, plating polymer electronic and electrical housings with a ferro-magnetic plating metal will provide lightweight, low-cost EMP and EMI suppression by effectively creating a Faraday cage that isolates the systems or components disposed within the housing. Sealing features such as compression, blade, and spring fingers disposed at the housing faying surfaces or joints may also be plated to provide electrical continuity and EMP/EMI protection at the housing joints.

By plating thermoplastic or polymeric substrate housings with a thin ferromagnetic layer, noise suppression and/or protection may be obtained while low-cost, lightweight thermoplastic housings may still be used. Further, fabricating a component such as an induction head out of a ferrite material would be cost prohibitive and would not provide the durability needed for robust applications.

Cost-effective, robust, and lightweight ferromagnetic-plated thermoplastic or polymeric substrate housings or enclosures are disclosed. Such housings are useful for electronic and electrical systems that are sensitive to EMI and EMPs. Further, such housings are also useful for containing the EMI or EMPs of systems that emit radio frequencies and that may interfere with neighboring electronic or electrical systems. For example, induction heads of welding equipment may be housed or enclosed in the disclosed plated structures. Further, expensive metal housings for testing instrumentation may be replaced with the disclosed lower-cost, thermoplastic housings that are plated with EMI and EMP absorbing material. An added benefit of the disclosed structures is the enabling of higher instrument sensitivity and measurement accuracy because the disclosed housing structures suppress interfering noise from nearby systems that emit EMI and/or EMPs.

Piston Rods

Hydraulic or pneumatic power may be transferred to a load using a piston and rod assembly. Such piston and rod assemblies may vary in size, dependent on the amount of force required from the piston in order to perform the desired operation. Piston rods are generally made from a high strength metal. When choosing a high strength metal for a piston rod, a manufacturer often must choose between weight and cost. For example, using a lightweight metal such as titanium for a piston rod drastically increases the cost of the piston rod while keeping the weight of the rod low. Conversely, making a piston rod out of a conventional metal like plated steel or stainless steel adds significant weight to the piston rod but keeps the cost of the rod down. As a result, for weight-sensitive applications, e.g. aerospace, there is a need for piston rods that are both lightweight and cost-effective.

In satisfaction of this need, an exemplary lightweight plated polymer piston rod is disclosed. The disclosed rod may include a polymeric substrate and a metallic layer. The exemplary substrate may be an injection-molded, compression-molded, blow-molded, additively manufactured or composite-layup structure. The polymer may be selected from the group consisting of: polyetherimide (PEI), polyimide, polyether ether ketone (PEEK), polyether ketone ketone (PEKK), polysulfone, polyamide, polyphenylene sulfide, polyester, polyimide, and combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), and combinations thereof. Optionally, the polymeric material of the polymeric substrate 195 may be structurally reinforced with materials that may include carbon, metal, or glass. The fiber-reinforced polymeric substrate 195 may include a plurality of layers to form a composite layup structure.

The metallic layer 196 may include one or more layers. The metallic layer 196 may be applied by electroless plating, electroplating, or electroforming to a thickness ranging from about 0.001 to about 0.05 inches (from about 25.4 microns to about 1.27 mm), locally. The average plating thickness may range from about 0.004 to about 0.04 inches (from about 101.6 to about 1060 microns). However, in order to increase the strength of the rod, the plating layer thickness may be increased to any thickness necessary to support the additional strength requirements. The 0.004-0.04 inch thickness range may provide resistance to erosion, impact, FOD, etc., and the option to finish more aggressively to meet tight tolerances, surface finish requirements, etc. The plating layer may include one or more layers. Plating may be performed in multiple steps by masking certain areas of the rod to yield different thicknesses (or no plating) in areas of interest. This customized plating thickness profile can also be achieved by tailored racking (including shields, thieves, conformal anodes, etc.). This process also allows for optimization of properties for the disclosed piston rod with respect to fire resistance, structural support, surface characteristics, etc. without adding undue weight to the part to completely accommodate each of these properties.

To simplify mold tooling, mounting features (e.g., flanges or bosses) may be bonded to the rod after molding, but before plating, using a suitable adhesive. The disclosed lightweight plated polymer piston rod may be fabricated in multiple segments that are joined before plating by a conventional process, such as: ultrasonic, laser, friction or friction-stir welding; traditional welding processes; adhesives; mitered joints, with or without adhesive. Furthermore, the disclosed piston rod may be produced and plated separately and subsequently bonded by transient liquid phase (TLP) bonding. In addition, features such as bosses or inserts may be added (using an adhesive, riveting, etc.) to the part after the plating process.

An injection molded polymeric substrate may have a thickness ranging from about 0.05 to about 0.25 inches (from about 1270 to about 6350 microns), with localized areas ranging up to about 0.5 inches (about 12.7 mm). On the other hand, a compression molded polymeric substrate may be used to form wall thicknesses ranging from about 0.050 to about 2 inches (0.127 to about 5.08 cm). In an embodiment, the polymeric substrate for the piston rod could be hollow, and filled with high-density foam to increase the strength of the rod without adding substantially to the weight of the rod.

Figure 16:
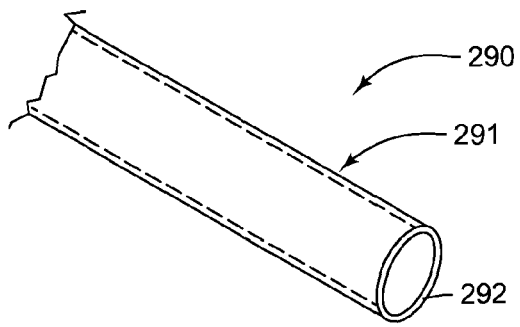
FIG. 16 is a partial perspective view of a disclosed piston rod formed from a polymer tube that is coated with one or more metallic layers (not shown in FIG. 16).
Figure 17:
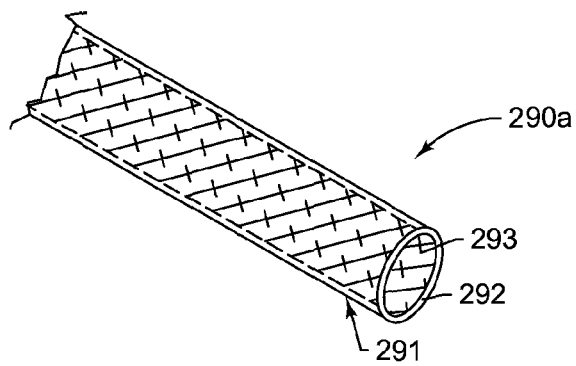
FIG. 17 is a partial perspective view of another disclosed piston rod formed from a polymer tube that is filled with a high density foam before being coated with one or more metallic layers (not shown in FIG. 17).
Figure 18:
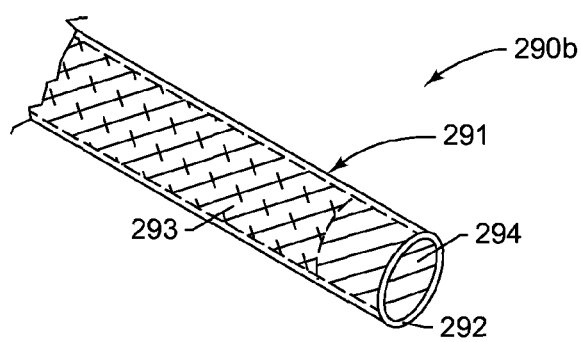
FIG. 18 is a partial perspective view of another disclosed piston rod formed from a polymer tube with metal end plugs, that is filled with a high density foam and that is coated with one or more metallic layers (not shown in FIG. 18).
Figure 19:
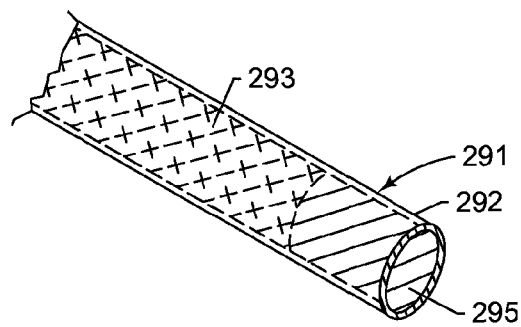
FIG. 19 is a partial perspective view of yet another disclosed piston rod formed from a polymer tube with metal end plugs, that is filled with a high density foam and that is coated with one or more metallic layers (not shown in FIG. 19).

Turning to FIG. 16, a piston rod 290 is disclosed that includes a polymer tube 291 with an open end 292 that may optionally be filled with high density foam prior to applying one of more metallic layers (not shown in FIG. 16). The thickness of metallic layer(s) may be increased in order to meet the strength requirements of the rod 290. For high weight-bearing rods, the polymer tube 291 may be thin-walled and filled with high-density foam 293 to increase strength while maintaining a low weight as illustrated in FIG. 17. One or more metallic layers (not shown) may cover the tube 291 and foam 293. FIGS. 18-19 illustrate piston rods 290b, 290c that include polymer tubes 291 that may be filled with a high density foam 293 and closed at the ends 292 with plugs 294, 295 respectively.

As shown in FIG. 18, the plug 294 may be fully received in the end 292 of the tube 291 and, as shown in FIG. 19, the plug 295 may be partially recessed into the tube 291. The electroplated or electroless deposited coatings may include, but are not limited to: nickel, cobalt, copper, iron, gold, silver, palladium, rhodium, chromium, zinc, tin, cadmium, and alloys with any of the foregoing elements comprising at least 50 wt. % of the alloy, and combinations thereof. Plating may be performed in multiple steps by masking certain areas of the molded article to yield different thicknesses or no plating in certain areas. A customized plating thickness profile can also be achieved by tailored racking (including shields, thieves, conformal anodes, etc.).

Disclosed piston rods may be formed from a polymeric substrate and one or more metallic layers. The polymeric substrate may be injection-molded, compression-molded, blow-molded or additively manufactured. The polymeric substrate may also be a composite layup structure with multiple layers. The polymeric substrate may be formed from at least one of the following: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. Optionally, the polymeric material of the polymeric substrate 195 may be structurally reinforced with materials that may include carbon, metal, or glass. The fiber-reinforced polymeric substrate 195 may include a plurality of layers to form a composite layup structure.

The metallic layer(s) 196 may be applied to the polymeric substrate by electroless plating, electroplating, or electroforming. The resultant instrument piston rods are strong, lightweight and may be manufactured using a variety of techniques with minimal lead-time.

Pump Housings

Pumps used for aircraft engines are typically enclosed in metal housings or enclosures. A pump typically includes one or more inlets and one or more outlets to control flow. The metal housings are heavy, thereby adversely affecting fuel consumption. As a result, there is a need for lightweight pump housings for use in aerospace and other applications where weight reduction is a goal.

Lightweight pump housings can be made from plated polymeric substrates wherein the outer plated metallic layer provides a durable and structural coating. As shown in FIG. 21, an exemplary pump housing may be fabricated from a polymeric substrate 311 and a metallic layer 312. The substrate 311 may be injection-molded, compression-molded, blow-molded, additively manufactured or a composite-layup structure. The substrate may be formed from at least one polymer selected from the group consisting of: polyetherimide (PEI); polyimide; polyether ether ketone (PEEK); polyether ketone ketone (PEKK); polysulfone; polyamide; polyphenylene sulfide; polyester; polyimide;

and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. Optionally, the polymeric material of the polymeric substrate 311 may be structurally reinforced with materials that may include carbon, metal, or glass. The fiber-reinforced polymeric substrate 311 may include a plurality of layers to form a composite layup structure.

The metallic layer 312 may include one or more layers. The metallic layer(s) 312 may be applied by electroless plating, electroplating, or electroforming to a thickness ranging from about 0.01 to about 0.09 inches (from about 254 microns to about 2.29 mm), locally. An average plating thickness may range from about 0.015 to about 0.08 inches (from about 381 microns to about 2.03 mm). These thickness ranges provide resistance to erosion, impact, FOD, etc. and the option to finish more aggressively to meet tight tolerances, surface finish requirements, etc. The metallic layer 312 may be applied in multiple steps by masking certain areas of the pump housing to yield different thicknesses (or no plating) in areas of interest. Such a customized plating thickness profile can also be achieved by tailored racking (including shields, thieves, conformal anodes, etc.). This process allows for optimization of properties for the pump housing with respect to fire resistance, structural support, surface characteristics, etc. without adding undue weight to the pump housing.

Some mounting features (e.g., flanges or bosses) may be bonded on using a suitable adhesive after molding but before plating to simplify the mold tooling. Further, the pump housing may be fabricated in multiple segments that are joined by any conventional process (e.g., ultrasonic, laser, friction and friction-stir welding processes; traditional welding processes; adhesives; mitered joints with or without adhesive) before plating. Furthermore, components of the pump housing may be produced and plated separately and subsequently bonded by transient liquid phase (TLP) bonding. In addition, features such as bosses or inserts may be added (using an adhesive, riveting, etc.) to the pump housing after the plating process. One or more polymeric coatings 314 may also be applied to plated polymer pump housing components to produce a lightweight, stiff, and strong polymer appearing (non-conductive) component. These coatings 314 may be applied by conventional processes, such as spray coating or dip coating.

Plated polymer pump housings offer cost and/or weight savings compared to traditional metal or thermoplastic pump housings. Further, plated polymer pump housings provide reduced manufacturing costs due to the high-throughput molding and plating processes used to fabricated the plated polymer pump housings. Pump housings with complex geometries can be accommodated by producing multiple polymer segments and joining the segments together before plating to simplify the mold tooling. Alternatively, the segments can be plated separately and subsequently joined using TLP.

Instrumentation Probes

Instrumentation probes may be utilized to locate and attach instrumentation needed to assess actual performance of an engine or device, e.g., a gas turbine engine. Instrumentation probes need to fit into limited available spaces and be physically attached in a stable and secure manner. Because instrumentation probes are used to troubleshoot problems associated with engines and devices that are in service, they often need to be fabricated within a relatively short lead-time.

Turning to FIG. 20, a disclosed instrumentation probe 300 may include a polymeric substrate 301 coated with one or more metallic layers 302. The polymeric substrate 301 may be an injection-molded, compression-molded, blow-molded or additively manufactured component. The polymeric substrate 301 may also be composite-layup structure with multiple layers shown schematically at 303. The polymeric substrate 301 may be formed from at least one of the following: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. The metallic layer(s) 302 may be applied by electroless plating, electroplating, or electroforming and may have a thickness ranging from about 0.0001 to about 0.03 inches (from about 2.54 to about 762 microns, locally. The average thickness of the metallic layer(s) 302 may range from about 0.001 to about 0.02 inches (from about 25.4 to about 508 microns). These thickness ranges provide resistance to erosion, impact, FOD, etc. and the option to finish more aggressively to meet tight tolerances, surface finish requirements, etc.

The metallic layer(s) 302 may be plated in multiple steps by masking certain areas of the polymeric substrate to yield different thicknesses (or no plating) in areas of interest. Such a customized plating thickness profile may also be achieved by tailored racking (including shields, thieves, conformal anodes, etc.). Tailored racking may allow for optimization of properties for the instrumentation probe 300 with respect to structural support, surface characteristics, etc. without adding undue weight to the probe 300.

Further, some mounting features (e.g., flanges or bosses) may be bonded to the polymeric substrate using a suitable adhesive after molding but before plating to simplify the mold tooling. More broadly, the instrumentation probe may be fabricated in multiple segments before plating that are joined by any conventional process (e.g., ultrasonic, laser, friction and friction-stir welding processes; traditional welding processes; adhesives; mitered joints with or without adhesives). Furthermore, the instrumentation probe 300 may be molded as separate segments, plated separately and the plated segments may be subsequently bonded by transient liquid phase (TLP) bonding. In addition, features such as bosses or inserts may be added (using an adhesive, riveting, etc.) to the plated polymeric substrate or probe after the plating process. One or more polymeric coatings 304 may also be applied to the plated polymer instrumentation probe 300 to provide a lightweight, stiff and strong probe with a polymeric coating 304 or appearance. Such polymeric coatings 304 may be applied by conventional processes, such as spray coating or dip coating, and may be applied to localized areas.

Thus, disclosed instrument probes may be formed from a polymeric substrate and one or more metallic layers. The polymeric substrate may be injection-molded, compression-molded, blow-molded or additively manufactured. The polymeric substrate may also be a composite layup structure with multiple layers of one or more polymeric materials recited above. The metallic layer(s) may be applied to the polymeric substrate by electroless plating, electroplating, or electroforming. The resultant instrument probes are strong, lightweight and may be manufactured using a variety of techniques with minimal lead-time.

Waveguides

A waveguide is a structure that guides energy, such as microwave, optical, electromagnetic, acoustic, etc. Some uses for waveguides include the transmission of power between components of a system. Waveguides are also used as a fundamental method of non-destructive testing. The geometry of the waveguide controls the effectiveness of the waveguide structure, and in some cases, the geometry of the waveguide may be complex. Further, many applications require waveguides to be lightweight, stiff and/or strong. For example, structural rigidity is needed as it partially controls the energy transmission efficiency of the waveguide. In addition, typically, low costs and manufacturability are primary concerns.

Turning to FIG. 21, one disclosed waveguide 310 may include a polymeric substrate 311 and one or more metallic layers 312. The polymeric substrate 311 may be injection-molded, compression-molded, blow-molded or additively manufactured. The polymeric substrate 311 may also be a composite layup structure with multiple layers shown schematically at 313. The polymeric substrate 311 may be formed from at least one of the following: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. The metallic layer(s) 312 may be applied to the polymeric substrate 311 by electroless plating, electroplating, or electroforming to a thickness ranging from about 0.001 to about 0.100 inches (from about 2.54 to about 2540 microns, locally. The average plating thickness may range from about 0.0005 to about 0.05 inches (from about 12.7 to about 1270 microns). These thicknesses provide resistance to erosion, impact, FOD, etc. and the option to finish more aggressively to meet tight tolerances, surface finish requirements, etc.

As noted above, the metallic layer(s) 312 may be plated in multiple steps by masking certain areas of the waveguide to yield different thicknesses (or no plating) in areas of interest. Such a customized plating thickness profile may also be achieved by tailored racking (including shields, thieves, conformal anodes, etc.). Tailored racking may be used to optimize propertied of the waveguide with respect to fire resistance, structural support, surface characteristics, etc., without adding undue weight to the part to the waveguide.

Some mounting features (e.g., flanges or bosses) may be bonded to the molded polymeric substrate 311 using a suitable adhesive after molding but before plating to simplify the mold tooling. Further, the waveguide 310 may be fabricated or molded in multiple segments that are joined after molding and before plating by a conventional process (e.g., ultrasonic, laser, friction or friction-stir welding processes; traditional welding processes; adhesives; mitered joints with or without adhesive, etc.). Furthermore, the polymeric substrate 311 may be molded as separate segments, plated separately and the plated polymer segments may be subsequently bonded by transient liquid phase (TLP) bonding. Features such as bosses or inserts may be added (using an adhesive, riveting, etc.) to the plated polymeric substrate 311 after the plating process. One or more polymeric coatings 314 may be applied to plated polymeric substrate or waveguide 310 to produce a lightweight, stiff, and strong waveguide 310 with a polymer appearance. Such polymeric coatings 314 may be applied by conventional processes, such as spray coating or dip coating, and can be applied to localized regions only, if desired.

With respect to the molding processes, an injection molded polymeric substrate 311 may have a thickness ranging from about 0.05 to about 0.25 inches (from about 1270 to about 6350 microns), with localized areas ranging up to about 0.5 inches (12.7 mm). On the other hand, a compression molded polymeric substrate 311 may be formed with a thicknesses ranging from about 0.05 to about 2 inches (from about 1270 microns to about 50.8 mm).

Disclosed waveguides may be formed from a polymeric substrate and one or more metallic layers. The polymeric substrate may be injection-molded, compression-molded, blow-molded or additively manufactured. The polymeric substrate may also be a composite layup structure with multiple layers. The polymeric substrate may be formed from at least one of the following: polyetherimide (PEI); polyimide; polyether ether ketone (PEEK); polyether ketone (PEKK); polysulfone; Nylon; polyphenylsulfide; polyester; and any of the foregoing with fiber reinforcement e.g., carbon-fiber or glass-fibers. The metallic layer(s) may be applied to the polymeric substrate by electroless plating, electroplating, or electroforming. The resultant waveguides are strong, lightweight and may be manufactured using a variety of techniques with minimal lead-time.

Heat Exchangers

Heat exchangers are currently produced using alloys with high thermal conductivity such as copper. Heat exchangers are also typically constructed in two major forms (plate fin or shell and tube). Modern heat exchangers must be assembled using techniques such as brazing, welding, or extrusion/press fit between mating parts. For aerospace, automotive and other payload sensitive applications, the weight of a heat exchanger assembly is a major design driver. Furthermore, joints and sealing surfaces between hot and cold sides of a heat exchanger are prone to leakage, which compromises the cooling effectiveness of the heat exchanger. Accordingly, methods for producing a lightweight, high cooling effectiveness heat exchanger would have significant utility and commercial value.

Disclosed herein are heat exchangers and components of heat exchangers made from plated polymeric substrates 310 or polymeric substrates 311 that are molded or otherwise formed into a desired shape before they are plated with one or more metallic layers 312 as shown in FIG. 21. Useful polymeric substrates 311 may be injection-molded, compression-molded, extrusion-molded or additive-manufactured. An injection molded polymeric substrate 311 may provide a wall thickness ranging from about 0.05 to about 0.25 inches (from about 1270 to about 6350 microns) with localized areas ranging up to about 0.5 inches (about 12.7 mm). On the other hand, a compression molded polymeric substrate 311 may provide a wall thickness ranging from about 0.05 to about 2 inches (from about 1.27 to about 50.8 mm). The polymeric substrates 311 may be fabricated using at least one polymer selected from the group consisting of: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides;

addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. Passages may be formed in the polymeric substrate(s) using conventional methods (e.g., washed-out mandrels, machining, etc.).

The metallic layer(s) 312 may be applied by electroless plating, electroplating, or electroforming to a thickness ranging from about 0.001 to about 0.03 inches (from about 25.4 to about 762 microns), locally. An average plating thickness may range from about 0.001 to about 0.02 inches (from about 25.4 to about 508 microns). These thickness ranges provide resistance to erosion, impact, FOD, etc., and the option to finish more aggressively to meet tight tolerances, surface finish requirements, etc. The metallic layer(s) may be plated in multiple steps by masking certain areas of the substrate 311 to yield different thicknesses in areas of interest. Such a customized plating thickness profile may also be achieved by tailored racking (including shields, thieves, conformal anodes, etc.). Further, a thicker metallic layer 312 allows for more aggressive machining, finishing, etc. to achieve the desired surface roughness, tolerances, etc. This multiple-step process allows for optimization of properties for the heat exchanger or heat exchanger component with respect to fire, structural support, surface characteristics, etc., without adding undue weight to the part.

Some mounting features (e.g., flanges, bosses, etc.) may be bonded to the polymeric substrate 311 using a suitable adhesive after molding, but before plating, to simplify the mold tooling. The plates, fins, shells, tubes, fittings and cover parts of a heat exchanger may be fabricated in multiple segments, which may be joined by conventional processes (e.g., ultrasonic, laser, friction and friction-stir welding processes; traditional welding processes; adhesives; mitered joints with or without adhesive) before plating. Because the metallic layer 312 is thick enough to provide significant structural strength and rigidity, the method of joining the segments of polymeric substrate 311 will likely not limit the strength of the finished component. Furthermore, the plates, fins, shells, tubes, fittings and cover parts may be molded, plated separately and subsequently bonded together by transient liquid phase (TLP) bonding. In addition, features such as bosses or inserts may be added (using an adhesive, riveting, etc.) to the component or assembly after the plating process.

Reduced-weight heat exchangers are disclosed that may be fabricated from plated polymers or plated polymeric substrates. The disclosed manufacturing methods provide flexibility in the design of heat exchangers, especially when using additive manufacturing to create the polymeric substrate(s). Manufacturing savings may be realized given the disclosed high-throughput molding and plating processes used to fabricated the disclosed heat exchangers. Complex geometries can be accommodated by producing multiple polymer segments and joining them together before plating.

LPC made from Plated Polyermic Substrates

Geared turbofan (GTF) engines and other advanced aero-engines could benefit from weight reducing technologies to improve overall engine fuel burn for flight cycles. Turning to FIG. 1, in a geared turbofan (GTF) engine 110, the low-pressure compressor (LPC) 116 assumes a greater percentage of the total work in compressing the engine core airflow than the high-pressure compressor (HPC) 126. The LPC 116 is also disposed opposite the combustor 130 from the HPC 126.

Plated polymers are disclosed herein for use in the manufacture of the LPC 116 that include a polymeric substrate 311 plated with one or more metallic layer 312 as shown in FIG. 21. Turning to FIG. 22, an individual stage 320 of the LPC 116 is partially shown. Each stage 320 includes a hub 321 connected to an airfoil 322. The airfoil 322 includes a leading end 323 and a trailing end 324. Each stage 320 may be manufactured separately and bonded together either before or after the polymeric substrate 311 is plated with one or more metallic layers 312. Alternatively, each stage 320 of the LPC 116 may be constructed separately and bound together using a tie shaft form of construction as illustrated in US20110219784. The polymeric substrate 311 may be selected based on the operating temperature expected for each stage of the flow path through the LPC 116. The downstream stages of the LPC 116 may require higher operating temperatures and therefore polymers such as polyimides may be used due to the proximity of the downstream stages to the combustor 130. In contrast, the upstream stages of the LPC 116 may be fabricated from polymers that are less sensitive to high operating temperatures because the upstream stages are farther away from the combustor 130. The polymeric substrates may also be strengthened via the introduction of continuous or discontinuous fiber reinforcements. In order to fully accommodate wear, strength, and durability requirements for each LPC stage 320, each stage 320 may be plated a metallic layer 312.

Useful polymeric substrates 311 may be injection-molded, compression-molded, extrusion-molded or additive-manufactured. An injection molded polymeric substrate 311 may provide a wall thickness ranging from about 0.05 to about 0.25 inches (from about 1270 to about 6350 microns), with localized areas ranging up to about 0.5 inches (about 12.7 mm). On the other hand, a compression molded polymeric substrate 311 may provide a wall thickness ranging from about 0.05 to about 2 inches (from about 1270 microns to about 50.8 mm). The polymeric substrates 311 may be fabricated using at least one polymer selected from the group consisting of: polyetherimide (PEI); polyimide; polyether ether ketone (PEEK); polyether ketone ketone (PEKK); polysulfone; Nylon; polyphenylsulfide; polyester; and any of the foregoing with fiber reinforcement e.g., carbon-fiber or glass-fibers. Passages may be formed in the polymeric substrate(s) using conventional methods (e.g., washed-out mandrels, machining, etc.).

The metallic layer 312 may be applied by electroplating, electroless plating, brush plating, spray metal deposition, or a powder spray metal process. The thickness of the metallic layer may range from about 0.005 to about 0.1 inches (from about 127 microns to about 2.54 mm). For relatively thick metallic layers 312, a secondary machining or abrasive grinding operation may be performed to shape the trailing edge 324 (FIG. 22) to a minimal practical thickness. Further, the metallic layer 312 need not be of a uniform thickness. For example, with respect to the vanes or airfoils 322 of the LPC 116, the metallic layer 312 may be thin in the forward or leading edge region 323 of the airfoil 322 and thicker in the trailing edge region or aft region 324 of the airfoil 322. The non-uniform thickness may be achieved by known processing techniques.

The metallic layer(s) 312 may be applied by electroless plating, electroplating or electroforming to a thickness ranging from about 0.001 to about 0.03 inches (from about 25.4 to about 762 microns), locally. An average plating thickness may range from about 0.001 to about 0.02 inches (from about 25.4 to about 508 microns). These thickness ranges provide resistance to erosion, impact, FOD, etc., and the option to finish more aggressively to meet tight tolerances, surface finish requirements, etc. The metallic layer(s) 312 may be plated in multiple steps by masking certain areas of the substrate 311 to yield different thicknesses in areas of interest. Such a customized plating thickness profile may also be achieved by tailored racking (including shields, thieves, conformal anodes, etc.). Further, a thicker metallic layer 312 allows for more aggressive machining, finishing, etc. to achieve the desired surface roughness, tolerances, etc. This multiple-step process allows for optimization of properties for the LPC stage 320 with respect to fire, structural support, surface characteristics, etc., without adding undue weight to the stage 320.

Some mounting features (e.g., flanges, bosses, etc.) may be bonded to the polymeric substrate 311 using a suitable adhesive after molding, but before plating, to simplify the mold tooling. As noted above, the stages 320 may be fabricated separately and in multiple segments, which may be joined by conventional processes (e.g., ultrasonic, laser, friction and friction-stir welding processes; traditional welding processes; adhesives; mitered joints with or without adhesive) before plating. Because the metallic layer 312 is thick enough to provide significant structural strength and rigidity, the method of joining the segments of polymeric substrate 311 will likely not limit the strength of the finished stage 320. In addition, features such as bosses or inserts may be added (using an adhesive, riveting, etc.) to the stage 320 or to the LPC 116 after the plating process.

The metallic layer 312 may be applied by electroplating, electroless plating, brush plating, spray metal deposition, or a powder spray metal process. The thickness of the metallic layer may range from about 0.005 to about 0.100 inches (from about 127 microns to about 2.54 mm). For relatively thick metallic layers 312, a secondary machining or abrasive grinding operation may be performed to shape the trailing edge 324 (FIG. 22) to a minimal practical thickness. Further, the metallic layer 312 need not be of a uniform thickness. For example, with respect to the vanes or airfoils 322 of the LPC 116, the metallic layer 312 may be thin in the forward or leading edge region 323 of the airfoil 322 and thicker in the trailing edge region or aft region 324 of the airfoil 322. The non-uniform thickness may be achieved by known processing techniques.

The techniques described herein will enable lighter LPC components for any gas turbine engine because current LPCs are made of aluminum. A plated polymer LPC or LPC component that is plated with higher hardness and toughness materials such as nickel will improve compressor durability, especially for GTF engines where higher percentages of total compression work is performed in the LPC.

Grounding Strips

Some aerospace components must have conductive paths to ground electricity that is induced by events such as lightning strikes. Static electricity may also be dissipated in this manner. While polymer and composite parts are being used to replace parts on airplanes to save weight, fuel and manufacturing costs, polymers and composites are not inherently conductive materials. Some such polymer, composite or otherwise non-conductive parts or components must include a conductive path for grounding purposes. Otherwise, a lightning strike or the build-up of static electricity can have serious detrimental consequences on non-grounded components made of these lightweight non-metal materials.

As a solution to this problem, a polymer component 330 is disclosed in FIG. 23 the includes a molded polymeric substrate 331 that is selectively plated with a metallic layer 332. The non-coated side 333 of the substrate 331 may be masked to limit the metallic layer 332 to the opposite side 334 of the substrate 331. As a result, a lightweight and low-cost grounding strip is provided by the metallic layer 332 for grounding the polymer component 330. Using the disclosed masking of polymer components 330, a customized grounding network may be produced to help optimize the component's grounding capability.

The exemplary polymeric substrate may be injection-molded, compression-molded, blow-molded, additively manufactured or a composite-layup structure. The polymeric substrate may be formed from at least one of the following polymers selected from the group consisting of: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof.

In addition to the selective surface plating approach described above, recesses or pockets can be machined in the polymeric substrate 331 or provided in the forming process (molding, build file) of the polymeric substrate 331 to provide for an even surface between the polymer and plating strips or metallic layers 332 to prevent increased drag or (increased) turbulence. The use of such recesses or pockets facilitates the masking of the polymeric substrate 331 for the plating process. The grounding strips or metallic layers 332 may include one or more metals including, but not limited to: nickel; cobalt; copper; iron; gold; silver; palladium; rhodium; chromium; zinc; tin; cadmium; and alloys with any of the foregoing elements comprising at least 50 wt. % of the alloy; and combinations thereof. Plating may be performed in multiple steps by masking certain areas of the molded article to yield different thicknesses or no plating in certain areas. A customized plating thickness profile can also be achieved by tailored racking (including shields, thieves, conformal anodes, etc.).

A lightweight solution to lightning-strike grounding is provided in the form of plated grounding strips on molded polymer components. The grounding strips may be selectively plated onto a molded polymer article or component by masking areas of the article. The selective plating process is applicable to composite nacelles and other components that could be fabricated from polymer or composite materials, such as fan blades, fan cases, guide vanes, splitters, etc.

Plated Polymer Ducts

In a gas turbine engine, ducting can be fabricated using a variety of processes, such as a composite layup or forming sheet metal to the desired shape using a combination of cutting, bending, welding, and/or stamping processes. These processes tend to be expensive and/or time consuming.

Figure 26:
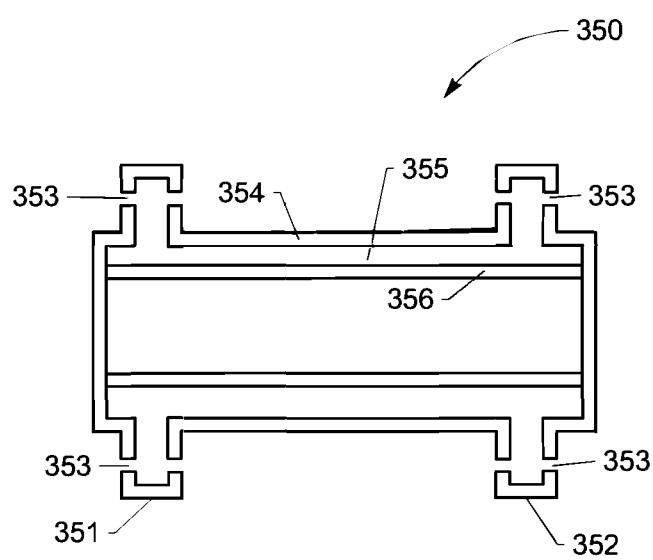
FIG. 26 is a sectional view of a disclosed duct that may be fabricated from a plated polymeric substrate in accordance with this disclosure.

Disclosed plated polymer ducts may include a polymeric substrate and a metallic layer that replaces either a sheet metal part or a composite layup baseline part. As shown in FIG. 26, a disclosed duct 350 extends from an inlet end formed at a flange 351 to an outlet end formed at a flange 352. One or both of the flanges 351, 352 may include mounting holes 353 as shown in FIG. 26. Additionally, the duct 350 may include ports and/or integral fittings and/or further mounting features that are not shown in FIG. 26.

The metallic layer 354 and the polymeric substrate 355 each may include one or more layers. The metallic layer 354 may be plated onto the polymer layer 355 in multiple steps by masking certain areas of the duct 350 to yield different thicknesses in areas of interest. For example, a thicker metallic layer 354 can be provided on the inside surface 356 or along the flow path of the duct 350 for structural integrity during an external fire. In addition, a thicker metallic layer 354 allows for more aggressive machining, finishing, etc. to achieve the desired surface roughness, tolerances, etc. This multi-step plating process allows for optimization of duct properties, with respect to fire, structural support, surface characteristics, etc. without adding undue weight to the duct 350.

The exemplary substrate 355 is injection-molded or compression molded and may be formed from at least one of the following: may include, but are not limited to: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. Optionally, the polymeric material of the polymeric substrate 195 may be structurally reinforced with materials that may include carbon, metal, or glass. The fiber-reinforced polymeric substrate 195 may include a plurality of layers to form a composite layup structure.

Some mounting features (e.g., flanges or bosses) may be bonded to the substrate 355 using a suitable adhesive after molding but before plating to simplify the mold tooling. Further, the duct 350 may be fabricated in multiple segments that are joined by any conventional process (e.g., ultrasonic, laser, friction or friction-stir welding processes; traditional welding processes; adhesives; mitered joints with or without adhesive) before plating. Because the metallic layer(s) 354 is thick enough to provide significant structural strength and rigidity, the method of joining segments will likely not be a strength limiter. In addition, features such as bosses or inserts may be added (using an adhesive, riveting, etc.) to the duct 350 after the plating process. Furthermore, the duct may be produced in a plurality of segments that are plated separately and subsequently bonded by transient liquid phase (TLP) bonding.

The polymeric substrate 355 may have a wall thickness ranging from about 0.05 to about 0.25 inches (from about 1.27 to about 6.35 mm), with localized areas ranging up to about 0.5 inches (12.7 mm) for injection-molded substrates 355. On the other hand, a compression-molded substrate 355 may have a wall thicknesses ranging from about 0.05 to about 2 inches (from about 1.27 to about 50.8 mm).

Portions of the metallic layer 354 may be purposefully weakened (or the polymeric substrate can be masked before plating) to provide paths for outgassing and expansion of the polymeric substrate 355 during a fire. These portions should not reside near areas of the duct 350 that are significantly stressed or that are stress concentrations and may be masked areas, scored lines, a few large holes, many smaller holes, etc. to provide appropriate redirection of thermally induced stresses and strains away from critical load paths.

The metallic layer 354 may be applied by electroless plating, electroplating, or electroforming to a thickness ranging from about 0.002 to about 1270 microns (from about 50.8 to about 1270 microns). The metallic layer 354 may be any one or more of: nickel; cobalt; copper; iron; gold; silver; palladium; rhodium; chromium; zinc; tin; cadmium; and alloys with any of the foregoing elements comprising at least 50 wt. % of the alloy; and combinations thereof. Plating may be performed in multiple steps by masking certain areas of the molded article to yield different thicknesses or no plating in certain areas. A customized plating thickness profile can also be achieved by tailored racking (including shields, thieves, conformal anodes, etc.).

Plated polymer ducts for gas turbine engines offer cost and/or weight savings compared to composite layup or sheet metal parts. Injection molding and plating processes provide faster and easier manufacturing of gas turbine engine ducts. Complex geometries can be accommodated by producing the ducts in multiple polymer segments and joining them together before or after plating.

Plated Polymer Fan Platforms

A fan platform is a rotating part that defines the flow path between fan blades during normal operation of a turbofan gas turbine engine. Fan platforms must maintain sufficient structural integrity after a bird strike or fan blade-out event to preserve the rotation of the fan blades of a fan blade assembly to meet minimum thrust and/or shutdown requirements as required by FAA regulations.

Figure 27:
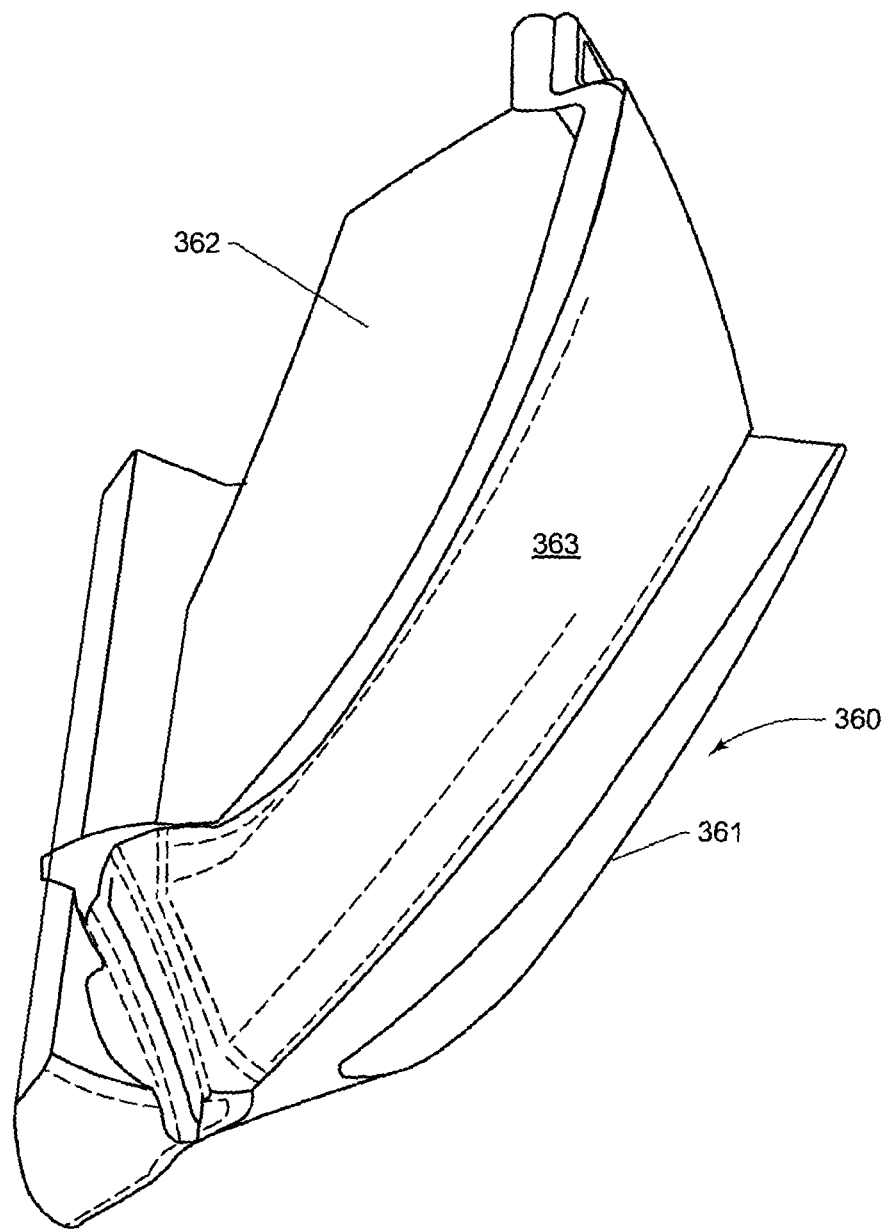
FIG. 27 is a perspective view of a fan platform that may be fabricated from a plated polymeric substrate in accordance with this disclosure.

Turning to FIG. 27, an exemplary fan platform 360 is shown that may be disposed between adjacent fan blades, one of which is shown in a truncated form at 361 in FIG. 27. Each fan platform 360 may include a body 362 that defines a radially outwardly flow path surface 363. The flow path surface 363 defines a substantially aerodynamic flow path surface for airflow between adjacent fan blades 361. The fan platform 360 may be formed from a polymeric substrate 311 that is at least partially coated with at least one metallic layer 312 as shown in FIG. 21. The fan platform 360 may replace prior art platforms that are fabricated from composite layup structures, aluminum, or titanium. The disclosed fan platform 360 may include integral fittings and/or mounting features. The metallic layer 312 may include one or more layers. Plating may be performed in multiple steps by masking certain areas of the platform 360 to yield different thicknesses in areas of interest. For example, a thicker metallic layer 312 on the inside of mounting features may provide structural integrity. In addition, a thicker metallic layer 312 allows for more aggressive machining, finishing, etc., to achieve the desired surface roughness, tolerances, etc. in certain locations of the platform 360. This multi-step plating process allows for optimization of platform properties with respect to structural support, surface characteristics, etc. without adding undue weight to the platform 360.

The exemplary substrate 311 may be injection-molded or compression molded and may be formed of at least one polymer selected from the group consisting of: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. Optionally, the polymeric material of the polymeric substrate 311 may be structurally reinforced with materials that may include carbon, metal, or glass. The fiber-reinforced polymeric substrate 311 may include a plurality of layers to form a composite layup structure.

Some mounting features (e.g., flanges or bosses) may be to the substrate 311 using suitable adhesives after molding but before plating to simplify the mold tooling. The platform may also be fabricated in multiple segments that are joined by a conventional process (e.g., ultrasonic, laser, friction and friction-stir welding processes; traditional welding processes; adhesives; mitered joints with or without adhesives) and before plating. It is possible to use a metallic layer 312 thick enough to provide significant structural strength and rigidity such that the method of joining segments will likely not be a strength limiter. Furthermore, the platform may be produced in a plurality of segments that are plated separately and subsequently bonded by transient liquid phase (TLP) bonding.

An injection molded polymeric substrate 311 may have a wall thickness ranging from about 0.05 inch (1.27 mm) to about 0.2 inches (5.08 mm). A compression-molded substrate 311 may have a wall thickness ranging from 0.05 inch (1.27 mm) to about 2 inches (5.08 cm). The metallic layer 312 may be applied by electroless plating, electroplating or electroforming to a thickness ranging from about 0.004 to about 0.025 inches (from about 102 to about 635 microns).

Plated polymer fan platforms may provide cost savings in comparison to fan platforms made from composite layup structures, aluminum, or titanium. The metallic layer 312 provides built-in erosion protection and structural integrity.

Plating as a Method of Forming Endwall Contours

End walls (platforms) of advanced gas turbine engine airfoils have three-dimensional (3D) contours in order to reduce vortex flow through the engine. 3D contoured end walls are difficult and costly to fabricate.

Figure 28:
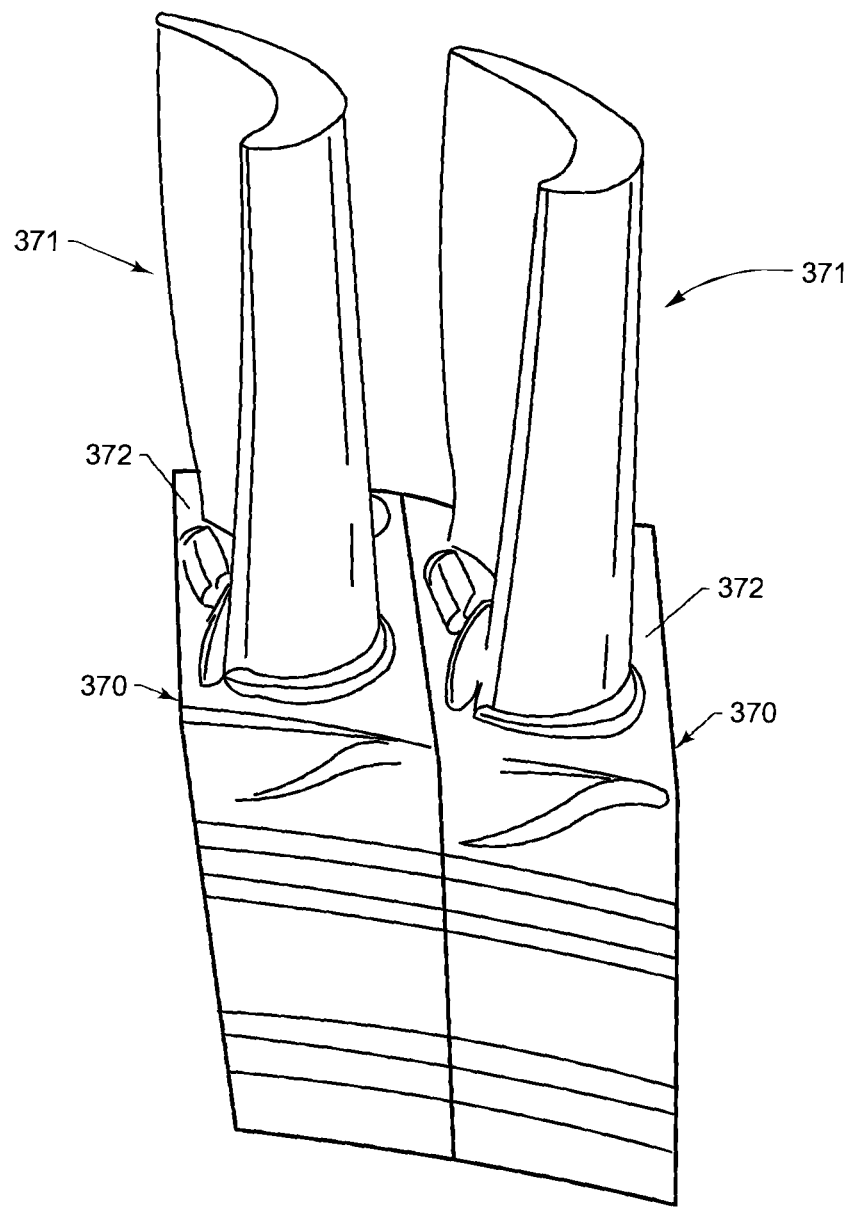
FIG. 28 is a perspective view of gas flow directing members, each in the form of an airfoil supported by a platform having a three-dimensional polymeric substrate plated with one or more polished metallic layers in accordance with this disclosure.

As shown in FIG. 28, rotating airfoils 371 are supported on platforms 370. Each platform 370 includes a radially outwardly facing end wall 372. The end walls 372 may be three-dimensional or contoured, which makes them difficult and costly to manufacture. To address this problem, the plating technology disclosed herein provides the ability to produce metal plated polymer layers of variable thicknesses. Referring to FIGS. 21 and 28, the disclosed technology allows selectively thicker and thinner regions of the plated metallic layer(s) 312 over the surface of the polymeric substrate 311 (FIG. 21) that, together with the metallic layer(s) 312 to form the end wall 372 (FIG. 28). The thickness of the metallic layer(s) 312 may be controlled by adjusting process parameters, adjusting plating racking and fixturing, and over plating the end wall followed by post-machining processes.

The thickness of the metallic layer(s) 312 may selectively be increased to form contours in the end wall 372 form a two-dimensional axisymmetric part. The method may include using traditional manufacturing technology, such as but not limited to, casting, forging, injection molding, compression molding, to create an airfoil end wall having no 3D contours (2D axisymmetric). The method may also include plating the 3D contours on top of the end wall 372 by way of selectively plating certain regions with a greater thickness than another region. The method may further include polishing the plated 3D contours to achieve desired final contour and flow path surface finish.

An exemplary polymeric substrate 311 may be injection-molded or compression molded and may include one or more polymers selected from the group consisting of: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof.

The metallic layer 312 may then be applied to the polymeric substrate 311 by methods including, but not limited to, electroless plating, electroplating, or electroforming. The metallic layer 311 may be any number of different metals or alloys including, but not limited to: nickel; cobalt; copper; iron; gold; silver; palladium; rhodium; chromium; zinc; tin; cadmium; and alloys with any of the foregoing elements comprising at least 50 wt. % of the alloy; and combinations thereof. Plating may be performed in multiple steps by masking certain areas of the molded article to yield different thicknesses or no plating in certain areas. A customized plating thickness profile can also be achieved by tailored racking (including shields, thieves, conformal anodes, etc.). The metallic layer 312 may be polished after plating to provide at least two benefits. First, a highly polished metallic layer 312 with have a high emissivity and therefore will be less subject to heating by radiant heat sources. Further, a highly polished metallic layer 312 will have improved smoothness, thereby promoting laminar flow and increased turbine and compressor efficiencies.

Thus, the disclosed plated polymer technology provides an affordable approach to forming 3D contours in platform end walls. Further, polishing the metallic layer surface increases emissivity and thus reduces heating of the platform by thermal radiation. A polished metallic layer surface also improves the gas flow path smoothness translating to gas turbine engine efficiency. A molded polymeric substrate and may be used as a fast, durable prototyping method to create 3D contours for end wall a similar 2D prototype, without the need for expensive hard tooling, or long lead time machining.

FADEC Housings

Full authority digital controls (FADECs) are used to house the engine control unit on aircraft engines. FADECs control all engine functions and communicate with the aircraft controls to ensure safe operation. FADEC housings are traditionally fabricated from aluminum castings, which are affordable but heavy. A lighter-weight more affordable FADEC (or any electrical control unit) housing could benefit any industry where weight versus payload and cost are design considerations (e.g., marine vehicle controls, automotive controls, etc.).

Referring to FIG. 21, an exemplary electrical control unit housing comprises a polymeric substrate 311 and a metallic layer 312. The exemplary substrate 311 may be injection-molded, compression-molded, blow-molded, additively manufactured or a composite layup structure formed from one or more of the following: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. Optionally, the polymeric material of the polymeric substrate 311 may be structurally reinforced with materials that may include carbon, metal, or glass. The fiber-reinforced polymeric substrate 311 may include a plurality of layers to form a composite layup structure. The polymeric substrate 311 may be fabricated around a suitable core to serve as an in situ mandrel and to provide the correct structural and electrical shielding characteristics for an electrical/electronic control unit.

The metallic layer(s) 312 may be applied by electroless plating, electroplating, or electroforming to a uniform thickness ranging from about 0.001 to about 0.05 inch (from about 25.4 microns to about 1.27 mm). The average plating thickness may range from about 0.003 to about 0.03 inches (from about 76.2 to about 762 microns). These thickness ranges provide resistance to wear, impact, FOD, etc. and the option to finish more aggressively to meet dimensional tolerances, surface finish requirements, etc. The metallic layer(s) 312 may be plated in multiple steps by masking certain areas of the electrical control unit housing to yield different thicknesses (or no plating) in areas of interest for performance or decorative purposes. Such a customized plating thickness profile can also be achieved by tailored racking (including shields, thieves, conformal anodes, etc.). Tailored racking permits for optimization of properties for the electrical control unit housing with respect to structural support, surface characteristics, etc. without adding undue weight to the housing. Further, the electrical control unit housing may be fabricated in multiple segments that are joined by conventional process (e.g., ultrasonic, laser, friction and friction-stir welding processes; traditional welding processes; adhesives; mitered joints with or without adhesives) before plating. Furthermore, the electrical control unit housing may be produced in a plurality of segments that are plated separately and subsequently bonded by transient liquid phase (TLP) bonding.

The metallic layer(s) 312 may include of one or more metals including, but not limited: to nickel; cobalt; copper; iron; gold; silver; palladium; rhodium; chromium; zinc; tin; cadmium; and alloys with any of the foregoing elements comprising at least 50 wt. % of the alloy; and combinations thereof. Plating may be performed in multiple steps by masking certain areas of the molded article to yield different thicknesses or no plating in certain areas. A customized plating thickness profile can also be achieved by tailored racking (including shields, thieves, conformal anodes, etc.).

One or more polymeric coatings 314 may also be applied to the metallic layer(s) 312 to produce a lightweight, stiff, and strong polymer appearing (non-conductive) housing. The polymeric coating(s) 314 may be applied by conventional processes, such as spray coating or dip coating.

A lightweight, plated polymer housing for FADECs and other electrical electronic control units provide a precisely engineered structure. The disclosed housings may be cheaper to manufacture and/or lighter than prior-art housings due to the disclosed plated polymer technology. Further, the metal appearance of the housing may increase the resale value of the unit. Polymer outer surfaces are also possible, if required.

Sound Attenuation Structures Made with Plated Polymers

There are two primary noise sources on a gas turbine engine—the fan and the turbine(s). To help attenuate fan noise, which cannot be controlled at the source, gas turbine engine makers use sound damping features in the walls of the fan duct. These features include honeycomb structures, which are both costly and difficult to manufacture.

Figure 29:
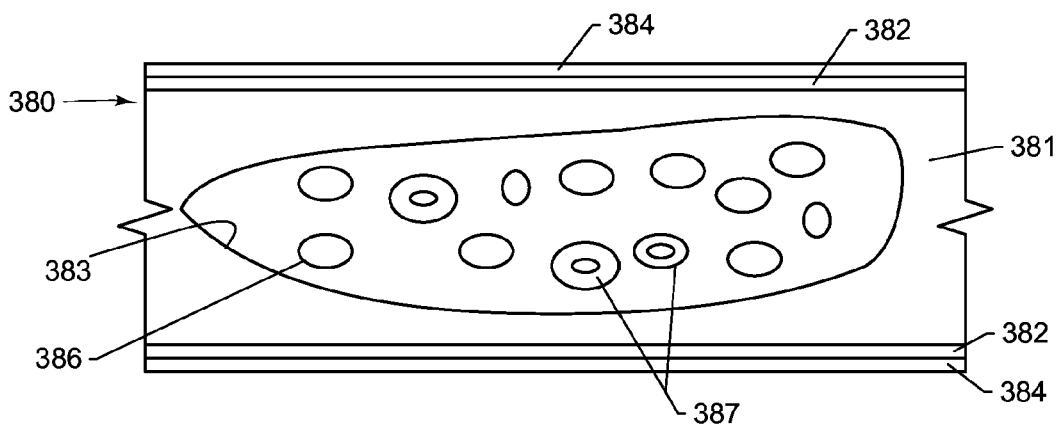
FIG. 29 is a sectional view of a disclosed sound/vibration damper or dampening structure made from a plated polymeric substrate in accordance with this disclosure.

An alternative sound-damping scheme is disclosed in the form of sound/vibration damping structures made from plated polymers. Turning to FIG. 29, an exemplary sound/vibration damper 380 may include a hollowed polymeric substrate 381 and one or more metallic layers 382. The substrate 381 may be injection-molded, compression-molded, blow-molded, additively manufactured or a composite layup structure. The polymeric substrate 381 may be formed from one or more polymers selected from the group consisting of: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. The polymeric substrate 381 may be fabricated around a suitable core to serve as an in situ mandrel and to provide the correct specific gravity and handling characteristics for the sound/vibration damper 380.

The metallic layer 382 may include one or more layers. Plating may be performed in multiple steps by masking certain areas of the substrate 381 to yield different thicknesses (or no plating) in areas of interest for performance or for later introduction of discontinuous vibration damping materials for noise attenuating purposes. This customized plating thickness profile can also be achieved by tailored racking (including shields, thieves, conformal anodes, etc.). Tailored racking allows for optimization of properties for the vibration/noise dampener with respect to structural support, surface characteristics, etc. without adding undue weight to the sound/vibration damper 380. The metallic layer(s) 382 may be then applied to the polymeric substrate 381 by methods such as, but not limited to, electroless plating, electroplating or electroforming. The metallic layer 381 may be formed from one or more metals including, but not limited to: nickel; cobalt; copper; iron; gold; silver; palladium; rhodium; chromium; zinc; tin; cadmium; and alloys with any of the foregoing elements comprising at least 50 wt. % of the alloy; and combinations thereof. Plating may be performed in multiple steps by masking certain areas of the molded article to yield different thicknesses or no plating in certain areas. A customized plating thickness profile can also be achieved by tailored racking (including shields, thieves, conformal anodes, etc.).

The sound vibration damper 380 can be fabricated in multiple segments that are joined by any conventional process (e.g., ultrasonic, laser, friction and friction-stir welding processes; traditional welding processes; adhesives; mitered joints with or without adhesives) before plating. Furthermore, the vibration damper/attenuator 380 can be produced and plated separately and subsequently bonded by transient liquid phase (TLP) bonding.

Figure 30:
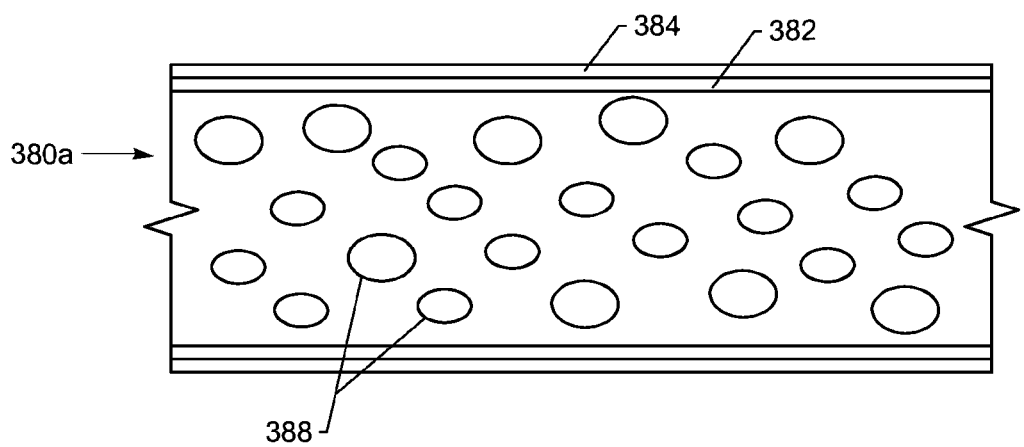
FIG. 30 is a sectional view of another disclosed sound/vibration damper or dampening structure made from a plated polymeric substrate.

One or more polymeric coatings 384 may also be applied to the metallic layer(s) 382 to produce a lightweight, stiff and strong polymer appearing (non-conductive) sound/vibration damper 380 or to enhance performance of the sound/vibration damper 380. The polymeric coating(s) 384 may be applied by conventional processes, such as spray coating or dip coating. In addition, as shown in FIG. 29, the hollow portions 383 of the plated polymer vibration damper/attenuator 380 may be filled with discontinuous vibration damping materials such as spheres 386 or micro-balloons 387 to enhance the acoustic damping performance sound/vibration damper 380. Alternatively, as shown in FIG. 30, the polymeric substrate 381 may be removed after the metallic layer(s) 382 are plated onto the polymeric substrate 381 (FIG. 29) and refilled with higher temperature materials such as ceramic beads or microspheres 388 to permit use of the sound/vibration damper 380a in high-temperature environments.

Thus, disclosed vibration damper/attenuators may not only reduce transmitted noise from the fan blades, but could also be used in a high-temperature exhaust system. The durability of the disclosed vibration damper/attenuator may also offer improved durability over traditional honeycomb materials.

Drive and Transmission Shafts made from Plated Polymeric Substrates

Drive shafts, transmission shaft and rotors are used to transmit power and torque from a drive component to a driven component. Typically, such shafts are made from metal materials or alloys due to high strength and stiffness requirements. However, metal shafts are heavy and costly. Thus, high strength, high torque shafts that are lighter than metal shafts but perform as well as metal shafts would be of value to payload driven platforms.

Figure 31:
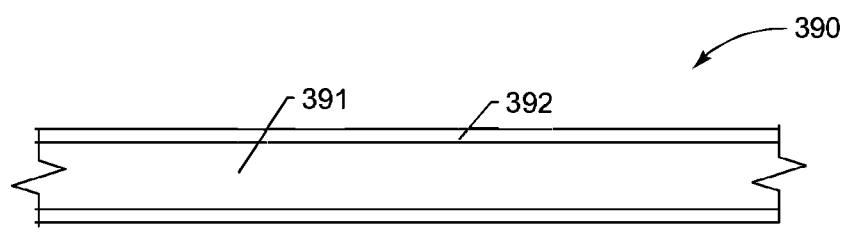
FIG. 31 is a sectional view of a drive or torque transmission shaft made from a plated polymeric substrate in accordance with this disclosure.

Turning to FIG. 31, an exemplary hybrid metal-composite drive or torque transmission shaft 390 may include a polymeric substrate 391 and one or more metallic layers 392. The exemplary substrate 391 is injection-molded, compression-molded, blow-molded, additively manufactured or a composite layup structure formed from at least one polymer selected from the group consisting of: may include, but are not limited to: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. The polymeric substrate 391 may be fabricated around a suitable core to serve as an in situ mandrel and to provide the correct specific gravity and handling characteristics for the hybrid metal-composite drive or torque transmission shaft 390. The metallic layer(s) 392 may be applied by electroless plating, electroplating, or electroforming to a thickness ranging from about 0.01 to about 0.5 inches (from about 0.254 to about 12.7 mm). An average plating thickness may range from about 0.025 to about 0.25 inches (from about 0.635 to about 6.35 mm). These thickness ranges provide resistance to wear, impact, FOD, etc. and the option to finish more aggressively to meet dimensional tolerances, surface finish requirements, etc.

The metallic layer 392 may be plated in multiple steps by masking certain areas of the formed polymeric substrate 391 to vary the thickness of the metallic layer 392 for performance or handling purposes. Such a customized plating thickness profile may also be achieved by tailored racking (including shields, thieves, conformal anodes, etc.). Tailored racking allows for optimization of properties of the shaft 390 with respect to structural support, surface characteristics, etc. without adding undue weight to the shaft 390. The shaft 390 may be fabricated in multiple segments that are joined by a conventional process (e.g., ultrasonic, laser, friction and friction-stir welding processes; traditional welding processes; adhesives; mitered joints with or without adhesive) before plating. Furthermore, the shaft 390 may be produced in multiple segments that may be plated separately and subsequently bonded together by transient liquid phase (TLP) bonding.

Thus, a hybrid metal-composite drive or torque transmission shaft can be produced which is lighter in weight than traditional all metal shafts. The hybrid construction using a plated polymers can produce a higher stiffness and lighter weight shaft, at similar or lower cost.

Plated Polymer Valve Housings or Enclosures

Valves used for aircraft engines typically employ metal housings or enclosures. A valve typically includes one or more inlets and one or more outlets to control flow. Metal valve housings are heavy and therefore add unwanted weight to the aircraft. Thus, durable, but lighter alternatives are desired.

Turning to FIG. 21, an exemplary valve housing may include a polymeric substrate 311 and a metallic layer 312. The exemplary substrate 311 may be an injection-molded, compression-molded, blow-molded, additively manufactured or a composite-layup structure formed from at least one of the following polymers: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof.

The metallic layer 312 may include one or more layers. The metallic layer(s) 312 may be applied by electroless plating, electroplating, or electroforming to a thickness ranging from about 0.01 to about 0.09 inches (from about 0.254 to about 2.29 mm, locally. An average plating thickness may range from about 0.015 to about 0.08 inches (from about 0.381 to about 2.03 mm). These thickness ranges provide resistance to erosion, impact, FOD, etc. and the option to finish more aggressively to meet tight tolerances, surface finish requirements, etc. The metallic layer(s) 312 may include any one or more of the following: nickel; cobalt; copper; iron; gold; silver; palladium; rhodium; chromium; zinc; tin; cadmium; and alloys with any of the foregoing elements comprising at least 50 wt. % of the alloy; and combinations thereof.

The metallic layer(s) 312 may be plated in multiple steps by masking certain areas of the formed polymeric substrate to yield different thicknesses (or no plating) in areas of interest. Such a customized plating thickness profile may also be achieved by tailored racking (including shields, thieves, conformal anodes, etc.). Tailored racking process permits optimization of properties for the valve housing with respect to fire resistance, structural support, surface characteristics, etc. without adding undue weight to the valve housing.

Some mounting features (e.g., flanges or bosses) may be bonded to the substrate 311 using a suitable adhesive after molding but before plating to simplify the mold tooling. More broadly, the valve housing may be fabricated in multiple segments that are joined by a conventional process (e.g., ultrasonic, laser, friction and friction-stir welding processes; traditional welding processes; adhesives; mitered joints with or without adhesive) before plating. Furthermore, the valve housing may be produced and plated separately and subsequently bonded by transient liquid phase (TLP) bonding. In addition, features such as bosses or inserts may be added (using an adhesive, riveting, etc.) to the part after the plating process.

One or more polymeric coatings 314 may also be applied to the plated polymer valve housing to produce a lightweight, stiff, and strong polymer appearing (non-conductive) valve housing. The polymeric coating(s) 314 may be applied by conventional processes, such as spray coating or dip coating.

Thus, plated polymer valve housings or enclosures offer cost and/or weight savings compared to traditional metal materials. The molding of the polymeric substrate and the plating of the molded polymeric substrate are both high-throughput processes. Further, complex housing geometries may be accommodated by producing multiple polymer segments and joining them together before plating of after plating using TLP bonding.

Plated Polymer Fan Case Ice Impact Panel

During operation of a gas turbine engine, ice may accumulate on the fan blades before it is shed from the fan blades in a radially outward and in the aft direction. Thus, as the ice is forced radially outward and aft of the fan blades, the ice impacts the inner flow path surface of the fan case. To insure that the impact of the ice does not result in damage to the inner flow path surface of the fan case, ice impact panels are known and are installed on the fan case. Typically, an ice impact panels is a Kevlar/epoxy composite laminate. Such composite laminate ice impact panels work well at resisting damage from ice impact, but are relatively expensive to manufacture. Thus, an effective but cheaper alternative is needed.

Figure 32:
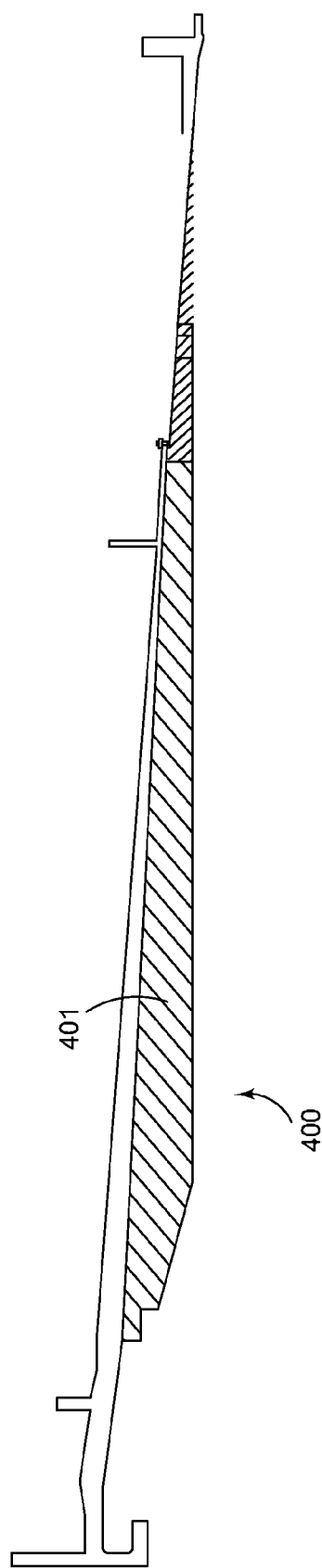
FIG. 32 is a sectional view of a plated polymer fan case ice panel made in accordance with this disclosure.

Referring to FIGS. 6 and 32, an improved ice impact panel 400 is disclosed that is fabricated using plated thermoplastics to replace the currently employed laminate ice impact panels. The overall size and shape of the existing panel may be maintained, but a polyetherimide (PEI) or similar thermoplastic may be injection molded to create a polymeric substrate 401 in the shape of the ice impact panel 400. Other materials for the polymeric substrate 401 include, but are not limited to: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. Optionally, the polymeric material of the polymeric substrate 401 may be structurally reinforced with materials that may include carbon, metal, or glass. The fiber-reinforced polymeric substrate 401 may include a plurality of layers to form a composite layup structure.

The substrate 401 is then coated with at least one metallic layer 402, and preferably multiple metallic layers. The metallic layers may include nickel or sulfamate nickel to improve the strength and impact resistance of the thermoplastic substrate 401 such that it can withstand the ice impact. Other suitable metals include, but are not limited to: nickel; cobalt; copper; iron; gold; silver; palladium; rhodium; chromium; zinc; tin; cadmium; and alloys with any of the foregoing elements comprising at least 50 wt. % of the alloy; and combinations thereof. Plating may be performed in multiple steps by masking certain areas of the molded article to yield different thicknesses or no plating in certain areas. A customized plating thickness profile can also be achieved by tailored racking (including shields, thieves, conformal anodes, etc.).

Thus, plated polymer ice impact panels may be fabricated from a molded polymer substrate that may be plated to provide ice impact panels that are cheaper to make but as effective as the currently employed composite laminate ice impact panels.

Plated Polymer Tubes and Connectors

An oil or lubrication system of a gas turbine engine, or any similar type of engine, may provide pressurized and heated oil to one or more bearings, a gearbox, a gear train, etc. A lubrication system for an engine may include a plurality of tubes and connectors. Such tubes and connectors are normally machined out of stainless steel because of internal pressure, temperature and anti-erosion requirements and to prevent oil leaks at preformed seals. The manufacturing costs of such tubes and connectors can be high due to the high-precision machining and corrosion resistant steel used to fabricate the tubes and connectors. Because of the use of stainless steel as the material of construction, such stainless steel tubes and connectors are heavy in comparison to parts fabricated from thermoplastic materials. As a result, stainless steel or metal tubes and connectors add weight to the engine, which reduces the fuel efficiency of the engine. However, replacing the stainless steel or metal in such tubes and connectors with a lighter, different metal is problematic due to the operating conditions of many gas turbine engines, including those used to power aircraft. For example, many thermoplastic materials are not suitable for aircraft engine applications because, in the case of lubrication system tubes and connectors, the material must be able to withstand continuous operating temperatures of 177° C. (350° F.) or higher while also enduring thermal cycles and internal pressure requirements.

To provide durable and lightweight tubes and connectors for use in engines that have relatively complex geometries and that operate in relatively extreme environments, disclosed herein are tubes and connectors made from molded or machined or additively manufactured polymeric materials that are plated. The disclosed tubes and connectors have a comparably low weight and may offer reduced manufacturing costs.

Figure 33A:
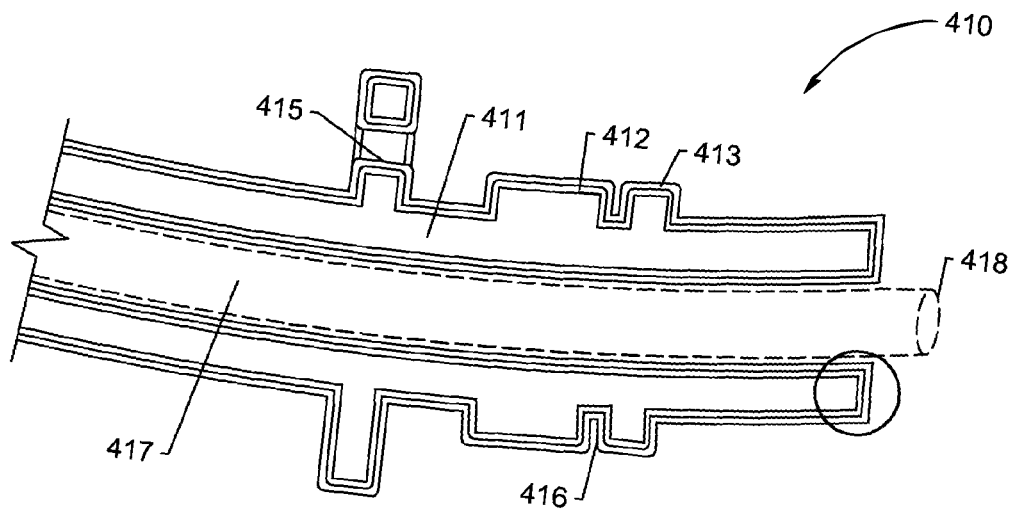
FIG. 33A is a disclosed sectional view of a plated polymer tube/connector for use in a lubrication system of a gas turbine engine.
Figure 33B:
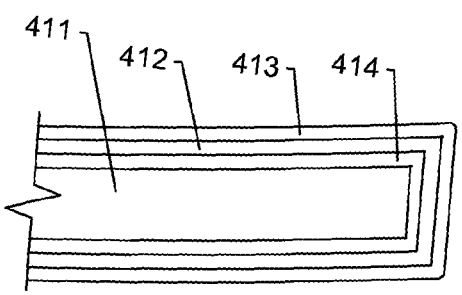
FIG. 33B is an enlarged partial view of an end of the tube/connector shown in FIG. 33A.

To reduce the weight and cost of tubes and connectors for engines that operate in harsh environments, composite tubes, connectors, nozzles, etc. are disclosed like the exemplary tube/connector 410 shown in FIGS. 33A and 33B. The exemplary tube/connector 410 is fabricated from a formed thermoplastic material and plating to provide the necessary strength, thermal, and anti-erosion properties. The tube/connector 410 is first molded or machined using conventional methods to form a polymeric substrate 411 of the desired shape. The polymeric substrate 411 may include one or more thermoplastic materials selected from group consisting of: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. Optionally, the polymeric material of the polymeric substrate 411 may be structurally reinforced with materials that may include carbon, metal, or glass. The fiber-reinforced polymeric substrate 411 may include a plurality of layers to form a composite layup structure.

After the polymeric substrate 411 is formed as shown in FIG. 33A, it is coated with an activation layer 414 (not shown in FIG. 33A, see FIG. 33B) and then plated with one or more metallic layers, two of which are shown at 412, 413 in FIGS. 33A and 33B. The activation layer 414 (FIG. 33B) typically includes copper. The plated metallic layers 412, 413 may include conventional plating materials and may be applied to the polymeric substrate 411 and activation layer 414 using conventional processes such as electrolytic plating or electroless plating. For example, the activation layer may include copper, the metallic layers 412, 413 may include nickel and may have thicknesses ranging from about one (1) to four (4) thousandths of an inch. One example for a structure with an activation layer 414 and two metallic layers 412, 413 is to apply a copper activation layer 414, a first electroless nickel layer 412, and a second electrolytic nickel layer 413. Such a multi-layer structure may provide strength and ductility in the activation layer 414 and metallic layer(s) 412 and high stiffness in the outer metallic layer 413. An electroless-plated nickel layer 412 or 413 may ensure coverage for high aspect ratio features, such as the hole 415 and the recess 416. Electroless plating may also provide a uniform thicknesses for the metallic layer(s) 412 or 413. The plating may be formed from one or more metals including, but not limited: nickel; cobalt; copper; iron; gold; silver; palladium; rhodium; chromium; zinc; tin; cadmium; and alloys with any of the foregoing elements comprising at least 50 wt. % of the alloy; and combinations thereof. Plating may be performed in multiple steps by masking certain areas of the molded article to yield different thicknesses or no plating in certain areas. A customized plating thickness profile can also be achieved by tailored racking (including shields, thieves, conformal anodes, etc.).

The tube/connector 410 may be machined, as necessary, to the required dimensions using conventional methods. For example, the polymeric substrate 411 may be machined as necessary after molding and/or after application of the metallic layer(s) 412, 413. Tight tolerance requirements may be met with conventional machining processes. In addition, the thin metallic layer 412 provided in the above example may not be necessary.

To ensure a thick, uniform layer of metal in the internal passage 417 of the tube/connector 410, a metal tube 418 (e.g., stainless steel or a comparable metal or alloy) may be inserted into the passage 417 to provide additional support and resistance to erosion, etc. The metal tube 418 could be inserted before or after the plating process. In addition, the polymeric substrate 411 may be co-molded with the metal tube 418 in place.

The tube/connector 410 may also be a nozzle. In the case of nozzles with small holes, metal tubular inserts 418 could be used to line the internal passage 417 to ensure coverage of small channels or passages with metal.

Thus, plated polymer tubes, connectors, and nozzles are lighter in weight compared to their steel counterparts. The plating may provide dimensional stability for parts under substantial internal pressures at high temperatures. Certain complex geometries found in tubes, connectors and nozzles might be easier to fabricate using a forming process as compared to machining a part from stock material. Furthermore, formed or machined polymeric substrates may be produced separately and subsequently bonded together before plating to create a more complex plated part. Further, complex geometries may be accommodated by producing multiple polymer segments and joining them together after plating using TLP bonding. Further, plated polymer parts may be produced in high volumes with faster turnaround times than parts made by machining.

Plated Polymer Gearbox Covers

Figure 34:
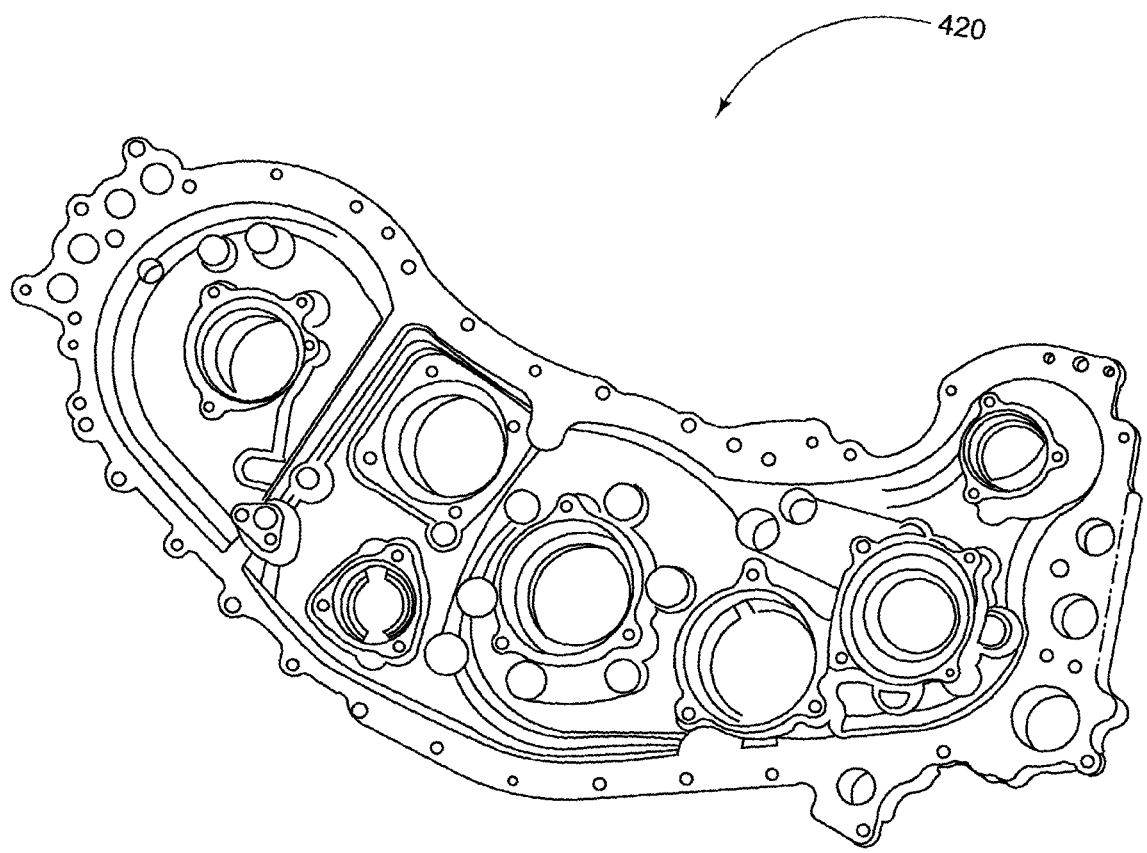
FIG. 34 is a perspective view of a plated polymer gearbox cover made in accordance with this disclosure.

Turning to FIG. 34, a gearbox cover 420 shown for installation in the gas turbine engine 110 of FIGS. 1-2. The gearbox cover 420 is essential to the assembly, operation, and protection of critically toleranced, internal components disposed within the gearbox (not shown). The gearbox cover 420 may be designed to precisely align and control position of highly sensitive gears, bearings, seals, and other dynamic components throughout a wide temperature spectrum. The gearbox cover 420 may also provide static interfaces to align and structurally support aerospace components such as hydraulic pumps, fuel pumps, oil pumps, and generators. The gearbox cover 420 may also provide potential mounting interfaces with the engine case to help support the entire gearbox and it may protect internal components from environmental effects such as liquids, dust, and other debris to minimize corrosion and FOD. Finally, the gearbox cover 420 may contain oil in the gearbox and provide oil paths and jets vital to the lubrication and cooling of engine components including gears, bearings, and seals.

The exemplary gearbox cover 420 may include a polymeric substrate 311 and one or more metallic layers 312 as shown in FIG. 21. The gearbox cover 420 may be used to replace a machined aluminum or magnesium baseline gearbox cover. The geometry of the cover 420 may include varying thicknesses with build-ups for attachments and holes for fluid flow and/or detailed installations. The metallic layer 312 be plated in multiple steps by masking certain areas of the substrate 311 to yield different thicknesses in areas of interest. Alternatively, tailored racking used for plating the cover 420 can be developed to cause an uneven distribution of the plating that forms the metallic layer(s) 312. For example, a thicker metallic layer 312 can be provided on the inside of the cover for structural integrity during an external fire. In addition, a thicker metallic layer 312 allows for more aggressive machining, finishing, etc. to achieve the desired surface roughness, tight tolerances (e.g., bore locations, flat surfaces), etc. in certain locations of the part. The multi-step plating process allows for optimization of cover properties, with respect to fire, structural support, surface characteristics, etc. without adding undue weight to the cover 420.

The exemplary substrate 311 may be injection-molded or compression molded formed at least one polymer selected from the group consisting of: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. Optionally, the polymeric material of the polymeric substrate 311 may be structurally reinforced with materials that may include carbon, metal, or glass. The fiber-reinforced polymeric substrate 311 may include a plurality of layers to form a composite layup structure.

Some mounting features (e.g., flanges or bosses) may be bonded to the substrate 311 using a suitable adhesive after molding but before plating to simplify the mold tooling. Further, the cover 420 may be fabricated by molding the substrate 311 in separate, multiple segments that are subsequently joined by a conventional process (e.g., ultrasonic, laser, friction and friction-stir welding processes; traditional welding processes; adhesives; mitered joints with or without adhesive) before plating. Further, complex geometries may be accommodated by producing multiple polymer segments and joining them together after plating using TLP bonding.

An injection-molded polymeric substrate 311 may have thickness ranging from about 0.05 to about 0.2 inches (from about 1.27 to about 5.08 mm). On the other hand, a compression-molded polymeric substrate 311 may have a thickness ranging from about 0.05 to about 2 inches (from about 1.27 to about to about 50.8 mm). In addition, reinforcing fibers (e.g., glass and/or carbon fibers) may be locally added, as required, to meet structural requirements.

From about 10 to about 60 wt % of the gearbox cover 420 may be attributed to the metallic layer(s) 312. Portions of the metallic layer(s) 312 may be purposefully weakened (or the polymeric substrate can be masked before plating) to provide paths for outgassing and expansion of the polymeric substrate during a fire. The weakened portions should not reside near areas of the gearbox cover 420 that may be significantly stressed or that experience stress concentrations. Such weakened portions may be used to provide appropriate redirection of thermally-induced stresses and strains away from critical load paths. The metallic layer(s) 312 may be applied by electroplating or electroforming to a thickness ranging from about 0.01 to about 0.1 inches (from about 0.254 to about 2.54 mm). The metallic layer(s) 312 may be formed from one or more metals including, but not limited: nickel; cobalt; copper; iron; gold; silver; palladium; rhodium; chromium; zinc; tin; cadmium; and alloys with any of the foregoing elements comprising at least 50 wt. % of the alloy; and combinations thereof. Plating may be performed in multiple steps by masking certain areas of the molded article to yield different thicknesses or no plating in certain areas. A customized plating thickness profile can also be achieved by tailored racking (including shields, thieves, conformal anodes, etc.).

Thus, gearboxes made from plated polymers may provide cost or weight savings. Further, fabricating a gearbox from a plated polymer may yield lower lead times, which is a significant advantage over the normally long lead-time required for gearbox covers. As a result, using plated polymers for gearboxes provides increased flexibility in the detailed design phase of engine development and shorter baseline schedules for cover/housing developments, which both have a significant impact on program costs, even though they do not necessarily make the gearbox itself less expensive than a metal counterpart.

One-Piece, Injection-Molded Spinner Cone for Fan Section of Gas Turbine Engine

Figure 35:
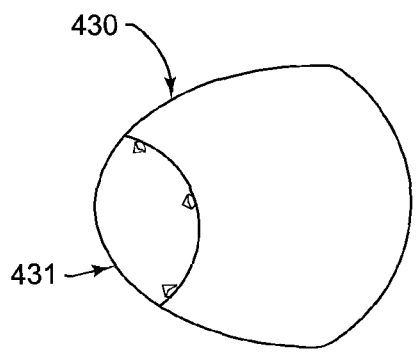
FIG. 35 is a perspective view of a prior art nose cap and spinner.

Referring to FIG. 35, a prior art spinner 430 and a nose cap 431 are shown that form the flow path forward of the fan blades 432 (see FIGS. 1-2 and 6). The spinner 430 and the nacelle inlet 193 (FIGS. 6 and 35) influence the blade inlet air profile. The spinner 430 must, by regulation, resist impact from hail and bird strikes. The prior art spinner 430 may be fabricated from a pre-impregnated KEVLAR® composite that may be resin transfer molded, compression molded, or bladder molded. The spinner 430 may be autoclaved or oven cured. The spinner 430 is typically a separate part from the nose cap 431, which may also be fabricated from a resin-impregnated KEVLAR® composite that is compression molded. With these manufacturing methods, the most cost-effective way to add stiffness to the spinner 430 or nose cap 431 is to increase the thicknesses, thus adding weight in addition to material and processing costs.

Figure 36:
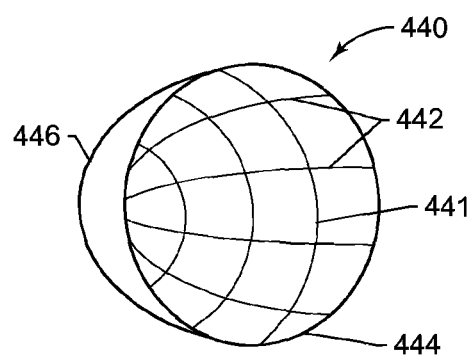
FIG. 36 is a perspective view of a disclosed plated polymer forward cone.
Figure 37:
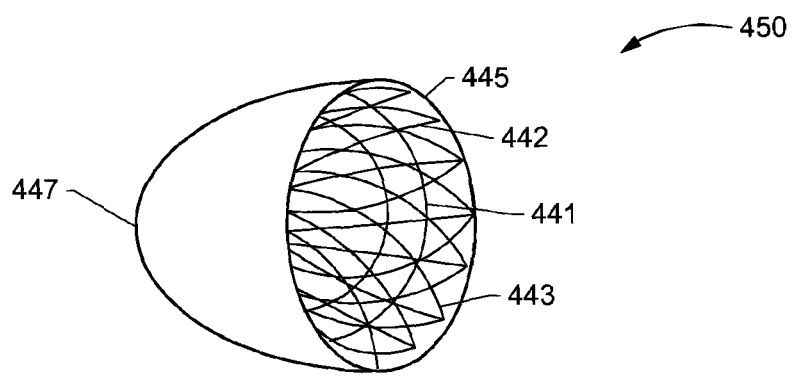
FIG. 37 is a perspective view of another disclosed plated polymer forward cone.
Figure 38:
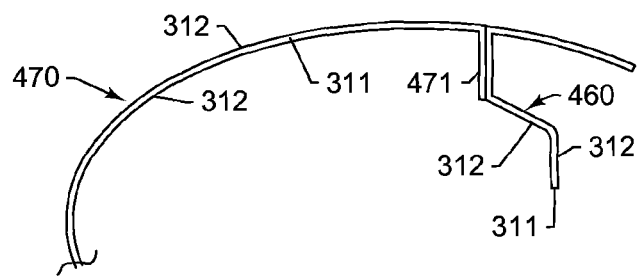
FIG. 38 is a sectional view of yet another disclosed plated polymer forward cone and a disclosed plated polymer attachment ring.

Improved light weight and stiff forward cones 440, 450, 470 are shown in FIGS. 36, 37, 38 respectively. The unitary forward cones 440, 450, 470 may replace the combination of the separate spinner 430 and nose cap 431 shown in FIG. 35. The forward cones 440, 450, 470 may be injection molded and, in the case of the cones 440, 450, may be provided with reinforcements in the form of ribs 441, 442 in the circumferential and/or axial directions respectively. The ribs 441, 442 add stiffness to the forward cone without adding overall thickness or significant weight to the forward cones 440, 450. The number of circumferential ribs 441 may range from about two (2) to about 20, inclusive. The number of axial ribs 442 (spline-shaped, running forward to aft) may range from about three (3) to about 32, inclusive. As shown in FIG. 37, optional shear ties or ribs 443 connecting intersections of the circumferential and axial ribs 441, 442 may also be used to add additional stiffness to the overall structure. The area enclosed by the intersecting circumferential and axial ribs 441, 442 essentially form rectangles at the aft ends 444, 445 of the forward cones 440, 450 respectively and transition to trapezoids (and finally triangles, if the ribs are carried all the way to the forward ends 446, 447 of the cones 440, 450 respectively. The afore-mentioned shear ties or ribs 443 shown in FIG. 37 may be incorporated between all such enclosed areas, in alternating areas (like a chess board), in alternating rows or columns, etc., as required to deliver the necessary stiffness and other relevant properties.

Due to the injection molding process, the ribs 441, 442, 443 may require a draft angle for removal from the mold tool (not shown), and a thickness and height of the ribs 441, 442, 443 may primarily be a function of the cone thickness due to shrinkage concerns. Regardless, the quantity and spacing of the ribs 441, 442 and the optional shear ties or ribs 443 and the overall thickness of forward cones 440, 450, 470 (with and without the ribs 441, 442 and shear ties 443) may be optimized. The ribs 441, 442, 443 do not have to be evenly spaced.

Referring back to FIG. 21 and to FIG. 38, molded polymeric substrates 311 form cores for the forward cones 440, 450, 470 that may be plated using a thin activation layer of copper to activate the polymeric substrate 311. The metallic layer(s) 312 may be applied by electroless plating, electroplating, or electroforming to a thickness ranging from about 0.004 to about 0.05 inches (from about 101.6 microns to about 1.27 mm). The metallic layer(s) 312 may be formed from one or more metals including, but not limited: nickel; cobalt; copper; iron; gold; silver; palladium; rhodium; chromium; zinc; tin; cadmium; and alloys with any of the foregoing elements comprising at least 50 wt. % of the alloy; and combinations thereof. Plating may be performed in multiple steps by masking certain areas of the molded article to yield different thicknesses or no plating in certain areas. A customized plating thickness profile can also be achieved by tailored racking (including shields, thieves, conformal anodes, etc.).

The plating of the polymeric substrate 311 produces lightweight forward cones 440, 450, 470 with high specific strength and resistance to certain environmental concerns, e.g., erosion. Variations in the desired wall thickness or thickness of the polymeric substrate 311 may be easily accommodated in the molding process. The exemplary substrate 311 may be injection-molded or compression-molded and formed from one or more polymers selected from the group consisting of: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. Optionally, the polymeric material of the polymeric substrate 311 may be structurally reinforced with materials that may include carbon, metal, or glass. The fiber-reinforced polymeric substrate 311 may include a plurality of layers to form a composite layup structure.

The forward cones 440, 450, 470 necessarily include mounting features (of which only a flange 471 is shown in FIG. 38). Some of these features (e.g., flanges) may be bonded to the polymeric substrate 311 (FIG. 21) using a suitable adhesive after molding but before plating to simplify the mold tooling. A similar approach can be taken with additional features, such as the ribs 441, 442 and 443 (i.e., the can be integral in the mold tooling or bonded on after molding to simplify that process.

Thus, one-piece, injection-molded and plated forward cone (i.e., a combination nose cap and spinner) may be manufactured for a lower cost than prior art nose caps and spinners. The disclosed forward cone may be unitary, thereby replacing two parts (a nose cap and a spinner) with a single unitary forward nose cone. Disclosed one-piece, injection-molded cores that are plated with a metallic layer can be manufactured for a much lower cost than KEVLAR composites of the prior art. The disclosed forward cones are lighter and new designs may be fabricated with shorter lead times. The plated metallic layer(s) provides resistance to erosion while typical prior art spinners require an additional coating for erosion resistance. The disclosed nose cones may include reinforcing elements in the form of an internal ribbed structure designed to carry and distribute static and impact loads throughout the forward cone more efficiently than a constant thickness structure. Therefore, the wall thickness of the forward cone may be reduced to save weight.

Plated Polymer Attachment Rings

In a gas turbine engine 110 (FIGS. 1-2 and 6), a spinner attachment ring may be used to attach a spinner or nose cone to a non-rotating hub, a rotating hub, or a fan rotor (not shown). In general, spinner attachment rings may also transmit loads and may serve secondary functions such as retaining locks, etc. Spinner attachment rings are typically made of a metal, such as titanium, iron, or aluminum. These types of rings tend to be heavy and expensive.

An exemplary spinner attachment ring 460 is shown in FIG. 38. The spinner attachment ring 460 may include a polymeric substrate 311 and at least one metallic layer 312 as shown in FIG. 21. The exemplary substrate 311 may be injection molded or compression molded and may include any one or more polymers selected from the group consisting of: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. Optionally, the polymeric material of the polymeric substrate 311 may be structurally reinforced with materials that may include carbon, metal, or glass. The fiber-reinforced polymeric substrate 311 may include a plurality of layers to form a composite layup structure.

The metallic layer 312 may include one or more layers. The metallic layer(s) may be applied by electroless plating, electroplating, or electroforming to a thickness ranging from about 0.001 to about 1 inch (from about 25.4 microns to about 2.54 cm), locally. An average plating thickness may range from about 0.01 to about 0.075 inches (from about 254 microns to about 1.91 mm). These thickness ranges provide resistance to erosion, impact, etc. and the option to finish more aggressively to meet tight tolerances, surface finish requirements, etc. The metallic layer 312 may be formed from one or more metals including, but not limited: nickel; cobalt; copper; iron; gold; silver; palladium; rhodium; chromium; zinc; tin; cadmium; and alloys with any of the foregoing elements comprising at least 50 wt. % of the alloy; and combinations thereof.

The metallic layer(s) 312 may be applied in multiple steps by masking certain areas of the attachment ring to yield different thicknesses in areas of interest, such as platforms or flanges. Such a customized plating thickness profile may also be achieved by tailored racking (includes shields, thieves, etc.). In addition, a thicker metallic layer(s) 312 allows for more aggressive machining, finishing, etc. to achieve the desired surface roughness, tolerances, etc. Such a multi-step process allows for optimization of attachment ring properties, with respect to fire, structural support, surface characteristics, etc. without adding undue weight to the attachment ring 460.

Further, the attachment ring 460 may be fabricated in multiple segments that are joined by any a conventional process (e.g., ultrasonic, laser, friction and friction-stir welding processes; traditional welding processes; adhesives; mitered joints with or without adhesive) before plating. Because the metallic layer 312 is thick enough to provide significant structural strength and rigidity, the method of joining segments will likely not be a strength limiting factor.

Thus, plated polymer attachment rings are disclosed that have applications beyond attaching a spinner or forward cone to a hub. The disclosed attachment rings are relatively inexpensive to manufacture due to the high-throughput molding and plating processes used to make the rings.

Plated Polymer Textured Surface for Water and Ice Management

Some component surfaces of gas turbine engines require protection against erosion and de-icing capability. Current materials that are relatively erosion resistant include metals, ceramics, and some polymers. It is desirable to simultaneously provide an erosion resistant material that also repels or selectively directs water and/or prevents ice buildup on the component surfaces.

Figure 39:
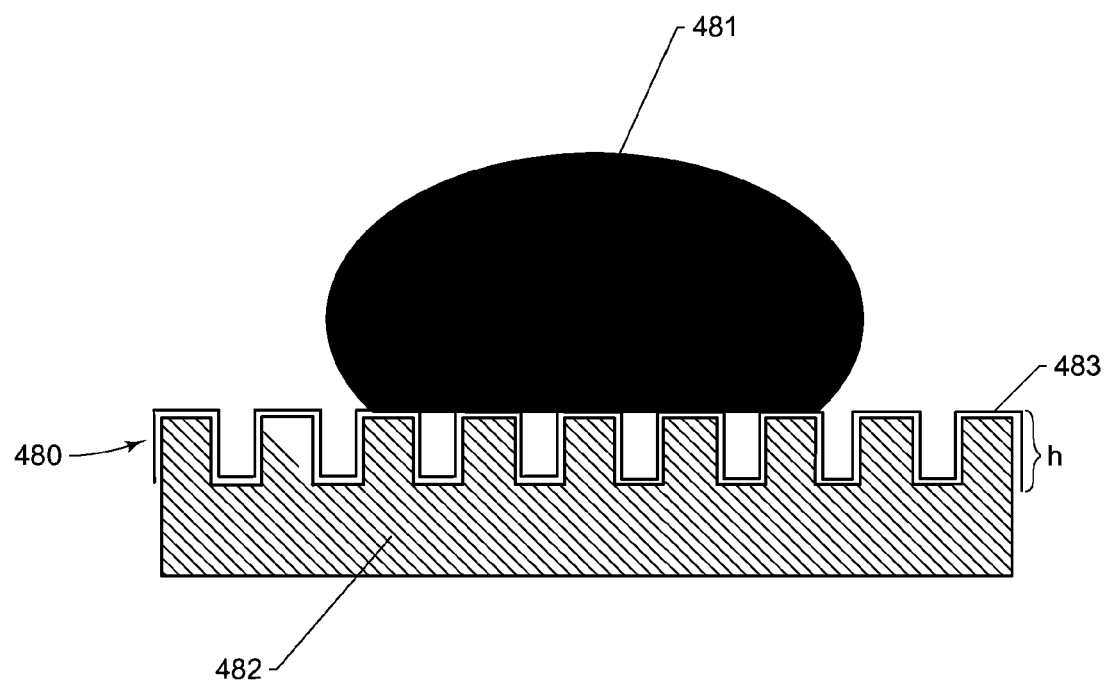
FIG. 39 is a sectional view of a textured plated polymeric substrate made in accordance with this disclosure.

Turning to FIG. 39, disclosed herein is a technique to impart a designed texture onto or into a surface 480 of an erosion resistant material used to fabricate a plated polymer spinner or forward cone. The textured surface 480 is designed to control the contact angle of the wetting fluid 481 (water) to direct the fluid 481 off the textured surface 480 and/or to prevent ice formation on the textured surface 480. Additional treatments can be performed to further enhance the functionality of the textured surface 480.

At least one metallic layer 483 is plated on top of a textured polymeric substrate 482, which can render the textured surface 480 with even more resistance to erosion and super-hydrophobicity to prevent water attachment, and thus, to minimize ice buildup/adhesion. The substrate 482 may include, but is not limited to: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. Optionally, the polymeric material of the polymeric substrate 482 may be structurally reinforced with materials that may include carbon, metal, or glass. The fiber-reinforced polymeric substrate 482 may include a plurality of layers to form a composite layup structure. The metallic layer(s) 483 may be formed from one or more metals including, but not limited: nickel; cobalt; copper; iron; gold; silver; palladium; rhodium; chromium; zinc; tin; cadmium; and alloys with any of the foregoing elements comprising at least 50 wt. % of the alloy; and combinations thereof. Plating may be performed in multiple steps by masking certain areas of the molded article to yield different thicknesses or no plating in certain areas. A customized plating thickness profile can also be achieved by tailored racking (including shields, thieves, conformal anodes, etc.).

The metallic layer(s) 483 provide erosion and fatigue resistance. The metallic layer 483 may include one or more layers, preferably with a non-hydrophilic top-most layer. The metallic layer(s) 483 may be applied by electroless plating, electroplating, or electroforming to a thickness of about 10% of the texture dimension h.

Thus, as opposed to prior art hardening or coating techniques including nitriding and aluminizing to avoid erosion, texture plated polymer surfaces are disclosed, for example, a textured plated polymer forward cones, nose cones or spinners. The textured plated polymer design saves both weight and costs and can generate a textured metallic layer of a uniform thickness.

Impact-Resistant Plated Polymer Structures

Many components of a gas turbine engine must be resistant to impact events from both hard objects (rocks, debris, ice, etc.) and soft objects (bird strikes, etc.). Components of other engines, such as truck, automotive, marine, etc., also must be resistant to such impact events. Components made from traditional materials such metals, polymers, composites, ceramics, etc. often must be made heavier or with more complex geometries to meet impact-resistant requirements. Heavier components and/or components with more complex geometries increase cost and manufacturing lead time as well as substantial design and manufacturing efforts.

Figure 40:
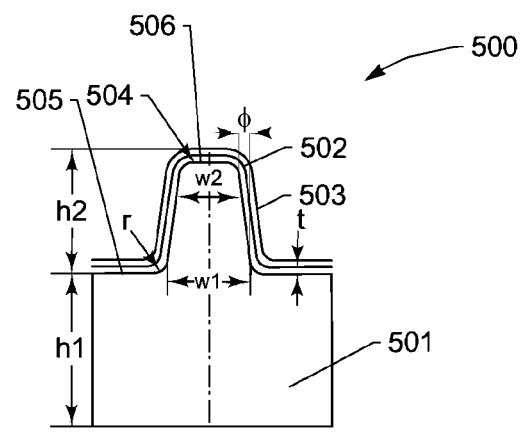
FIG. 40 is a sectional view illustrating the dimensional parameters for a structural rib molded into a polymeric substrate that is plated with at least one metallic layer and optionally covered by at least one polymer layer.

Turning to FIG. 40, disclosed herein are impact-resistant plated polymer structures 500, which may include a polymeric substrate 501 covered by at least one metallic layer 502. An exemplary substrate 501 may be injection-molded, compression-molded, blow-molded, additively manufactured or a composite-layup structure. The polymeric substrate 501 may be formed of at least polymer selected from the group consisting of: polyetherimide (PEI); polyimide; polyether ether ketone (PEEK); polyether ketone ketone (PEKK); polysulfone; polyamide; polyphenylene sulfide; polyester; polyimide; and combinations thereof. Suitable thermoset materials may include, but are not limited to: condensation polyimides; addition polyimides; epoxy cured with aliphatic and/or aromatic amines and/or anhydrides; cyanate esters; phenolics; polyesters; polybenzoxazine; polyurethanes; polyacrylates; polymethacrylates; silicones (thermoset); and combinations thereof. Optionally, the polymeric material of the polymeric substrate 501 may be structurally reinforced with materials that may include carbon, metal, or glass. The fiber-reinforced polymeric substrate 501 may include a plurality of layers to form a composite layup structure.

The metallic layer(s) 502 may include one or more layers. The metallic layer(s) 502 may be applied by electroless plating, electroplating, or electroforming to a thickness ranging from about 0.001 to about 0.5 inches (from about 25.4 microns to about 12.7 mm), locally. An average plating thickness may range from about 0.004 to about 0.3 inches (from about 101.6 microns to about 7.62 mm). These thickness ranges provides resistance to erosion, impact, FOD, etc. and the option to finish more aggressively to meet tight tolerances, surface finish requirements, etc. The plating of the metallic layer(s) 502 may be carried out in multiple steps by masking certain areas of the polymeric substrate 501 to yield different plating thicknesses (or no plating) in areas of interest. Such a customized plating thickness profile may also be achieved by tailored racking (including shields, thieves, conformal anodes, etc.). Tailored racking allows for an optimization of properties for the impact-resistant plated polymer structure 500 with respect to fire resistance, structural support, surface characteristics, etc. without adding undue weight to the structure 500. The metal layer(s) 502 may be formed from one or more metals including, but not limited: nickel; cobalt; copper; iron; gold; silver; palladium; rhodium; chromium; zinc; tin; cadmium; and alloys with any of the foregoing elements comprising at least 50 wt. % of the alloy; and combinations thereof.

The impact-resistant plated polymer structure 500 may be fabricated in multiple segments that may be are joined by a conventional process (e.g., ultrasonic, laser, friction or friction-stir welding processes; traditional welding processes; adhesives; mitered joints with or without adhesive) before plating. Such segments of a final structure 500 may be produced and plated separately, and subsequently bonded together by transient liquid phase (TLP) bonding. Features such as inserts or details may be added (using an adhesive, riveting, etc.) to the structure 500 after the plating process. One or more polymeric coatings 503 may also be applied to impact-resistant plated polymer structure 500 to yield a lightweight, stiff and strong polymer appearing (non-conductive) component. The polymeric coating(s) 503 may be applied by a conventional process, such as spray coating or dip coating, and may be applied to localized regions only, if desired.

Turning to FIGS. 40-43, FIG. 40 illustrates molding parameters for a polymeric substrate 501 having reinforcing ribs 504. The molding parameters for the ribs 504 illustrated in FIG. 40 include: (1) the thickness $h_1$ of polymeric substrate 501 (the sheet area between ribs 504); (2) the height $h_2$ of the ribs 504; (3) the base width $w_1$ of the ribs 504; (4) the tip width $w_2$ of the ribs 504; (5) the draft angle $\phi$ of the ribs 504; (6) the rib fillet radius r; and (7) the plating thickness t. In general, the rib parameters illustrated in FIG. 40 are related according to the following equations:

$$0.010 \times h_1 \leq h_2 \leq 3.00 \times h_1 \qquad \text{Eq. A}$$

$$0.125 \times h_1 \leq w_1 \leq 0.75 \times h_1 \qquad \text{Eq. B}$$

$$0.05 \text{ inch } (1.27 \text{ mm}) \leq w_2 \leq 0.75 \times h_1 \qquad \text{Eq. C}$$

$$0° \leq \phi \leq 80° \qquad \text{Eq. D}$$

$$0.025 \text{ inch } (635 \text{ microns}) \leq r \qquad \text{Eq. E}$$

$$0.001 \text{ inch } (25.4 \text{ microns}) \leq t \leq 0.5 \text{ inch } (12.7 \text{ mm}) \qquad \text{Eq. F}$$

Figure 41:
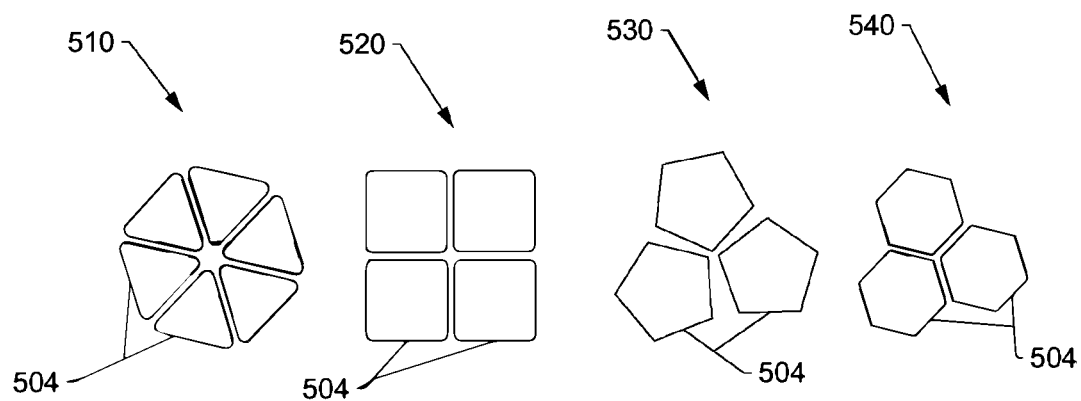
FIG. 41 illustrates four rib patterns that may be molded into the polymeric substrate shown in FIG. 40 for enhancing impact resistant properties of the substrate.

Turning to FIG. 41, various rib patterns 510, 520, 530, 540 are disclosed for arranging continuous ribs 504 on surface 505 of the polymeric substrate 501 (FIG. 40). The rib patterns 510, 520, 530, 540 provide the plated polymer structure 500 with isotropic properties when they are utilized in a repeating fashion. The efficiency of the final structure 500 will vary and depend upon the specific shape or rib pattern 510, 520, 530, 540 chosen. The ribs 504 of the patterns 510, 520, 530, 540 may be flanged at the upper tips 506, which provide the ribs 504 with an I-beam-like configuration to add additional structural integrity. Combinations of rib patterns 510, 520, 530, 540 may also be used, for example one combination pattern may involve six hexagons surrounding a seventh hexagon that is filled with six triangles. The possible variations are too numerous to list individually here, as will be apparent to those skilled in the art.

Figure 42:
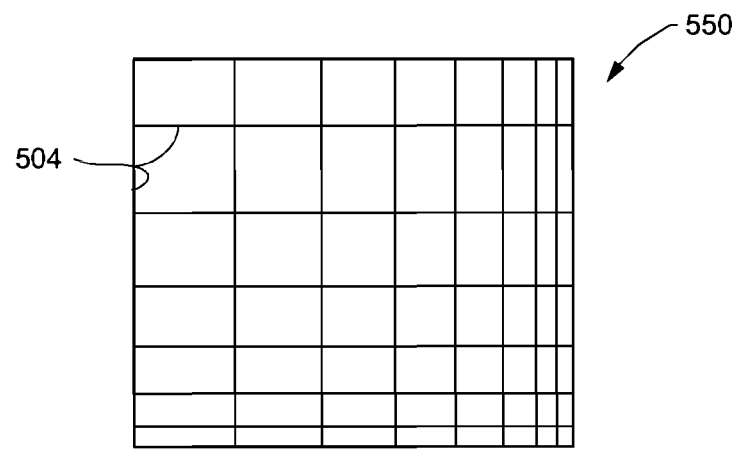
FIG. 42 illustrates in irregular grid pattern for rib(s) that may be molded into the polymeric substrate of FIG. 40 for enhancing impact resistant properties of the substrate.
Figure 43:
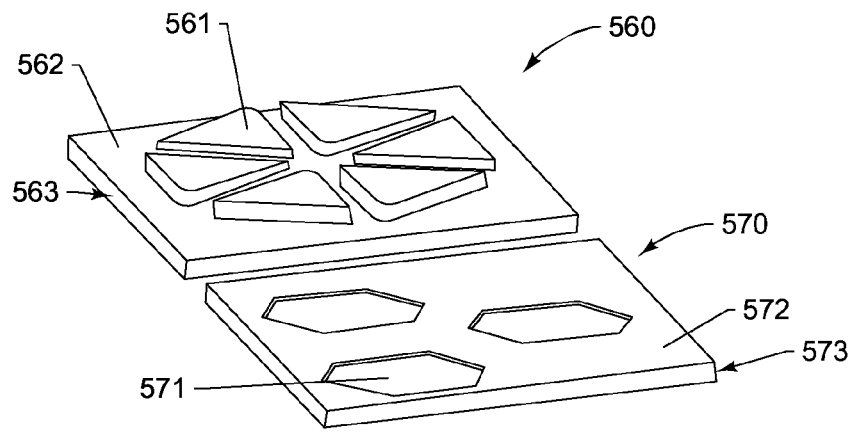
FIG. 43 illustrates two additional patterns of protrusions and recesses, respectively, that may be molded into the polymeric substrate of FIG. 40 for enhancing impact-resistant properties of the substrate.

FIG. 42 is another disclosed rib pattern 550 that is an irregular grid. Regular grids may be used as well. FIG. 43 illustrates two unit-cell impact-resistant patterns 560, 570 that may be applied uniformly or only in local areas where more impact resistance is required. The pattern 560 includes triangular-shaped protrusions 561 that extend upward from the surface 562 of the molded polymeric substrate 563. In contrast, the pattern 570 includes through-holes or recesses 571 that extend into or through the surface 572 of the molded polymeric substrate 573. The pattern 560 includes triangular-shaped protrusions while the pattern 570 includes hexagonal-shaped holes or recesses. Obviously, other shapes and combinations of shapes may be used as will be apparent to those skilled in the art. The patterns 510, 520, 530, 540, 550 560, 570 illustrated in FIGS. 41-43 are mere examples that can be extended upon. Furthermore, the combinations of the rib patterns 510, 520, 530, 540, 550, 560, 570 may be used, as desired, to achieve customized impact-resistance properties and redistribution of accompanying loads.

Plated Polymer Integrally Bladed Rotor and Method of Making

Present day integrally bladed rotors are typically machined from a single forging having one chemistry. Integrally bladed rotors may also be produced by linear friction welding solid airfoils or hollow airfoils onto a disk (or hub if for the first stage of a gas turbine engine's fan). The blades and the disk may be of the same chemistry or of different chemistries.

Integrally bladed rotors are generally fabricated using titanium, titanium alloys and/or laminated composite materials. The manufacture of integrally bladed rotors with these materials tends to be expensive and time consuming. Additionally, many of these integrally bladed rotors tend to be relatively heavy in order for the blades of the rotor to possess the necessary ductility to survive bird strike events. As the masses of the blades increase, the likelihood of case penetration in the event of blade breakage also increases. Heavier integrally bladed rotors also carry a heavier load, increasing the requirements of downstream engine components.

Figure 44:
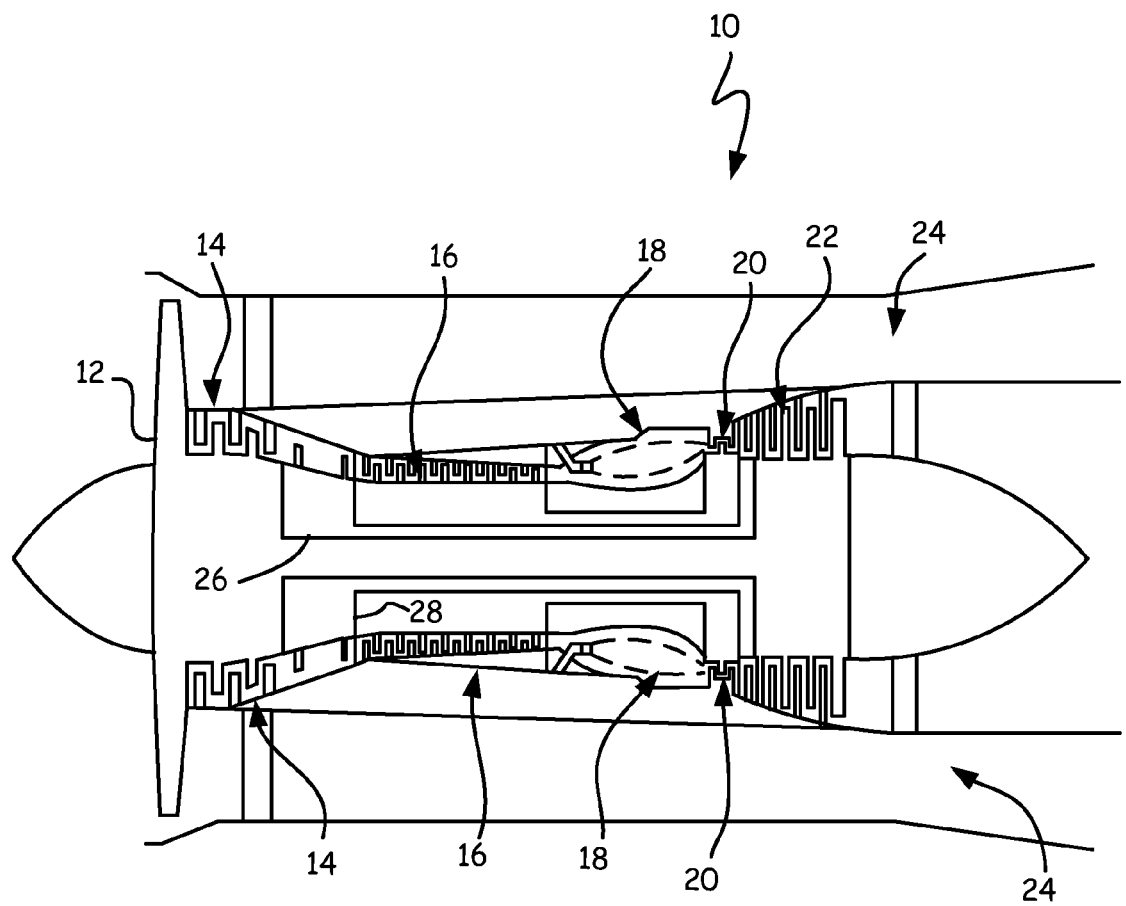
FIG. 44 is a cross section view illustrating a turbofan engine.

Turning to FIG. 44, an example of a dual-spool turbofan engine is depicted. Turbofan engine 10 includes several sections: fan section 12, first low-pressure compressor section 14, second high-pressure compressor section 16, combustor section 18, first high-pressure turbine section 20, second low-pressure turbine section 22, bypass section 24, low-pressure shaft 26, and high-pressure shaft 28. A portion of the atmospheric air pulled in by rotation of fan section 12 is directed toward first compressor section 14, while the remainder is directed toward bypass section 24.

Air directed through first compressor section 14 is further compressed by second compressor section 16. Fuel is added and ignited in combustor section 18. Blades in turbine sections 20 and 22 capture a portion of the energy from passing combustion products by turning turbine rotors. Both fan section 12 and first compressor section 14 are rotatably linked via low-pressure shaft 26 to first low-pressure power turbine section 22. Second high-pressure compressor section 16 is rotatably connected to first high-pressure turbine section 22 via high-pressure shaft 28. Thrust is generated in engine 10 by the force of the air drawn in by fan section 12 and pushed through bypass section 24 (less any bleed air used for other aircraft functions), and by the force of exhaust gases exiting from second low-pressure turbine section 22.

In a turbofan engine, lighter components generally lead to more efficient performance. If less energy is expended to move internal engine parts, more energy is available for useful work. At the same time, the components themselves must be strong enough to withstand operational forces, and types of failure typical for the operating environment of the engine. Safety considerations and regulations based on the frequency and/or severity of possible failure will often dictate that the engine components also be able to withstand other atypical, yet foreseeable events. Because stronger and lighter components are often more expensive, a balance must be struck between efficiency, safety, and cost.

Few locations in an aircraft are more representative of efforts to optimize the balance between efficiency, safety, and cost than engine 10. While lighter materials are preferable to improve efficiency, the high risk of severe consequences from engine damage will require that engine 10 be made of components having additional margins of safety. Combining parts having both high strength and low density greatly restricts material choices and increases costs. Not infrequently, processing these strong and light materials such as titanium or composites is also complex and expensive.

Being designed to pull vast quantities of air through bypass section 24 to generate thrust, blades in fan section 12 are the first line of defense for engine 10 and are highly susceptible to both small and large scale damage from objects pulled in with the surrounding air, including bird impact damage.

Small scale blade damage causes performance deterioration and increases the number of potential crack initiation sites, while large scale damage includes blade deformation and failure. Small impacts can also lead to large scale damage by serving as crack initiation sites. Larger impacts, such as ingestion of birds can cause one or more blades to deform or break in a single event. Regulations are in place to limit the frequency and severity of single event failures because of the increased risk of emergency landings and catastrophic failure.

Blades made entirely from high-strength materials, such as titanium or titanium alloys like Ti-6Al-4V, have been proven to offer sufficient hardness to resist erosion and foreign object damage. But titanium alloys are often expensive to purchase and manipulate into a finished blade. And while titanium has a relatively low density compared to a number of metals, the mass of titanium fan blades is a significant contributor to overall engine mass.

Techniques have been developed to reduce costs and decrease mass by limiting the amount of material needed to form blades. For example, hollow blades are common in higher output engines, minimizing the amount of titanium or strands of composite needed. In addition, design approaches have been developed to minimize the mass impact of titanium blades. Complex computer-aided modeling further provides efficient blade shapes for a given application.

However, diminishing returns are seen with hollow blades in smaller engines. As the blades become smaller, the cavities also become smaller because the surfaces must have a certain thickness to maintain adequate structural support. Hollow blades are not usually cost-effective in smaller engines with smaller components and less thrust because the smaller cavity offers comparatively little mass savings. In small engines, the costs saved by reducing mass are frequently offset by added processing costs to form the smaller cavity.

Further, even in larger blades, current hollow metal blades are relatively expensive to manufacture. Expensive and complex processes such as diffusion bonding are often used to join two machined plates or two forged halves together into a large hollow blade. An expensive process like diffusion bonding can partially or completely offset the desired mass savings in some blades. Less expensive conventional processing, such as welding, is not particularly useful for hollow titanium blades because of the risk of stresses or brittleness caused by excess heat around the joined areas or by the geometry of the weld joint. Specialized and complex welding processes like laser or linear friction welding are available to reduce these risks, but do not reliably provide sufficient bonding area or structural capability to withstand various impacts and vibratory stresses on the blade.

Fan section 12, first low-pressure compressor section 14 and/or second high-pressure compressor section 16 can include an integrally bladed rotor (IBR), in which the fan or compressor blades are directly attached to a hub or rotor rather than joined with a blade root being received by a slot at the outer diameter of the rotor.

Figure 45:
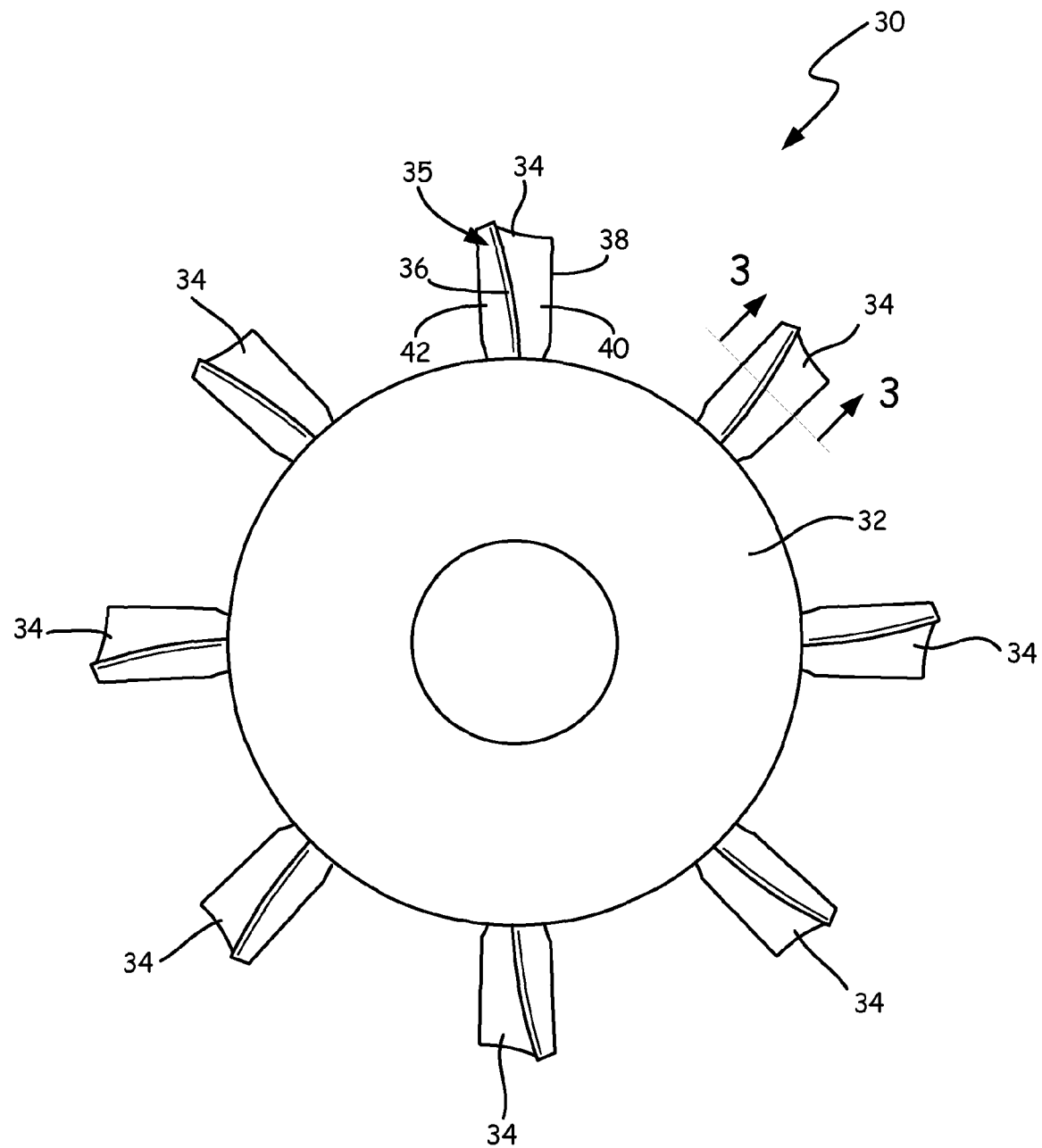
FIG. 45 is a front view illustrating a metal plated integrally bladed rotor having a non-metallic core.

According to embodiments of the present invention, an IBR contains a non-metallic core and a metallic layer covering at least a portion of the non-metallic core. FIG. 45 is a front view of IBR 30. IBR 30 includes rotor 32 and a plurality of blades 34 extending from rotor 32. Each blade 34 includes airfoil 35 having leading edge 36, trailing edge 38, pressure side surface 40 and suction side surface 42. As shown in FIG. 45, blades 34 are shaped for the fan and IBR 30 is suitable for use within fan section 12 of engine 10 described above. In alternate embodiments, blades 34 can be shaped for a compressor and IBR 30 is suitable for use within low-pressure compressor section 14 or high-pressure compressor section 16.

Figure 46:
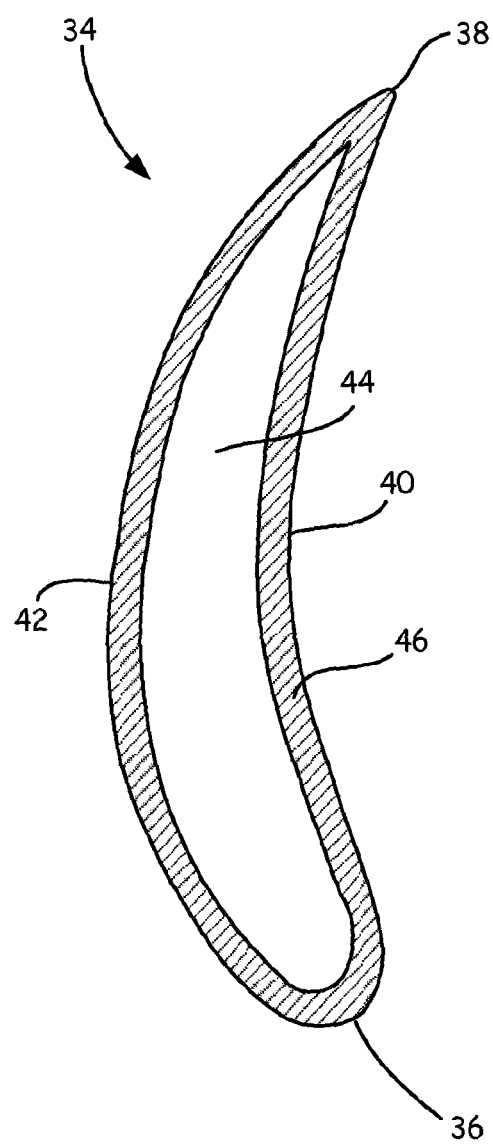
FIG. 46 is a cross sectional view illustrating a blade on the integrally bladed rotor of FIG. 45 showing the non-metallic core and metal plating.

At least a portion of IBR 30 includes a metal layer covering a non-metallic core. In the embodiment shown in FIG. 45, rotor 32 and blades 34 are formed of a non-metallic core and a metal layer covers substantially all of rotor 32 and blades 34. FIG. 46 is a cross sectional view of a blade of FIG. 45 taken along the line 3-3 showing the non-metallic core and metal layer in one embodiment of IBR 30. Non-metallic core 44 is surrounded by metal layer 46.

Non-metallic core 44 is formed of a polymeric or composite material to reduce the overall mass of IBR 30. In some embodiments, non-metallic core 44 is formed of a thermoplastic and/or thermoset material. Suitable thermoplastic and thermoset materials include, but are not limited to, polyphenylene sulfides, polyamides, polyvinylchloride (PVC), polystyrene (PS), polyethylene (PE), polypropylene (PP), styrene-acrylonitrile (SAN), polycarbonate (PC), acrylonitrile styrene acrylate (ASA), acrylonitrile butadiene styrene (ABS), ethylene tetrafluoroethylene fluoropolymer (ETFE), high impact polystyrene (HIPS), polyamide (PA), polybutylene terephthalate (PBT), polyetherimide (PEI), perchloroethylene (PCE), polyether sulfone (PES), polyethylene terephthalate (PET), polysulfone (PSU), polyurethane (PUR), polyvinylidene fluoride (PVDF), polyether ether ketone (PEEK), polyetherimide (PEI), thermoplastic polyimide, condensation polyimide, addition polyimide, polyether ketone ketone (PEKK), polysulfone, polyphenylsulfide, polyester, epoxy cured with aliphatic and/or aromatic amines and/or anhydrides, cyanate esters, phenolics, polyacrylates, polymethacrylates, silicones (thermoset), any of the foregoing with fiber reinforcement (e.g., carbon-fiber or glass-fiber) and combinations thereof.

In some embodiments, non-metallic core 44 is formed by injection molding, resin transfer molding, vacuum-assisted resin transfer molding, composite layup (autoclave, compression, or liquid molding), compression molding, or additive manufacturing (liquid bed, powder bed, deposition processes). Alternatively, depending on its makeup, non-metallic core 44 can also be formed by extrusion, thermoforming, weaving (2D or 3D), braiding, vacuum-forming, machining or laminating. Non-metallic core 44 generally has a local thickness between about 1.27 mm (0.050 inches) and about 50.8 mm (2 inches). Injection molded non-metallic cores 44 generally have a local thickness between about 1.27 mm (0.050 inches) and about 5.08 mm (0.20 inches). Compression molded non-metallic cores 44 generally have a thickness between about 1.27 mm (0.050 inches) and about 5.08 cm (2 inches).

Non-metallic core 44 can be solid, as shown in FIG. 46, or non-metallic core 44 can contain one or more cavities for receiving cooling air or to further reduce the overall mass of IBR 30. For example, in embodiments of a blade in which its non-metallic core 44 contains cavities, cooling holes and slots can extend through non-metallic core 44 and metal layer 46 of the blade.

At least a portion of non-metallic core 44 is covered by metal layer 46. In the embodiment shown in FIGS. 45 and 46, substantially all of rotor 32 and blades 34 of IBR 30 are covered by metal layer 46, including airfoil 32, platform 33 and root 34. As shown in FIG. 46, metal layer 46 extends around all of non-metallic core 44, over leading edge 36, trailing edge 38, pressure side surface 40 and suction side surface 42.

Metal layer 46 can generally be formed from any metal having a melting temperature above about 150° C. (302° F.). Metal layer 46 can include single element metals and/or alloys. In some embodiments, metal layer 46 includes nickel or nickel alloys.

In some embodiments, metal layer 46 has an average thickness between about 0.635 mm (0.025 inches) and about 3.81 mm (0.150 inches), with local thicknesses between about 0.127 mm (0.005 inches) and about 6.35 mm (0.250 inches). Depending on the desired ductility and durability of blades 34 and rotor 32 of IBR 30, the thickness of metal layer 46 can be adjusted at various locations on either blades 34 or rotor 32. In some embodiments, metal layer 46 can be thicker along leading edge 36 than trailing edge 38. For example, metal layer 46 of blade 34 can have a thickness of about 6.35 mm (0.250 inches) at leading edge 36 and a thickness of about 0.635 mm (0.025 inches) along pressure side surface 40, suction side surface 42 and trailing edge 38.

Metal layer 46 can be applied to non-metallic core 44 by electroplating, electroless plating, electroforming, thermal spray coating, physical vapor deposition, chemical vapor deposition and/or cold spraying.

Earlier attempts at metal plating polymers and composites demonstrated that plating non-metallic cores with metal layers was prone to nodulation and pitting. Nodulation is the excessive build up of metal layer 46 along high current density locations of a part. Corners and edges of a plated part tend to receive larger amounts of plating while recesses receive less. Pitting refers to the formation of holes in metal layer 46 due to the presence of impurities in the plating bath. The thicker the plating, the more pronounced the nodulation and pitting problems become. These problems have discouraged others from attempting to manufacture plated polymer fan blades that are capable of use within gas turbine engines.

Additionally, "racking" devices used to move parts in and out of plating baths and hold the part within the baths can also provide plating weak points. The racking device contacts at least a portion of the part to be plated in order to hold the part. Typically, little plating is received in the region where the racking device contacts the part, resulting in a plating layer that is thinner near the racking point than elsewhere on the part. Due to the thickness of the metal layer applied to non-metallic core 44, different racking devices or racking points can be used for the metal plating of a particular part. For example, fan blade 30 can be plated for a time with a racking point at an upstream portion of root 36 and a racking point at pressure side surface 40. Fan blade 30 is then later plated with a racking point at a downstream portion of root 36 and a racking point at suction side surface 42. This evens out the racking point locations to reduce or eliminate the presence of weak points in metal layer 46. "Shields", "thieves" and masks can also be used during plating processes to modify the current density, and therefore the amount of plating that is deposited on certain geometric features. Shields force current to go around portions of the racking or the component (i.e. fan blade) to be plated, slowing the rate of metal deposition on regions under the shields. Thieves are typically metal parts positioned around or near the component to be plated that "steal" away plating by serving as a high current density location and reducing the rate of metal deposition near the thief Masks cover a portion of the component so that it does not receive any plating. These tools allow areas of fan blade 30 to be selectively plated and encourage or discourage the extent of plating in certain areas to modify the thickness of metal layer 46 in various regions.

In some embodiments, weak plating areas of metal layer 46 can be strengthened using transient liquid phase (TLP) bonding. TLP bonding of plated polymer components is discussed in greater detail in the U.S. patent application filed on Jul. 9, 2013. The strengthened bond provided by TLP bonding a metal-plated fan blade to another metal-plated or metallic component can eliminate weak points in metal layer 46 that formed as a result of a nearby racking point, nodulation or pitting while also allowing for flexibility in component design. In some embodiments, metal layer 46 can also accommodate bonded metal edges (leading edge, tip, trailing edge) using either adhesive or TLP bonding.

Figure 47:
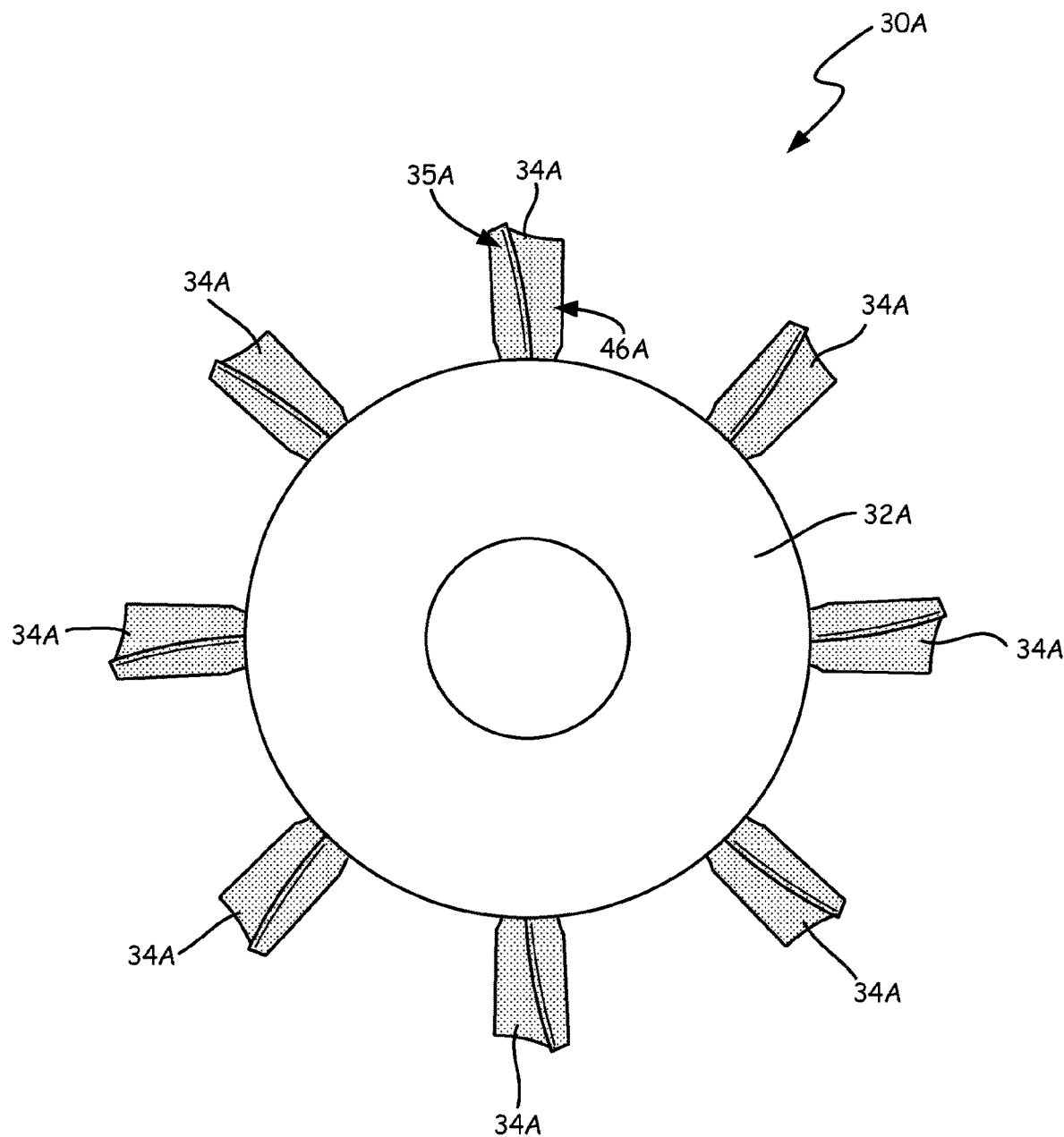
FIG. 47 is a front view illustrating another embodiment of a blad on a metal plated integrally bladed rotor having a non-metallic core.

While FIGS. 45 and 46 illustrate IBR 30 where substantially all of the rotor and blades are covered by metal layer 46, other embodiments can possess differing amounts of coverage. In some embodiments, non-metallic core 44 is present only in airfoil 35 of blades 34 and rotor 32 is formed of a metal. For example, in the embodiment shown in FIG. 47, blade 34A of IBR 30A includes non-metallic core 44 throughout substantially all of airfoil 35A (from where blade 34A meets rotor 32A to the blade tip). Metal layer 46A covers substantially all of airfoil 35A and is shown in FIG. 47 by way of stipling. In this embodiment, rotor 32A does not include non-metallic core 44 but is instead formed of a metal. In this embodiment, metal layer 46A along the bottom of blade 34A is joined to rotor 32A by TLP bonding as described in U.S. patent applications filed on Mar. 15, 2013.

Figure 48:
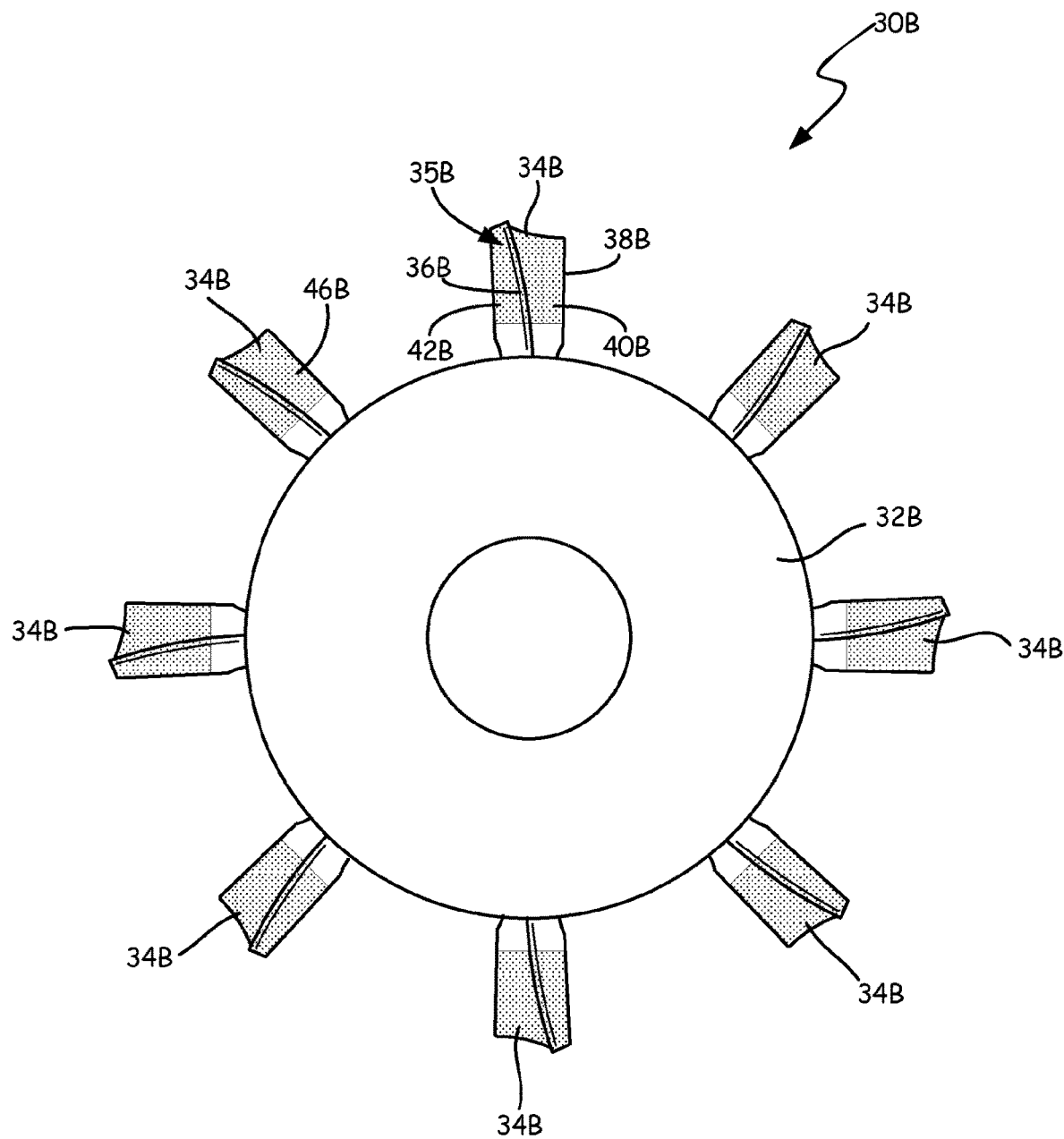
FIG. 48 is a front view illustrating another embodiment of a blade on a metal plated integrally bladed rotor having a non-metallic core.

In another embodiment, the rotor includes a metal portion that extends from the hub that is then bonded to an airfoil shaped part to form the blade. FIG. 48 illustrates IBR 30B in which metal portion 48 extends from rotor 32B. Metal portion 48 is airfoil shaped so that it serves as an inner portion of the airfoil of blade 34B while airfoil 35B serves as the outer portion of the airfoil of blade 34B. Airfoil 35B includes non-metallic core 44 that extends from the area where it meets metal portion 48 to the blade tip. Metal layer 46B covers substantially all of airfoil 35B and is shown in FIG. 48 by way of stipling. In this embodiment, rotor 32B and metal portion 48 do not include non-metallic cores 44 but are formed of a metal. In this embodiment, metal layer 46B along the bottom of airfoil 35B is joined to metal portion 48 by TLP bonding as described above. In some embodiments, metal portion 48 of IBR 30B extends from rotor 32 less than or equal to about one-third of the distance between rotor 32 and the blade tip. Additionally, a non-airfoil shaped portion of metallic rotor 32B may be TLP bonded to each airfoil (e.g., metal layer 46B of airfoil 35B is TLP bonded to a post that is part of rotor 32B).

Embodiments of IBR 30 having metal layer 46 covering non-metallic core 44 are typically much lighter than IBRs constructed of titanium or other metals. The lighter mass of blades 34 of IBR 30 results in blades that are less likely to penetrate the fan or compressor case and raise serious safety concerns in the event of blade breakage. Additionally, in the case of fan section 12, lighter rotor 32 and blades 34 carry less load than a comparable metal rotor and fan blades, allowing low-pressure power turbine section 22 downstream of fan section 12 to be downsized, and therefore lighter, reducing overall engine mass. While blades 34 are lighter than conventional metal fan blades, the relatively thick metal layer 46 provides enough ductility and durability to survive bird strike events. In embodiments in which metal layer 46 is thickest along leading edge 36, blade durability is further improved.

Discussion of Possible Embodiments

The following are non-exclusive descriptions of possible embodiments of the present invention.

An integrally bladed rotor can include a hub and a plurality of blades extending from the hub. Each blade can have an airfoil portion ending in a tip distal from the hub. At least one blade can include a non-metallic core having an outer surface and a metal layer covering a portion of the outer surface of the non-metallic core.

The integrally bladed rotor of the preceding paragraph can optionally include, additionally and/or alternatively, any one or more of the following features, configurations and/or additional components:

A further embodiment of the foregoing integrally bladed rotor can further include a hub having a non-metallic core with an outer surface and a metal layer covering substantially all of the outer surface of the non-metallic core of the hub.

A further embodiment of any of the foregoing integrally bladed rotors can further include a metal portion extending from the hub where the metal portion is joined to the metal layer that covers the non-metallic core of the at least one blade.

A further embodiment of any of the foregoing integrally bladed rotors can further include that the metal portion of the integrally bladed rotor extends from the hub less than or equal to about one-third of a distance measured from the hub to the tip of the at least one blade.

A further embodiment of any of the foregoing integrally bladed rotors can further include that the metal portion is joined to the metal layer that covers the non-metallic core of the at least one blade by a transient liquid phase bond.

A further embodiment of any of the foregoing integrally bladed rotors can further include that the metal layer of the at least one blade is joined to the hub by a transient liquid phase bond.

A further embodiment of any of the foregoing integrally bladed rotors can further include that the non-metallic core has local thicknesses between about 1.27 mm (0.050 inches) and about 50.8 mm (2.00 inches).

A further embodiment of any of the foregoing integrally bladed rotors can further include that the metal layer has local thicknesses between about 0.127 mm (0.005 inches) and about 6.35 mm (0.250 inches).

A further embodiment of any of the foregoing integrally bladed rotors can further include that the metal layer has an average thickness between about 0.635 mm (0.025 inches) and about 3.81 mm (0.150 inches).

A further embodiment of any of the foregoing integrally bladed rotors can further include that the non-metallic core is a polymer selected from the group consisting of polyphenylene sulfides, polyamides, polyvinylchloride (PVC), polystyrene (PS), polyethylene (PE), polypropylene (PP), styrene-acrylonitrile (SAN), polycarbonate (PC), acrylonitrile styrene acrylate (ASA), acrylonitrile butadiene styrene (ABS), ethylene tetrafluoroethylene fluoropolymer (ETFE), high impact polystyrene (HIPS), polyamide (PA), polybutylene terephthalate (PBT), polyetherimide (PEI), perchloroethylene (PCE), polyether sulfone (PES), polyethylene terephthalate (PET), polysulfone (PSU), polyurethane (PUR), polyvinylidene fluoride (PVDF), polyether ether ketone (PEEK), polyetherimide (PEI), thermoplastic polyimide, condensation polyimide, addition polyimide, polyether ketone ketone (PEKK), polysulfone, polyphenylsulfide, polyester, epoxy cured with aliphatic and/or aromatic amines and/or anhydrides, cyanate esters, phenolics, polyacrylates, polymethacrylates, silicones (thermoset), any of the foregoing with fiber reinforcement and combinations thereof.

A further embodiment of any of the foregoing integrally bladed rotors can further include that the non-metallic core is a composite material.

A further embodiment of any of the foregoing integrally bladed rotors can further include that the metal layer covers substantially all of the non-metallic core.

A method for forming an integrally bladed rotor can include forming a hub and forming a plurality of blades that extend from the hub. At least one blade can include a non-metallic core having an outer surface and a metal layer covering a portion of the outer surface of the non-metallic core.

The method of the preceding paragraph can optionally include, additionally and/or alternatively, any one or more of the following features, configurations and/or additional components:

A further embodiment of the foregoing method can further include that the hub has a non-metallic core having an outer surface and a metal layer covering a portion of the outer surface of the non-metallic core of the hub.

A further embodiment of any of the foregoing methods can further include that the integrally bladed rotor has a metal portion extending from the hub where the method further includes transient liquid phase bonding the metal portion of the integrally bladed rotor to the metal layer that covers the non-metallic core of the at least one blade.

A further embodiment of any of the foregoing methods can further include transient liquid phase bonding the hub to the metal layer that covers the non-metallic core of the at least one blade.

A further embodiment of any of the foregoing methods can further include that the non-metallic core is a polymer selected from the group consisting of polyphenylene sulfides, polyamides, polyvinylchloride (PVC), polystyrene (PS), polyethylene (PE), polypropylene (PP), styrene-acrylonitrile (SAN), polycarbonate (PC), acrylonitrile styrene acrylate (ASA), acrylonitrile butadiene styrene (ABS), ethylene tetrafluoroethylene fluoropolymer (ETFE), high impact polystyrene (HIPS), polyamide (PA), polybutylene terephthalate (PBT), polyetherimide (PEI), perchloroethylene (PCE), polyether sulfone (PES), polyethylene terephthalate (PET), polysulfone (PSU), polyurethane (PUR), polyvinylidene fluoride (PVDF), polyether ether ketone (PEEK), polyetherimide (PEI), thermoplastic polyimide, condensation polyimide, addition polyimide, polyether ketone ketone (PEKK), polysulfone, polyphenylsulfide, polyester, epoxy cured with aliphatic and/or aromatic amines and/or anhydrides, cyanate esters, phenolics, polyacrylates, polymethacrylates, silicones (thermoset), any of the foregoing with fiber reinforcement and combinations thereof.

A further embodiment of any of the foregoing methods can further include that the non-metallic core is a composite material.

A further embodiment of any of the foregoing methods can further include that the non-metallic core is formed by injection molding where the non-metallic core has local thicknesses between about 1.27 mm (0.050 inches) and about 5.08 mm (0.200 inches).

A further embodiment of any of the foregoing methods can further include that the non-metallic core is formed by compression molding where the non-metallic core has local thicknesses between about 1.27 mm (0.050 inches) and about 50.8 mm (2.00 inches).

A further embodiment of any of the foregoing methods can further include that the metal layer is deposited on the non-metallic core by a process selected from electroplating, electroless plating, electroforming, thermal spray coating, physical vapor deposition, chemical vapor deposition, cold spraying and combinations thereof.

A further embodiment of any of the foregoing methods can further include that the metal layer has local thicknesses between about 0.127 mm (0.005 inches) and about 2.54 mm (0.100 inches).

A further embodiment of any of the foregoing methods can further include that the metal layer has an average thickness between about 0.635 mm (0.025 inches) and about 1.91 mm (0.075 inches).

Thus, plated polymer structures and components may provide impact resistance against both hard and soft body objects while yielding lighter and/or less costly structures and components as compared to traditional manufacturing techniques.

INDUSTRIAL APPLICABILITY

Plated polymer materials such as plated polymeric substrates, plated polymeric composite substrates and plated polymeric composite layup structures may be used to form lightweight but strong parts of gas turbine engines, such as a layshaft cover, a case, a component of a nacelle assembly, a fan inlet duct, a component of a thrust reverser, bulkheads, fixed panels or structures that may be used for sound attenuation, etc. The plated polymeric gas turbine engine components may offer cost and/or weight savings compared to baseline parts. The plated metallic layers provide properties such as erosion resistance that can remove the need for erosion coatings on a composite case or cover.

What is claimed is:
1. A compressor component for a gas turbine engine, the component comprising:
a first at least one polymeric substrate forming the compressor component and having a first at least one exposed surface; and
a first at least one metallic plating layer deposited on the first at least one exposed surface of the at least one polymeric substrate, wherein the first at least one polymeric substrate is formed into a rotating airfoil and the rotating airfoil extends integrally from a hub having a metal portion extending from the hub and joined to the first at least one metallic plating layer by a transient liquid phase bond.

2. The component of claim 1, wherein the metal portion extends from the hub less than or equal to about one third of a distance measured from the intersection of the hub and the airfoil to the tip of the airfoil.

3. The component of claim 1, wherein the hub is formed of a second at least one polymeric substrate having a second at least one exposed surface, the second at least one exposed surface having a second at least one metallic plating layer deposited thereon.

4. The component of claim 1, wherein the component further comprises a polymeric coating disposed on at least a portion of the metallic plating layer on a side opposite to the first at least one polymeric substrate.

5. A compressor for a gas turbine engine, the compressor comprising:
   an integrally bladed rotor having
   a plurality of rotating airfoils extending integrally from a hub, each airfoil of the plurality of rotating airfoils including a first at least one polymeric substrate having a first at least one exposed surface; and
   a first at least one metallic plating layer deposited on the first at least one exposed surface wherein the hub has a metal portion extending from the hub and joined to the at least one metallic plating layer by a transient liquid phase bond.

6. The compressor of claim 5, wherein the hub is formed of a second at least one polymeric substrate having a second at least one exposed surface, the second at least one exposed surface having a second at least one metallic plating layer deposited thereon.

7. The compressor of claim 5, further including a case surrounding the plurality of airfoils, the case formed from a second at least one polymeric substrate having a second at least one exposed surface, the second at least one exposed surface having a second at least one metallic plating layer deposited thereon.

8. The compressor of claim 5, further including a cluster of vanes, the cluster of vanes formed from a second at least on polymeric substrate having a second at least one exposed surface, the second at least one exposed surface having a second at least one metallic plating layer deposited thereon.

9. The compressor of claim 8, wherein the cluster of vanes includes at least one shroud, the at least one shroud formed from a third at least one polymeric substrate having a third at least one exposed surface, the third at least one exposed surface having a third at least one metallic plating layer deposited thereon.

10. The compressor of claim 5, wherein the component further comprises a polymeric coating disposed on at least a portion of the metallic plating layer on a side opposite to the first at least one polymeric substrate.

11. A method of fabricating a compressor component for a gas turbine engine, the method comprising:
    forming at least one polymeric substrate into an airfoil for an integrally bladed rotor having a hub and blades; and
    depositing at least one metallic plating layer on at least one exposed surface of the at least one polymeric substrate and joining the airfoil to metal portions extending from the hub using a transient liquid phase bond.

* * * * *